(12) United States Patent
Sallaway et al.

(10) Patent No.: US 7,050,517 B1
(45) Date of Patent: May 23, 2006

(54) SYSTEM AND METHOD SUITABLE FOR RECEIVING GIGABIT ETHERNET SIGNALS

(75) Inventors: Peter J. Sallaway, San Diego, CA (US); Sreen Raghavan, La Jolla, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/560,109

(22) Filed: Apr. 28, 2000

(51) Int. Cl.
*H04B 1/10* (2006.01)

(52) U.S. Cl. .................................... 375/350

(58) Field of Classification Search ............. 375/350, 375/316, 341, 346, 262, 229, 233; 714/794, 714/795
See application file for complete search history.

(56) References Cited

U.S. PATENT DOCUMENTS

| | | | |
|---|---|---|---|
| 4,456,893 A | 6/1984 | Otani | 333/18 |
| 4,701,936 A | 10/1987 | Clark et al. | 375/14 |
| 4,888,560 A | 12/1989 | Ogura | 330/254 |
| 4,974,185 A | 11/1990 | Ohno et al. | 364/724.13 |
| 5,031,194 A | 7/1991 | Crespo et al. | 375/14 |
| 5,119,196 A | 6/1992 | Ayanoglu et al. | 358/167 |
| 5,245,291 A | 9/1993 | Fujimura | 324/617 |
| 5,291,499 A | 3/1994 | Behrens et al. | 371/43 |
| 5,465,272 A | 11/1995 | Smith | 375/295 |
| 5,481,564 A | 1/1996 | Kakuishi et al. | 375/230 |
| 5,502,735 A | 3/1996 | Cooper | 371/43 |

(Continued)

FOREIGN PATENT DOCUMENTS

| | | | |
|---|---|---|---|
| DE | 19626076 | 1/1997 | |
| EP | 0410399 A2 | 1/1991 | |
| JP | 2-215236 | 8/1990 | ............ 7/5 |
| JP | 6-334692 | 12/1994 | |
| JP | 8-116275 | 5/1996 | |
| JP | 08172366 A | 7/1996 | |
| JP | 9-148944 | 6/1997 | |
| JP | 9-153845 | 6/1997 | |
| WO | WO97/11544 | 3/1997 | |

OTHER PUBLICATIONS

Lee, E.A. et al., "Digital Communications" (1988), pp. 34–42.

Lee, E.A. et al., "Digital Communications" (1988), pp. 319–345.

Sklar, B., "Digital Communications, Fundamentals and Applications" (1988), pp. 333–337.

Oppenheim, A.V. et al., "Discrete–Time Signal Processing" (1989), pp. 149–191.

ANSI, Fibre Distributed Data Interface–Part: Token Ring Twisted Pair Physical Layer Medium Dependent (Mar. 1995), pp. 1–81.

IEEE, Standard 802.3u (1995), pp. 1–393.

IEEE, Draft P802.3ab/D1.1 (1997), pp. 1–125.

*Primary Examiner*—Khai Tran
(74) *Attorney, Agent, or Firm*—Ronald J. Meetin

(57) ABSTRACT

A detector system for high-speed Ethernet LAN is described. One embodiment includes a detector system having N one dimensional sequence detector equalizers in combination with an N-dimensional traceback decoder. The detector system detects N-dimensional symbols transmitted over N separate transport channels to N one-dimensional receivers. In one embodiment, Gigabit Ethernet receiver includes a four-wire transport to four 1D receivers and a 4D detector. The 4D detector in one embodiment is a parity code detector. In another embodiment, the 4D detector is a 4D trellis code detector.

60 Claims, 18 Drawing Sheets

U.S. PATENT DOCUMENTS

| | | | |
|---|---|---|---|
| 5,602,507 A | 2/1997 | Suzuki | 329/304 |
| 5,617,450 A | 4/1997 | Kakuishi et al. | 375/230 |
| 5,638,065 A | 6/1997 | Hassner et al. | 341/59 |
| 5,654,667 A | 8/1997 | Adachi | 329/306 |
| 5,809,079 A | 9/1998 | Hayashi | 375/262 |
| 5,818,378 A | 10/1998 | Cheng et al. | 341/155 |
| 5,841,478 A | 11/1998 | Hu et al. | 348/426 |
| 5,841,484 A | 11/1998 | Hulyalkar et al. | 348/607 |
| 5,859,861 A | 1/1999 | Oh | 371/43.7 |
| 5,872,668 A | 2/1999 | Muto | 360/65 |
| 5,895,479 A | 4/1999 | Suganuma | 708/301 |
| 5,909,384 A | 6/1999 | Tal et al. | 364/724.19 |
| 5,940,442 A | 8/1999 | Wong et al. | 375/232 |
| 5,949,819 A | 9/1999 | Bjarnason et al. | 375/222 |
| 5,960,011 A | 9/1999 | Oh | 371/46 |
| 5,982,818 A | 11/1999 | Krueger et al. | 375/265 |
| 5,986,831 A | 11/1999 | Muto | 360/46 |
| 6,011,813 A | 1/2000 | Ghosh | 375/233 |
| 6,035,007 A | 3/2000 | Khayrallah et al. | 375/341 |
| 6,038,269 A | 3/2000 | Raghavan | 375/340 |
| 6,047,022 A | 4/2000 | Reuven | 375/222 |
| 6,047,024 A | 4/2000 | How | 375/229 |
| 6,115,418 A | 9/2000 | Raghavan | 375/233 |
| 6,148,046 A | 11/2000 | Hussein et al. | 375/345 |
| 6,178,198 B1 | 1/2001 | Samueli et al. | 375/214 |
| 6,226,332 B1 | 5/2001 | Agazzi et al. | 375/288 |
| 6,252,904 B1 | 6/2001 | Agazzi et al. | 375/233 |
| 6,253,345 B1 | 6/2001 | Agazzi et al. | 714/752 |
| 6,385,238 B1 | 5/2002 | Nguyen | 375/232 |
| 6,400,760 B1 | 6/2002 | Gu et al. | 375/232 |
| 6,415,003 B1 * | 7/2002 | Raghavan | 375/317 |
| 6,418,172 B1 | 7/2002 | Raghavan et al. | 375/262 |
| 6,421,381 B1 * | 7/2002 | Raghavan | 375/233 |
| 6,438,163 B1 | 8/2002 | Raghavan et al. | 375/233 |
| RE37,826 E | 9/2002 | Samueli et al. | 370/402 |
| 6,542,477 B1 | 4/2003 | Pal et al. | 370/286 |

* cited by examiner

SYSTEM AND METHOD SUITABLE FOR RECEIVING GIGABIT ETHERNET SIGNALS

BACKGROUND

1. Field of the Invention

This invention relates to digital communication systems and, more particularly, to a detection system and method for an Ethernet receiver.

2. Discussion of Related Art

The dramatic increase in desktop computing power driven by intranet-based operations and the increased demand for time-sensitive delivery between users has spurred development of high-speed Ethernet LANs. 100BASE-TX Ethernet, using existing category-5 copper wire, and the newly developed 1000BASE-T Ethernet for Gigabit/s transfer of data over category-5 copper wire require new techniques in high speed symbol processing. Gigabit per second transfer can be accomplished utilizing four twisted pairs and a 125 megasymbol/s transfer rate on each pair where each symbol represents two bits.

Physically, data is transferred using a set of voltages where each voltage represents one or more bits of data. Each voltage in the set is referred to as a symbol and the whole set of voltages is referred to as a symbol alphabet. In gigabit transfer, for example, data is usually sent with a set of five voltage levels (PAM-5), each symbol representing two (2) bits.

One system of transferring data at high rates is Non Return to Zero (NRZ) signaling. In NRZ, the symbol alphabet $\{A\}$ is $\{-1, +1\}$. A logical "1" is transmitted as a positive voltage while a logical "0" is transmitted as a negative voltage. At 125 M symbols/s, the symbol rate required for Gigabit transfer over four category-5 wires, the pulse width of each symbol is 8 ns.

Another example of a modulation method for high speed symbol transfer is MLT3 and involves a three level system. (See American National Standard Information system, Fibre Distributed Data Interface (FDDI)—Part: Token Ring Twisted Pair Physical-Layer Medium Dependent (TP-PMD), ANSI X3.263:199X). The symbol alphabet for MLT3 is $\{A\}=\{-1, 0, +1\}$. In MLT3 transmission, a logical 1 is transmitted by either a $-1$ or a $+1$ while a logic 0 is transmitted as a 0. A transmission of two consecutive logic "1"s does not require the system to pass through zero in the transition. A transmission of the logical sequence ("1", "0", "1") would result in transmission of the symbols (+1, 0, −1) or (−1, 0, +1), depending on the symbols transmitted prior to this sequence. If the symbol transmitted immediately prior to the sequence was a +1, then the symbols (+1, 0, −1) are transmitted. If the symbol transmitted before this sequence was a −1, then the symbols (−1, 0, +1) are transmitted. If the symbol transmitted immediately before this sequence was a 0, then the first symbol of the sequence transmitted will be a +1 if the previous logical "1" was transmitted as a −1 and will be a −1 if the previous logical "1" was transmitted as a +1.

The detection system in the MLT3 standard needs to distinguish between 3 voltage levels, instead of two voltage levels in a more typical two level system. The signal to noise ratio required to achieve a particular bit error rate is higher for MLT3 signaling than for two level systems. The advantage of the MLT3 system, however, is that the energy spectrum of the emitted radiation from the MLT3 system is concentrated at lower frequencies and therefore more easily meets FCC radiation emission standards for transmission over twisted pair cables. Other communication systems may use a symbol alphabet having more than two voltage levels in the physical layer in order to transmit multiple bits of data using each individual symbol.

In Gigabit Ethernet over twisted pair Category-5 cabling, for example, PAM-5 data can be transmitted over four twisted copper pair at an individual twisted pair baud rate of 125 Mbaud. In PAM-5, data is sent with 5 voltage levels, designated as symbol alphabet $\{A\}=\{-2, -1, 0, 1, 2\}$ although the actual voltage levels may be different from those. Each symbol, therefore, can be used to code more than one bit of data.

Any other modulation scheme for symbol coding can be utilized, including quadrature amplitude modulation (QAM). In QAM schemes, for example, the symbols are arranged on a two-dimensional (real and imaginary) symbol constellations (instead of the one-dimension constellations of the PAM-5 or MLT-3 symbol alphabets).

There is a need for transmitters and receivers for receiving transmission over multiple twisted copper pair using larger symbol alphabets (i.e., 3 or more symbols). There is also a need for transceiver (transmitter/receiver) systems that, while operating at high symbol rates, have low bit error rates.

SUMMARY

Accordingly, a receiver and detection method for receiving transmission of data over multiple wires using encoded data symbol schemes having multiple symbols is described. A receiver according to the present invention includes multiple detectors for detecting one symbol from each of the multiple wires simultaneously (i.e., multiple 1-D detectors), an equalizer coupled to each of the detectors for equalizing the symbol stream from each of the multiple wires, and a multi-dimensional error analyzer/decoder for simultaneously making hard decision regarding the symbol output of the symbols transmitted over each of the multiple wires.

Individual symbols can have any modulation scheme, including those with multi-dimensional constellations. The terminology of detecting N-dimensional symbols refers to the number of individual symbols detected in each clock cycle, and not to the dimension of the symbol constellation.

Each of the equalizers can be any equalizer structure, including linear or decision feedback equalizers. In one embodiment of the invention, the equalizers include sequence detection equalizers. In another embodiment of the invention, the equalizers include simplified decision feedback equalizers.

In another embodiment, the equalizer includes a sequence detection equalizer in combination with a linear equalizer or a decision feedback equalizer. In some embodiments, the sequence detection equalizer is a reduced state sequence detector. In some embodiments, the decision feedback equalizer is a simplified decision feedback equalizer.

In general, a transceiver according to the present invention can utilize any symbol alphabet. In some embodiments, a PAM-5 symbol alphabet is utilized.

Some embodiments of the invention can also include an error analysis decoder. The receiver receives signals from N individual wires and, for each wire, includes a linear equalizer in combination with a 1-D sequence detector. The N output signals from the N 1-D sequence detectors are input to a N-D decoder that makes a final decision on the N-D symbol. In some embodiments of the invention, the error analysis decoder operates with lattice encoding schemes. In some other embodiments of the invention, the error analysis decoder operates with a parity encoding scheme.

These and other embodiments of a transceiver system according to the present invention are further described below with reference to the following figures.

In the figures, components having similar functions are often labeled similarly.

DETAILED DESCRIPTION

Figure 1:
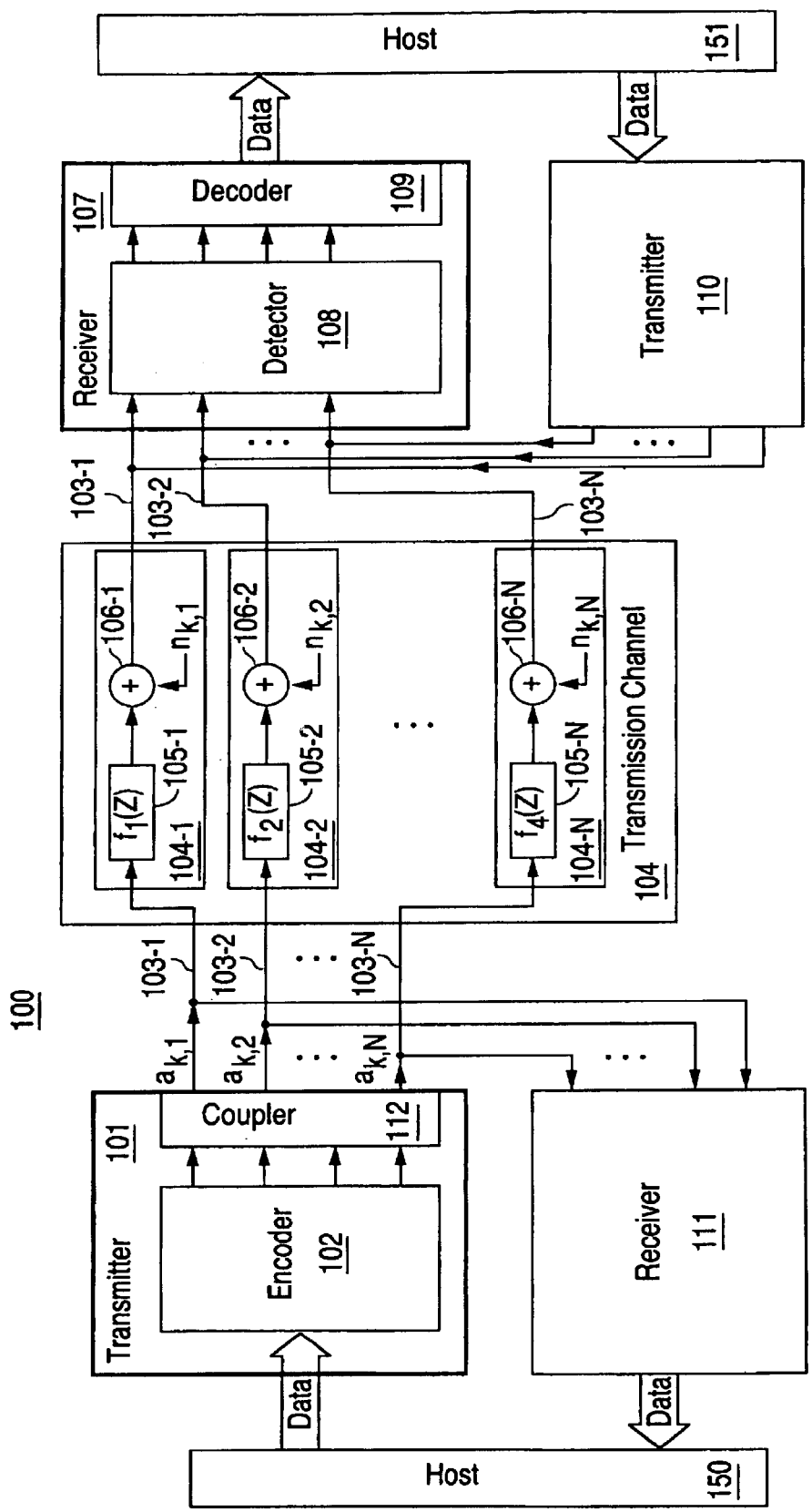
FIG. 1 shows a block diagram of a transceiver having multiple transport channels.

FIG. 1 shows a block diagram of a transceiver system 100 according to the present invention. Transceiver system 100 includes transmitter 101, receiver 107, and transport wires 103-1 through 103-N. A digital data stream is input to transmitter 101 by a host 150. Transmitter 101 includes encoder 102, which encodes the data for transmission over transport wires 103-1 through 103-N. Transmission coupler 112 couples the encoded symbols received from encoder 102 to transmission channel 104. Data is output by transmission coupler 112 as symbols $a_{k,1}$ through $a_{k,N}$ over wires 103-1 through 103-N, (collectively referred to as cable 103), respectively, which are coupled between transmitter 101 and receiver system 107. Wires 103-1 through 103-N can be of any transport medium or combination of transport media. Transport media include, for example, category-5 twisted copper pair, optical fiber and coax cable.

The index k in the above notation indicates the kth time cycle of the data transmission. The indicator N is an integer indicating the number of individual transport wires in cable 103. In general, any number of wires can be included in transceiver system 100. For gigabit transmission, N is usually four (4), indicating a four wire connection between transmitter 101 and receiver system 107. Wires 103-1 through 103-4 are often twisted copper pair.

Transmission channel 104 collectively represents cable 103 and any distortion of the signals that occurs between transmitter 101 and a receiver 107. Each of wires 103-1 through 103-N, along with output couplers of coupler 112 and input couplers of detector 108, distort signals as indicated by the associated transmission channel 104-1 through 104-N, respectively. The signals through wires 103-1 through 103-N are distorted by channel functions $f_1(Z)$ through $f_N(Z)$, respectively, and additionally suffer from a random noise addition $n_{k,1}$ through $n_{k,N}$, respectively. Receiver 107 includes a signal detector 108 and a decoder 109 and ultimately outputs a data stream which corresponds to the data stream entering transmitter 101.

In Gigabit Ethernet, transmission can be conducted on four twisted copper pairs (i.e., wires 103-1 through 103-4 in FIG. 1) in a full duplex fashion to achieve one gigabit per second throughput. IEEE 802.3ab, Gigabit Long Haul Copper Physical Layer Standards Committee, 1997 (hereinafter "Gigabit Standard"). Transmitter 101 is coupled to a first host 150 to receive data for transmission over transmission channel 104 to a second host 151 coupled to receiver 107. In general, first host 150 is further coupled to a receiver 111 for receiving data from transmission channel 104 and second host 151 is coupled to a transmitter 110 for sending data to transmission channel 104.

Although, in general, the detection system as described here is applicable to any scheme of data transmission (i.e., any symbol alphabet) over any number of transport wires (e.g., twisted copper pair), for exemplary purposes many of the examples below specifically describe a PAM-5 symbol alphabet transmitted over four twisted copper pair, as would be used in Gigabit Ethernet transmission over Category-5 twisted pair cabling. It should be recognized that other symbol alphabets and numbers of conductors can also be used and that one skilled in the art will recognize from this disclosure embodiments appropriate for other modulation schemes.

Encoder

According to the developed IEEE 802.3ab standard for Gigabit Ethernet transmission, the transmitted symbols on each of four conductors 103-1 through 103-4 are chosen from a five level Pulse Amplitude Modulation (PAM-5) constellation, with alphabet {A}={−2, −1, 0, +1, +2}. See Gigabit Standard. At each clock cycle, a single one-dimensional (1-D) symbol is transmitted on each wire. The four 1-D symbols, one on each of conductors 103-1 through 103-4, transmitted at a particular sample time k, is considered to be a single 4-D symbol. In general, data entering transmitter 101 can be encoded into a N-D symbol, instead of into N 1-D symbols, by encoder 102. Encoder 102 may be any type of N-D encoder, including a N-D parity code encoder and a N-D trellis code encoder.

To achieve one gigabit per second communications, a gigabit ethernet transceiver needs to achieve a throughput of 250 Megabits per second over each of four transport wires 103-1 through 103-4. Therefore, at a 125 MHz baud rate, two bits must be transmitted at each sample time across each wire of cable 103. Although a PAM-5 system is applicable, a four level PAM system, for example, does not provide redundancy which allows for error correction coding necessary to achieve a bit error rate (BER) of $10^{-10}$, as required by the Gigabit Ethernet standard. See Gigabit Standard.

In addition, extra channel symbols are needed to represent ethernet control characters. Therefore, five level PAM (PAM-5) with either a parity check code or trellis coding is often utilized in Gigabit Ethernet transmission. According to the Gigabit standard, the trellis code is the only coding utilized. Alphabets having more than five level 1-D symbols may also be utilized for Gigabit transmission while achieving the required BER.

At 125 Mbaud, each 4-D symbol needs to transmit at least eight bits. Therefore, 256 different 4-D symbols plus those required for control characters are required. By transmitting a 4-D PAM-5 symbol alphabet, there are $5^4=625$ possible symbols. This number of symbols allows for 100% redundancy in the data as well as for several control codes. Symbol alphabets having more than five symbols yield even greater redundancy. However, because of the difficulties in distinguishing between the higher number of voltage levels, higher error rates may be suffered in receiver detection systems, such as detector 108 of FIG. 1.

The Gigabit Ethernet standard, See Gigabit Standard, allows a trellis code. However, both a 4-D eight state trellis code and a 4-D parity code have been proposed. The trellis code achieves 6 dB of coding gain over uncoded PAM-5 while the parity code achieves 3 dB of coding gain. While encoding, the choice between encoders can be encoded in a TX_CODING bit, which can be set to one for trellis coding. One skilled in the art will recognize that embodiments of the present invention are applicable to any error correction technique.

Figure 2:
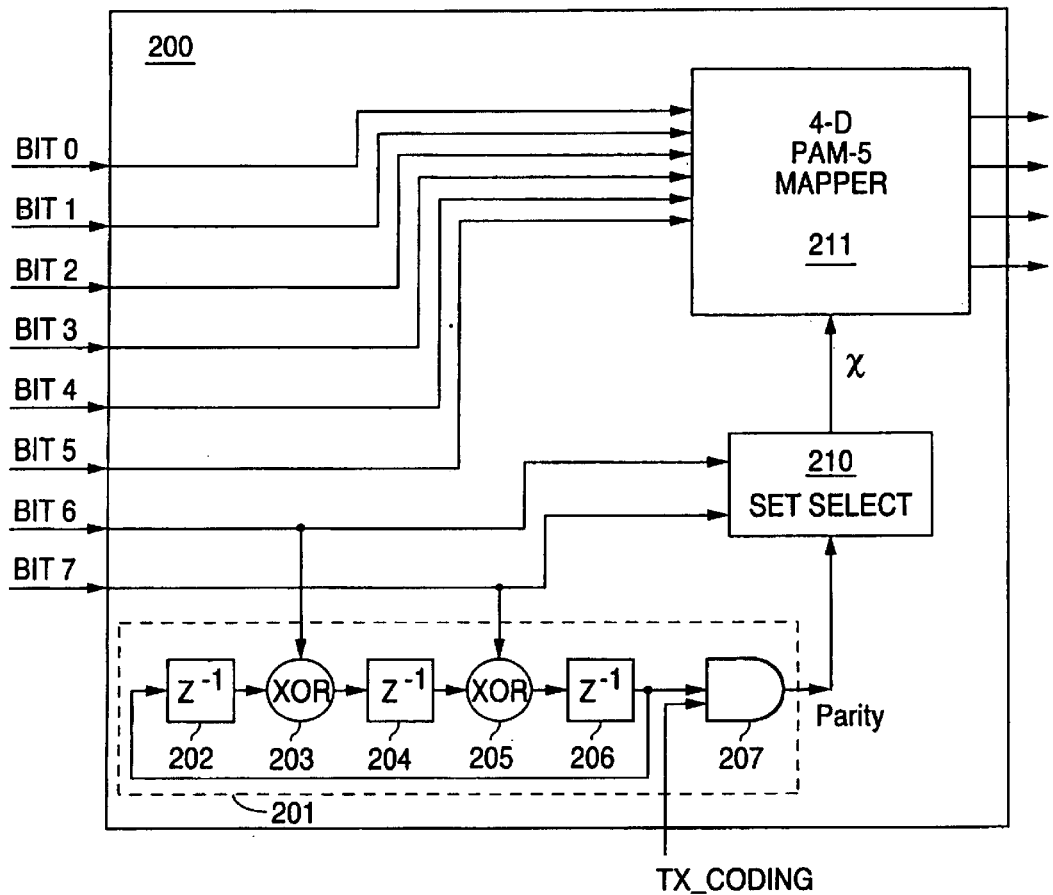
FIG. 2 shows a block diagram of an encoder capable of both trellis encoding and parity encoding.

4D Trellis Encoding Trellis encoding in a conventional 4-D eight state code is described in Part II, Table IV of G. Ungerboeck, "Ungerboeck-Coded Modulation with Redundant Signal Sets, Part I and II", *IEEE Communications*, vol. 24, no. 2, pp. 5–21 (February, 1987) (hereinafter "Ungerboech"). An embodiment of an eight state trellis encoder 200 similar to that described in Ungerboeck is shown in FIG. 2. Trellis encoder 200 receives eight bits, bits 0 through 7, and outputs 9 bits, bits 0 through 7 plus a parity bit, provided that TX_CODING is set to 1. The parity bit is produced from a rate ⅔ memory 3, systematic convolutional encoder 201.

Convolutional encoder 201 includes delays 202, 204 and 206, each of which delays its input signal by one clock cycle. The output signal from delay 202 is XORed (exclusive-ORed) with bit 6 in XOR 203 and input to delay 204. The output signal from delay 204 is XORed with bit 7 in XOR 205 and input to delay 206. The output signal from delay 206 is input to AND gate 207 and input to delay 202. AND gate 207 generates the parity bit, which is one (1) if TX_CODING is one (1) and the output signal from delay 206 is 1, and zero otherwise. In embodiments that only utilize trellis coding (i.e., TX_CODING is always 1), AND gate 207 may be excluded from encoder 200 and the parity bit is the output signal from convolutional encoder 201.

The two input bits to convolutional encoder 201 (bits 6 and 7), and the parity bit produced by encoder 201 select one of eight subsets, D0 through D7, of the 4-D symbol alphabet. The nine output bits are mapped to one 4-D PAM-5 symbol that is then transmitted across cable 103 (FIG. 1) as four 1-D PAM-5 symbols.

Each 1-D PAM-5 symbol is a member of one of two families, X (odd) and Y (even). The odd set X contains the PAM-5 symbols {−1, +1} and the even set Y contains the PAM-5 symbols {−2, 0, +2}. Table 1 shows a definition of the eight subsets of 4-D symbols labeled D0 through D7. The definition is based on the membership of 1-D PAM-5 symbols that are represented in each subset. Table 1 also shows the number of 4-D symbols included in each of the subsets.

The notation describing each subset indicates the families of 1-D PAM-5 symbols on each of the four wires describing membership in that subset. The notation XXYX, for example, indicates a set of four 1-D PAM-5 symbols where the first symbol is from type X, the second symbol is from type X, the third symbol is from type Y, and the fourth symbol is from type X. Therefore, conductor 103-1 (FIG. 1) carriers a symbol of type X, conductor 103-2 carries a symbol of type X, conductor 103-3 carries a symbol of type Y and conductor 103-4 carries a symbol of type X.

TABLE 1

Mapping of 4-D symbols into sets D0 through D7

| Subset | X Primary Code | Y Primary Code | # of Symbols |
|---|---|---|---|
| D0 | XXXX | YYYY | 97 |
| D1 | XXXY | YYYX | 78 |
| D2 | XXYY | YYXX | 72 |
| D3 | XXYX | YYXY | 78 |
| D4 | XYYX | YXXY | 72 |
| D5 | XYYY | YXXX | 78 |
| D6 | XYXY | YXYX | 72 |
| D7 | XYXX | YXYY | 78 |

The parity bit and bits 6 and 7 are input to set select 210 (FIG. 2). Set select 210 determines a particular subset selection p, indicating that subset $D_p$ of subsets $D_0$ through $D_7$ has been selected. In one embodiment, subset selection p is determined according to the formula $$p = 4*BIT6 + 2*BIT7 + 1*\text{Parity}, \tag{1}$$

where BIT6 is bit 6, BIT7 is bit 7, and Parity is the parity bit.

A point within subset p is chosen by the six least significant bits of the input, bits 0 through 5. Bits 0 through 5 are input to a 4-D PAM-5 mapper 211 along with the output χ of set select 210. 4-D PAM-5 mapper 211 determines the 4-D PAM-5 symbol within set $D_p$ which represents the eight input bits, bits 0 through 7, and the parity bit. Each subset, D0 through D7, contains more than the 64 points required to encode the six bits, bits 0 through 5. These additional points are either used as control characters or not used at all.

The subset mapping shown in Table 1 is chosen such that the squared Euclidean distance between any pair of points in the same subset is greater than or equal to four (4). For example, the squared distance between two points in subset D0 can be expressed as $(X_{11}-X_{12})2+(X_{21}-X_{22})2+(X_{31}-X_{32})2+(X_{41}-X_{42})2$. Because $X_{ij}=+2, 0$, or $-2$, the shortest squared distance is $(2-0)**2 =4$, which occurs when only one value differs between the two points. In addition, the squared Euclidean distance between points in different even subsets is greater than or equal to 2 and the squared Euclidean distance between points in different odd subsets is greater than or equal to 2. As also can be seen from Table 1, even numbered subsets ($D_0, D_2, D_4, D_6$) have an even number of symbols of type X and an even number of symbols from type Y while odd numbered subsets ($D_1, D_3, D_5, D_7$) have an odd number of symbols of type X and an odd number of symbols of type Y.

Figure 3:
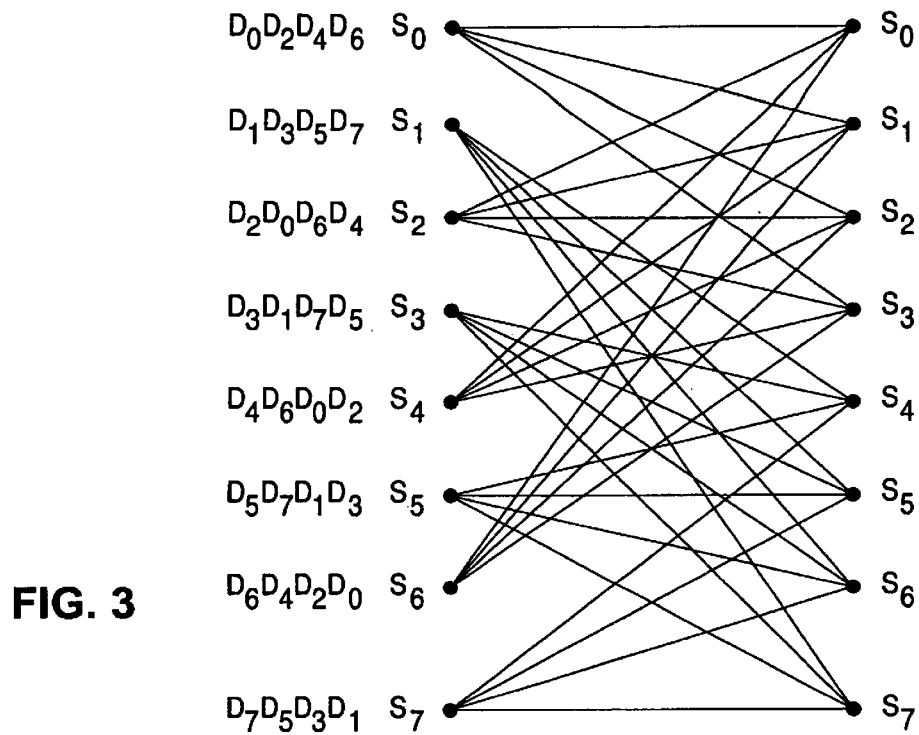
FIG. 3 shows a trellis diagram for state transitions among subsets of PAM-5 4D symbols.

FIG. 3 shows a trellis diagram resulting from the convolutional encoder shown in FIG. 2. The states of the trellis in FIG. 3, $S_0$ through $S_7$, are determined by the bits in delay elements 202, 204 and 206. The state $S_q$ is determined by q=4*(the output signal from delay 202)+2*(the output signal from delay 204)+1*(the output bit from delay 206). The subsets DP are determined by the transition from one state to another as shown in FIG. 3. The subsepts $D_p$ are given in Table 1.

As shown in FIG. 3, all transitions out of a particular state are either all even substates ($D_0, D_2, D_4$, and $D_6$) or all odd subsets ($D_1, D_3, D_5$, and $D_7$). Similarly, the transitions into a particular state are either all even subsets or all odd subsets. The minimum squared distance between outgoing transitions, therefore, is equal to two (2) and the minimum squared distance between incoming transitions is also two (2).

As a result, the minimum squared distance between valid sequences is greater than or equal to 4, which can be seen from the fact that any two paths that originate from the same node and end at the same node, but diverge at some point in the middle, must then converge at a later time. Both the divergence and the convergence have a squared distance of at least 2, thus the total squared distance must be at least 4. In the case where these two paths do not diverge, then they must contain different points from the same subset. Because the minimum squared distance between points in the same subset is equal to 4, the minimum squared distance between valid sequences is 4. As is conventionally known, therefore, a coding gain of 6 dB with respect to uncoded PAM-5 constellations are experienced.

4D Parity Code

The 4-D parity code can also be transmitted using the same encoder, encoder 200 of FIG. 2. To do so, the TX_CODING bit is set to zero. As a result, the parity bit produced by convolutional encoder 201 is always 0. Therefore, set select 211 always chooses even subsets (i.e., X=0, 2, 4 or 6). The minimum squared Euclidean distance between any two 4-D symbols, therefore, is 2 and a coding gain of 3 dB is experienced over uncoded PAM-5.

Transmitter Coupler

Transmitter coupler 112 (FIG. 1) couples the N-D symbol from encoder 102 to transmission channel 104. In some embodiments, coupler 112 can include pre-coding of signals to each of lines 103-1 through 103-N. Some pre-coding may at least partially overcome the expected intersymbol interference effects experienced in transmission channels 104-1 through 104-N, respectively. However, some pre-coding, such as partial response shaping, for example, may actually add to the intersymbol interference effects.

Coupler 112 converts symbols received from encoder 102 to appropriate voltages for transmission to receiver 107 through transmission channel 104. In many embodiments of PAM-5 transmission, for example, those voltages are (−1, −1/2, 0, +1/2, +1) volts corresponding to the PAM-5 symbols (−2, −1, 0, 1, 2), respectively.

Transmission Channel Characteristics

An input symbol stream $\{a_{k,1}\}$ through $\{a_{k,N}\}$ is input to each of wires 103-1 through 103-N, respectively, of transmission channel 104 (FIG. 1) by transmitter 101. Wires 103-1 through 103-N can be twisted copper pair, or some other transmission medium such as coaxial cable or optical fiber. Transmission channel 104 represents the effects that wires 103-1 through 103-N, transmission coupler 112 and receiver couplers in detector 108 have on the input symbol streams $\{a_{k,1}\}$ through $\{a_{k,N}\}$ in transmission between transmitter 101 and receiver 107. Each transmission channel 104-1 through 104-N includes a corresponding one of wires 103-1 through 103-N, respectively, for the symbol stream $\{a_{k,1}\}$ through $\{a_{k,N}\}$ respectively.

Figure 4:
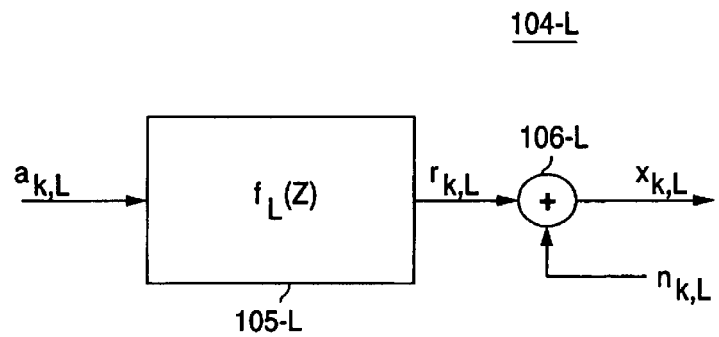
FIG. 4 shows a block diagram of a model of transmission channel between a transmitter and a receiver system.

FIG. 4 shows a single transmission channel 104-L that represents the Lth one of transmission channels 104-1 through 104-N, where L can be any one of 1 through N. The symbol $a_{k,L}$, representing the symbol transmitted on wire 103-L in the kth time period, is transmitted through transmission channel 104-L. The symbol stream $\{a_{k,L}\}$ of FIG. 4 can be NRZ, MLT3, PAM-5 or any other symbol alphabet and modulation. The transmitted symbols in the sequence $\{a_{k,L}\}$ are members of the symbol alphabet $\{A\}$. In the case of five-level PAM signaling, the symbol alphabet $\{A\}$ is given by $\{-2, -1, 0+1, +2\}$.

The channel response 105-L is represented by the channel function $f_L(z)$. In FIG. 1, each of conductors 103-1 through 103-N can experience a different channel function $f_1(Z)$ through $f_N(Z)$, respectively. The addition of random noise $n_{k,L}$ in FIG. 4 is represented by adder 106-L. Again, in FIG. 1 each of conductors 103-1 through 103-N experiences a different random noise $n_{k,1}$ through $n_{k,N}$, respectively. The signal, $x_{k,L}$ suffering from channel distortion, random noise, and a flat signal loss, is received by a receiver 107.

For the sake of simplicity, a baseband transmission system is assumed, although the techniques shown are easily extended to a passband transmission system. (See E. A. LEE AND D. G. MESSERCHMITT, DIGITAL COMMUNICATIONS (1988)) It is also assumed that the channel model includes the effects of transmit and receive filtering. In addition, the transmission channel is assumed to be linear in that two overlapping signals simply add as a linear superposition. The Z-transform, (see A. V. OPPENHEIM & R. W. SCHAFER, DISCRETE-TIME SIGNAL PROCESSING (1989)), of the sampled transmission channel 104-L shown in FIG. 4 is given by the channel function polynomial $$f_L(Z)=f_{0,L}+f_{1,L}Z^{-1}+\ldots f_{j,L}Z^{-j}+\ldots +f_{R,L}Z^{-R}, \quad (2)$$

where $f_{0,L}, \ldots, f_{j,L}, \ldots, f_{R,L}$ are the polynomial coefficients. The coefficient $f_{j,L}$ represents the dispersed component of the (k-j)th symbol present in the $a_{k,L}$th symbol and R is a cut-off integer such that $f_{j,L}$ for j>R is negligible. The polynomial $f_L(Z)$ represents the Z-transformation of the frequency response of the transmission channel ($Z^{-1}$ represents a one period delay). (See A. V. OPPENHEIM & R. W. SCHAFER, DISCRETE-TIME SIGNAL PROCESSING (1989)).

The noiseless output of the channel at sample time k is given by $$r_{k,L}=f_{0,L}*a_{k,L}+f_{1,L}*a_{k-1,L}+\ldots f_{R,L}*a_{k-R,L}, \quad (3)$$

where, without loss of generality, $f_{0,L}$ can be assumed to be 1. Thus, the channel output signal at time k depends, not only on transmitted data at time k, but on R past values of the transmitted data. This effect is known as "intersymbol interference" (ISI). (See LEE & MESSERSCHMITT). The ISI length of the transmission channel defined by Equations 2 and 3 is R, the number of past symbols contributing to ISI.

Intersymbol interference is a result of the dispersive nature of the communication channel. The IEEE LAN standards require that systems be capable of transmitting and receiving data through at least a 100 meter cable. In many instances, a single symbol may affect symbols throughout the transmission cable.

The noise element of the input signal is represented by the sequence $\{n_{k,L}\}$. Therefore, the noisy output signal from transmission channel 104-L is given by $$X_{k,L} = r_{k,L} + n_{k,L}, \quad (4)$$

where the noise samples $\{n_{k,L}\}$ are assumed to be independent and identically distributed Gaussian random variables (see LEE & MESSERSCHMITT) with variance equal to $\sigma^2$.

Receiver

Figure 5A:
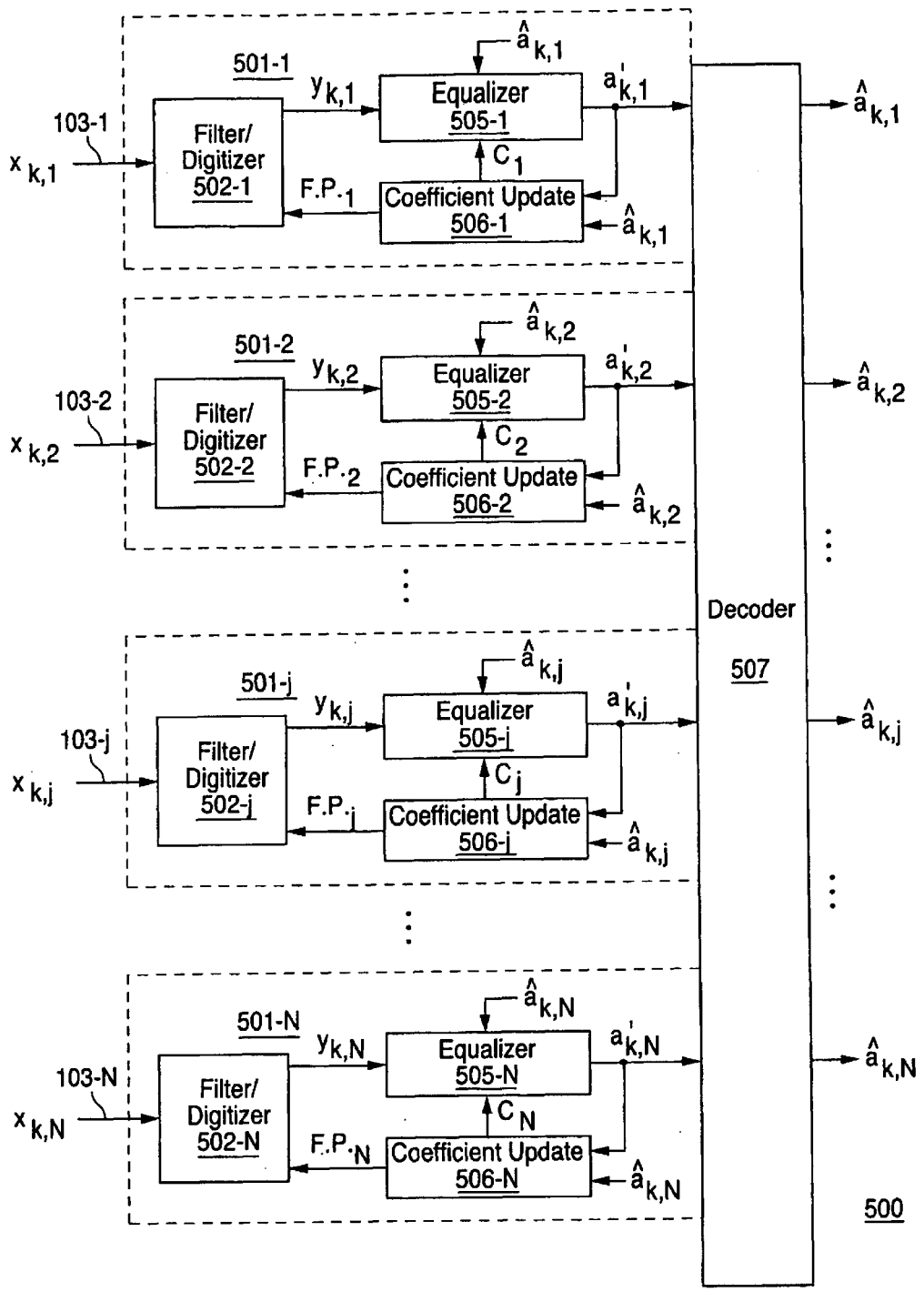
FIG. 5A shows a block diagram of a N-D receiver system according to the present invention.

FIG. 5A shows in a block diagram an embodiment of a baseband receiver system 500 according to the present invention. Other receiver systems may also utilize aspects of the present invention. Embodiments of receiver system 500 may include any number of transport wires 103-1 through 103-N (with associated transmission channels 104-1 through 104-N, respectively) carrying input signal streams $x_{k,1}$ through $x_{k,N}$, respectively.

Receiver system 500 includes receivers 501-1 through 501-N, one for each of lines 103-1 through 103-N, respectively. Receiver 501-j, an arbitrarily chosen one of receivers 501-1 through 501-N, includes filter/digitizer 502-j, equalizer 505-j, and coefficient update 506-j. Signal $x_{k,j}$ from wire 103-j is received by filter/digitizer 502-j. Filter/digitizer 502-j filters, digitizes and amplifies the signal $x_{k,j}$ and outputs a signal $y_{k,j}$. Equalizer 505-j receives the signal $y_{k,j}$, equalizes it to remove the effects of intersymbol interference, and outputs a signal $a_{k,j}$, which is the output signal for receiver 501-j. Filter/digitizer 502-j can be arranged to include filters that partially remove the ISI from signal $x_{k,j}$ before digitizing the signal. See, e.g., U.S. patent application Ser. No. 09/561,086, et al., filed on the same date as the present application, assigned to the same assignee as the present application, herein incorporated by reference in its entirety.

Coefficient update 506-j inputs decided on symbols $â_{k,j}$ and other parameters and adaptively chooses parameters for filter/digitizer 502-j and equalizer 505-j (e.g., amplifier gain, multiplier coefficients, filter parameters, echo cancellation, NEXT cancellation, and timing parameters).

One skilled in the art will recognize that each of receivers 501-1 through 501-N can be different (i.e., each of filters 502-1 through 502-N and equalizers 505-1 through 505-N can be individually matched to receive input signals from the corresponding one of wires 103-1 through 103-N.

Figure 5B:
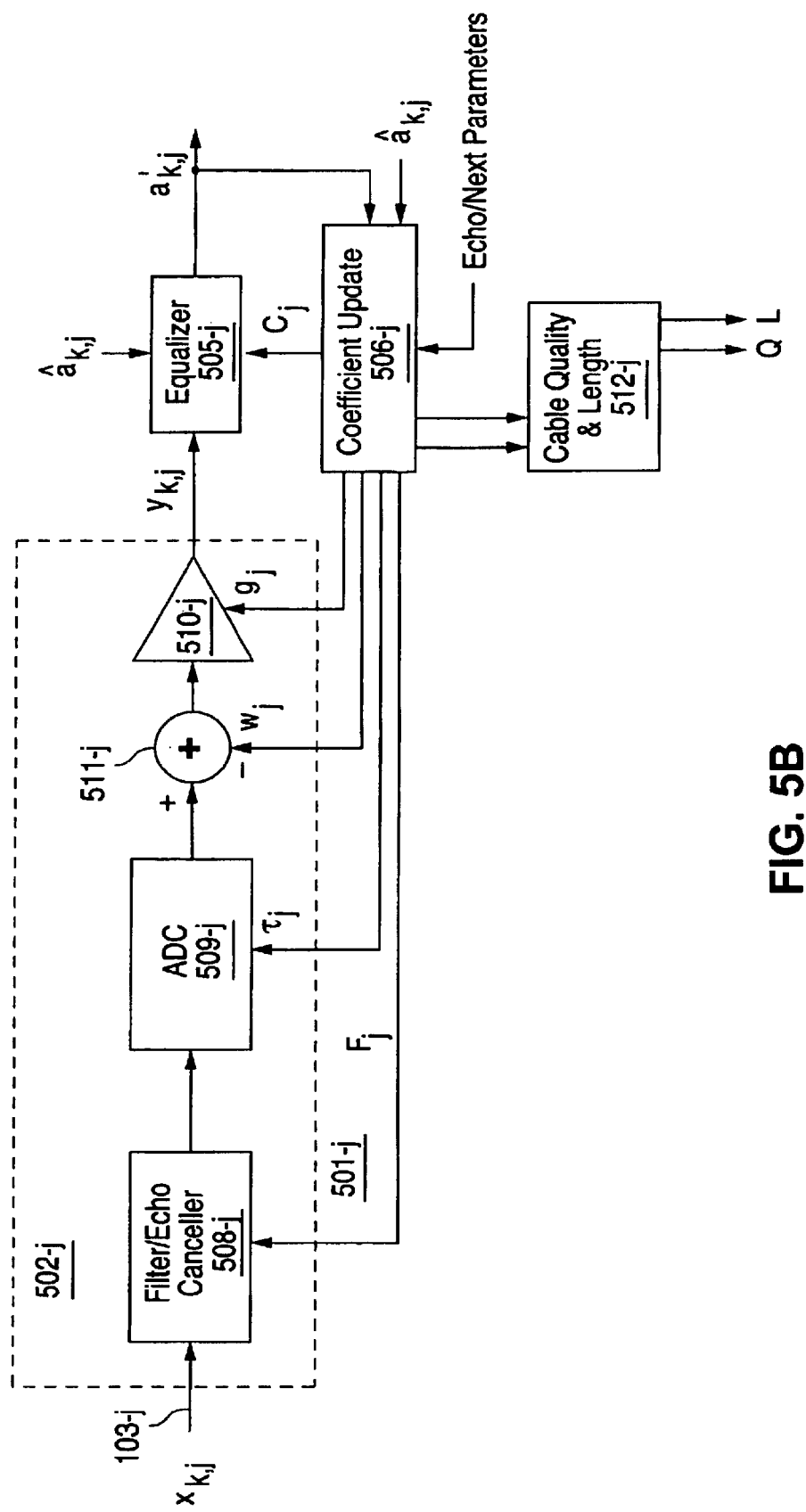
FIG. 5B shows a block diagram of a receiver according to the present invention for the N-D receiver system of FIG. 5A.

FIG. 5B shows a representative example receiver 501-j. Receiver 501-j is one of receivers 501-1 through 501-N. Receiver 501-j includes receiver/digitizer 502-j in series with equalizer 505-j. Receiver/digitizer 502-j includes, in series, filters/echo cancelor 508-j, analog-to-digital converter (ADC) 509-j, and amplifier 510-j. One skilled in the art will recognize that the order of these components can be altered. For example, amplifier 510-j can be implemented before filter 502-j or filter/echo canceller 508-j can be implemented, completely or partially, digitally after ADC 509-j.

Parameters to control the components of receiver 501-j can be adaptively chosen by coefficient update 506-j. Coefficient update 506-j adaptively determines the equalizer coefficients of equalizer 505-j, the gain $g_j$ of amplifier 510-j, the timing coefficient $\tau_j$ of ADC 509-j, and filter coefficients for filter 508-j. In some embodiments, coefficient update 506-j can calculate a baseline wander correction signal $w_j$ which is subtracted from the output sample of ADC 509-j at baseline wander correction adder 511-j. Baseline wander correction is discussed in U.S. patent application Ser. No. 09/151,525, filed Sep. 11, 1998, Raghavan, assigned to the same assignee as the present application, now U.S. Pat. No. 6,415,003, herein incorporated by reference in its entirety.

Some embodiments of receiver 501-j include a cable quality and length indicator 512-j that indicates a wire length L and wire quality Q.

Echo noise, which is a result of impedance mismatches in the duplex link causing some of the transmitted signal energy to be reflected back into a receiver, and near end crosstalk (NEXT) noise, which is caused by the interference from a transmitter 110 (FIG. 1) physically located adjacent to receiver 107, can be canceled through adaptive algorithms in filter 508-j. The cancellation of echo noise and NEXT noise is nearly complete because receiver system 500 has access to the data transmitted by an adjacent transmitter (transmitter 110 in FIG. 1). Coefficient update 506-j, therefore, may input parameters from a decoder/slicer, host 151 or other controller in order to adjust filter 508-j to cancel echo and NEXT noise. Note that, in FIG. 1, transmitter 101 may also be adjacent to an accompanying receiver 111.

Filter 508-j can also include an anti-aliasing filter. An anti-aliasing filter prevents aliasing by passing the input signal, received from wire 103-j, through a low pass filter to reject out-of-band noise. As such, any conventional anti-aliasing filter can be utilized as an anti-aliasing filter portion of filter 508-j.

The analog-to-digital converter (ADC) 509-j samples and holds the input signal for a duration of the symbol period T, which in one embodiment of the invention is 8 ns. In general, embodiments of the invention can utilize any symbol period. Techniques for analog-to-digital conversion that can be used in ADC 509-j are well known. The digitized signals in the receiver are interchangeably referred to in this disclosure as samples or signals.

Amplifier 510-j amplifies the samples received from wire 103-j through transmission channel 104-j in order to correct for signal loss during transmission. The gain of amplifier 510-j, $g_j$, can be adaptively chosen by coefficient update 506-j in order to optimize the operation of receiver 501-j. One of ordinary skill in the art will recognize that digital amplifier 510-j can be located anywhere in receiver 502-j between ADC 509-j and equalizer 505-j. In general, amplifier 510-j can also be an analog amplifier located anywhere between input channel 104-j and ADC 509-j.

In some embodiments, coefficient update 506-j can also calculate the length and quality of wire 103-j. Cable length and quality determination is discussed in U.S. patent application Ser. No. 09/161,346, "Cable Length and Quality Indicator", filed Sep. 25, 1998, Sreen A. Raghavan and Doug J. Easton, assigned to the same assignee as the present disclosure, herein incorporated by reference in its entirety.

The output sample from receiver/digitizer 502-j, $y_{k,j}$, is input to equalizer 505-j. Equalizer 505-j can be any kind of equalizer structure. Types of equalizer structures include linear equalizers, decision feedback equalizers, and sequence detection equalizers. Equalizers of these types for 100 or 1000 BASE-T Ethernet over category-5 wiring, 24 gauge twisted copper pair, are described in "Improved Detection for Digital Communication Receivers," U.S.

application Ser. No. 08/974,450, filed Nov. 20, 1997, Sreen A. Raghavan, assigned to the same assignee as the present application, herein incorporated by reference in its entirety; and "Simplified Equalizer for Twisted Pair Channel," U.S. application Ser. No. 09/020,628, filed Feb. 9, 1998, Sreen A. Raghavan, assigned to the same assignee as the present disclosure, herein incorporated by reference in its entirety.

Additionally, receivers of the type described above as receivers 501-1 through 501-N are further described in "Digital Baseline Wander Correction Circuit," U.S. application Ser. No. 09/151,525, filed Jul. 11, 1998, Sreen A. Raghavan; and U.S. patent application Ser. No. 09/161,346, "Cable Length and Quality Indicator", filed Sep. 25, 1998, Sreen A. Raghavan and Doug J. Easton, both of which have already been incorporated by reference.

In receiver system 500 of FIG. 5A, the output samples from each of receivers 501-1 through 501-N, $a'_{k,1}$ through $a'_{k,N}$, are input to decoder 507. Decoder 507 decides on a N-D symbol based on the samples from each of receivers 501-1 through 501-N. Each of the N 1-D symbols of the N-D symbol is the result of the N-D symbol pick in decoder 507.

Figure 6:
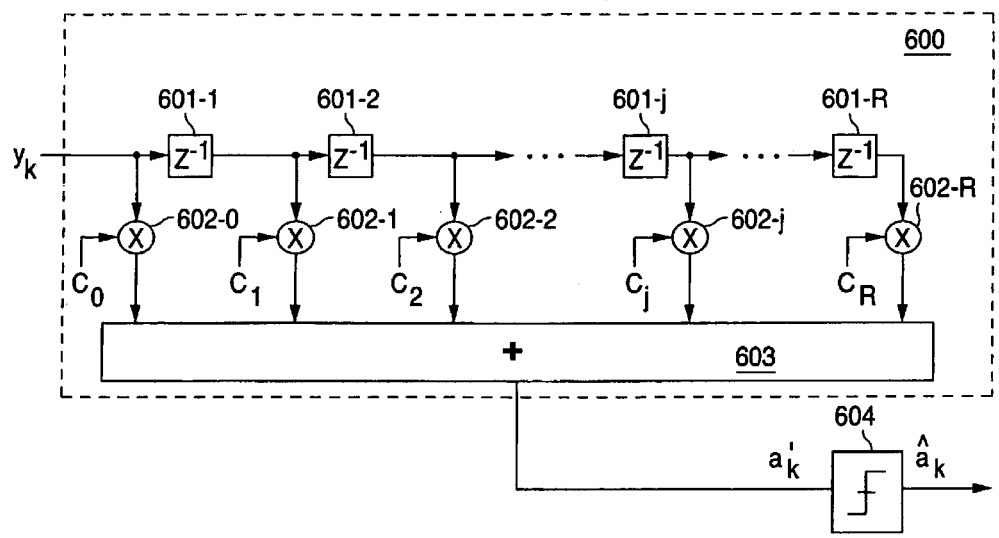
FIG. 6 shows a block diagram of a linear equalizer.

FIG. 6 shows a block diagram of a linear equalizer 600 having R+1 multipliers, where R is any integer greater than or equal to 0. Linear equalizer 600 includes delays 601-1 through 601-R connected in series. The output samples from each of delays 601-1 through 601-R is also input to multipliers 602-1 through 602-R, respectively. The input sample to equalizer 600 is input to multiplier 602-0. The input samples to multipliers 602-0 through 602-R are multiplied by the corresponding one of multiplier coefficients $C_0$ through $C_R$, respectively, and summed in adder 603. Multiplier coefficients $C_0$ through $C_R$ can be adaptively chosen to optimize the performance of equalizer 600. In FIG. 5B, for example, coefficient update 506-j adaptively chooses equalizer parameters for equalizer 505-j.

Equalizer 600 (FIG. 6) executes the transfer function $$T = C_0 + C_1 Z^{-1} + \ldots + C_j Z^{-j} + \ldots + C_R Z^{-R}. \quad (6)$$

For simplicity, the wire designation L has been neglected. It is understood that each transmission channel includes a separated equalizer, each of which can be one of equalizer 600 having its own transfer function T.

In a zero-forcing linear equalizer (ZFLE), the transfer function T is the inverse of the frequency response of the channel f(Z) (see Equation 2 with the wire designation L neglected). In a minimum mean squared error based linear equalizer (MMSE-LE), the transfer function is arranged to optimize the mean squared error between the transmitted data signal and the detected data symbols. A compromise, then, is found between the un-canceled ISI and the noise variance at the output terminal of the equalizer. (See B. SKLAR, DIGITAL COMMUNICATIONS, FUNDAMENTALS AND APPLICATIONS (PTR Prentice Hall, Englewood Cliffs, N.J., 1988)).

The output sample from linear equalizer 600, executing transfer function T, is given by $$a_k' = C_0 y_k + C_0 y_{k-1} + \ldots + C_j y_{k-j} + \ldots + C_R y_{k-R}, \quad (7)$$

where $C_0$ through $C_R$ are the equalizer coefficients, $Y_{k-j}$ is the input signal to equalizer 600 during the time period j periods before the kth period, and k represents the current time period.

The output sample from equalizer 600, $a_k'$, is usually input to a slicer 604 which decides, based on its input sample $a_k'$, what symbol $â_k'$ was transmitted during time period k. The symbol $â_k'$ is chosen from the symbol alphabet used for transferring data that is closest to input signal $a_k'$.

Figure 7:
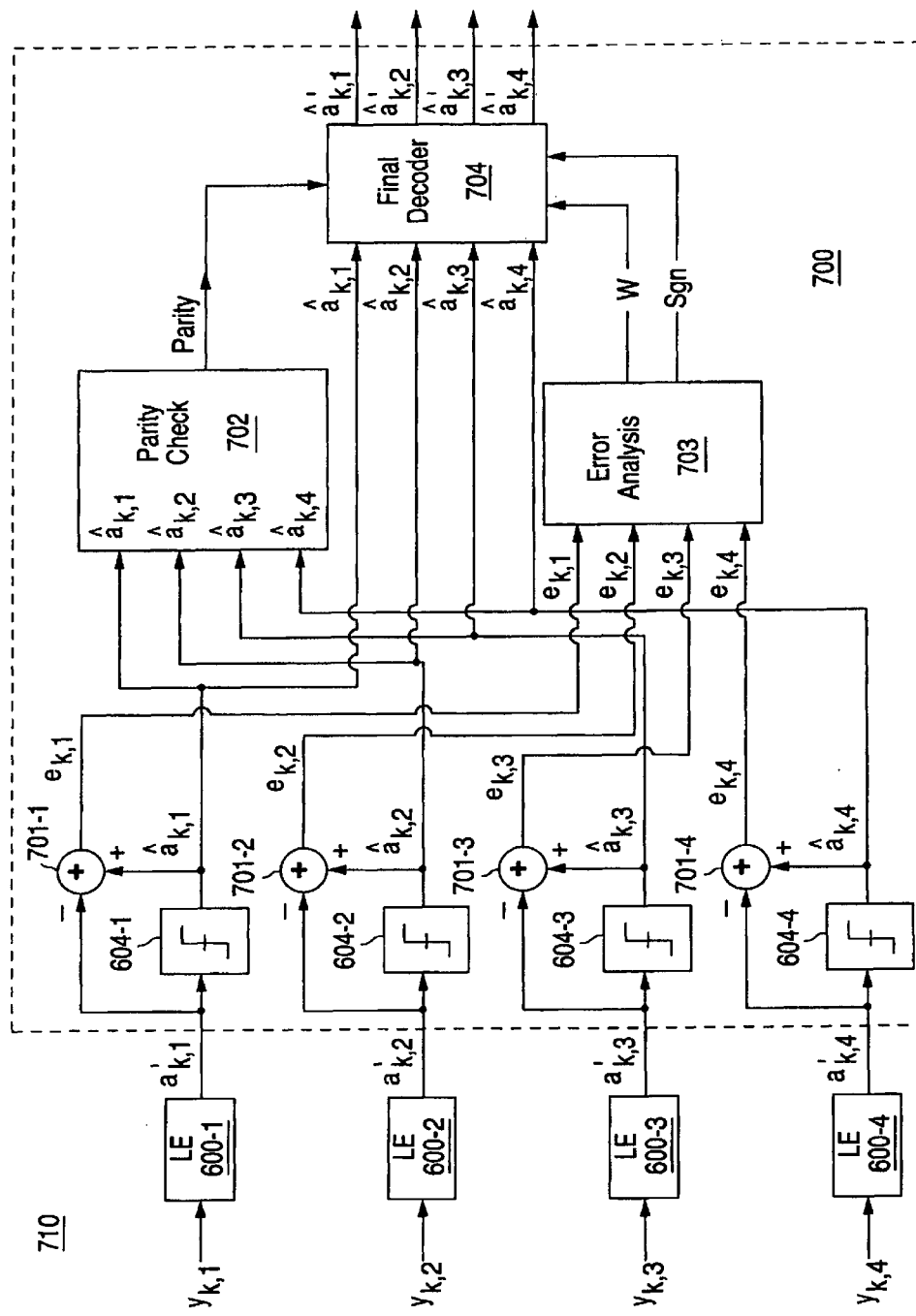
FIG. 7 shows a block diagram of the equalizer and decoder portions of a 4-D receiver system that includes linear equalizers and parity encoding.

A linear equalizer can be implemented using either parity coding or trellis coding systems. When linear equalization is used with parity coding, a separate linear equalizer is used on each transport wire. In FIG. 5A, for example, each of equalizers 505-1 through 505-N can include a linear equalizer. The output samples from each of equalizers 505-1 through 505-N is input to decoder 507, which chooses the most appropriate multi-dimensional (N-D) symbol As an example, FIG. 7 shows a portion of a 4-D receiver system 710, which includes 4-D decoder 700 and linear equalizers 600-1 through 600-4. Linear equalizers 600-1 through 600-4 provides equalization for each of channels 104-1 through 104-4, respectively. Decoder 700 can be any type of decoder including a parity code decoder and a 4-D trellis decoder. As an example, decoder 700 is shown as a parity code decoder. Also, although a 4-D decoder is shown in FIG. 7, it is understood that in general receiver system 710 can have any number of parallel input signals.

The input samples to linear equalizers 600-1 through 600-4, corresponding to the output samples from receiver/digitizer 502-1 through 502-4 (FIG. 5B), which is given by $y_{k,1}$ through $y_{k,4}$ samples, respectively. The subscripts 1–4 reference each of the four wires 103-1 through 103-4, respectively. The output samples from linear equalizers 600-1 through 600-4 are given by $a_{k,1}'$ through $a_{k,4}'$, respectively, and are input to slicers 604-1 through 604-4, respectively. In FIG. 7, slicers 604-1 through 604-4 are 1-D slicers. If PAM-5 symbol coding is utilized, then slicers 604-1 through 604-4 are 1-D PAM-5 slicers that each output the PAM-5 symbol closest to input sample $a_{k,1}'$ through $a_{k,4}'$, respectively.

The output symbols from slicers 604-1 through 604-4, $â_{k,1}$ through $â_{k,4}$, respectively, are input to parity check 702. Additionally, each of samples $a_{k,1}'$ through $â_{k,4}$ is subtracted from the corresponding one of symbols $â_{k,1}$ through $â_{k,4}$, respectively, in adders 701-1 through 701-4, respectively, to calculate errors $e_{k,1}$ through $e_{k,4}$, respectively. In general, then, the error signal $e_{k,i}$, where i is 1 through 4, is given by $$e_{k,i} = a_{k,i}' - â_{k,i}. \quad (8)$$

The parity of the 4-D symbol that results from the four 1D symbols is checked in parity check 702. In parity coding, the 4D symbol is chosen from an even subset of all 4-D symbols. Therefore, if PAM-5 coding is used, there are an even number of PAM-5 symbols from family X (odd symbols) and an even number from family Y (even symbols). Parity check 702 checks the parity of the four input symbols, $â_{k,1}$ through $â_{k,4}$, by determining whether the sum of the four symbols is even or not. An odd parity indicates that there is an error in at least one of the decided symbols $â_{k,1}$ through $â_{k,4}$. The result of the parity check is input to final decoder 704.

The calculated error signals $e_{k,1}$ through $e_{k,4}$ are input to error analysis 703. Error analysis 703 determines which of the four error signals $e_{k,1}$ through $e_{k,4}$ is greatest and the sign of that error. Error analysis 703 outputs a sign signal (sgn) and an identifier for the symbol having the greatest error (W).

Final decoder 704 inputs the parity signal from parity check 702, the four 1-D PAM-5 symbols from slicers 604-1 through 604-4, $â_{k,1}$ through $â_{k,4}$, respectively, the identifier for the symbol having the greatest error, W, and the sign of that error, sgn, and outputs the PAM-5 symbols $â_{k,1}'$ through $â_{k,4}'$ in response. If the parity is even, then the 4-D symbol defined by $â_{k,1}'$ through $â_{k,4}'$ is given by $â_{k,1}$ through $â_{k,4}$, respectively. The parity coding scheme, therefore, will pass erroneous 4D symbols containing simultaneous errors in two of the 1-D symbols.

If the parity is odd, however, the results of error analysis 703 are used to correct the output symbols. Because the symbol having the greatest error is the one that is most likely incorrect, the value of the symbol indicated by identifier W is corrected by either increasing or decreasing that symbol by one symbol in the symbol alphabet in response to the sign of the error (in this example, increased for a positive sign and decreased for a negative sign). The new set of four symbols, the three uncorrected symbols having the lowest error and the corrected symbol, is output as the 4-D symbol defined by $\hat{a}_{k,1}'$ through $\hat{a}_{k,4}'$.

Although simple to implement, the primary disadvantage of a linear equalizer is that, while removing the ISI from the input signal, it may cause the random noise to be enhanced. This is especially true in twisted copper pair channels where the frequency response of the channel has significant attenuation across the transmitted signal bandwidth. Hence, in twisted-pair channels, such as is used with gigabit ethernet, linear equalization often does not perform well enough to be practical.

Figure 8:
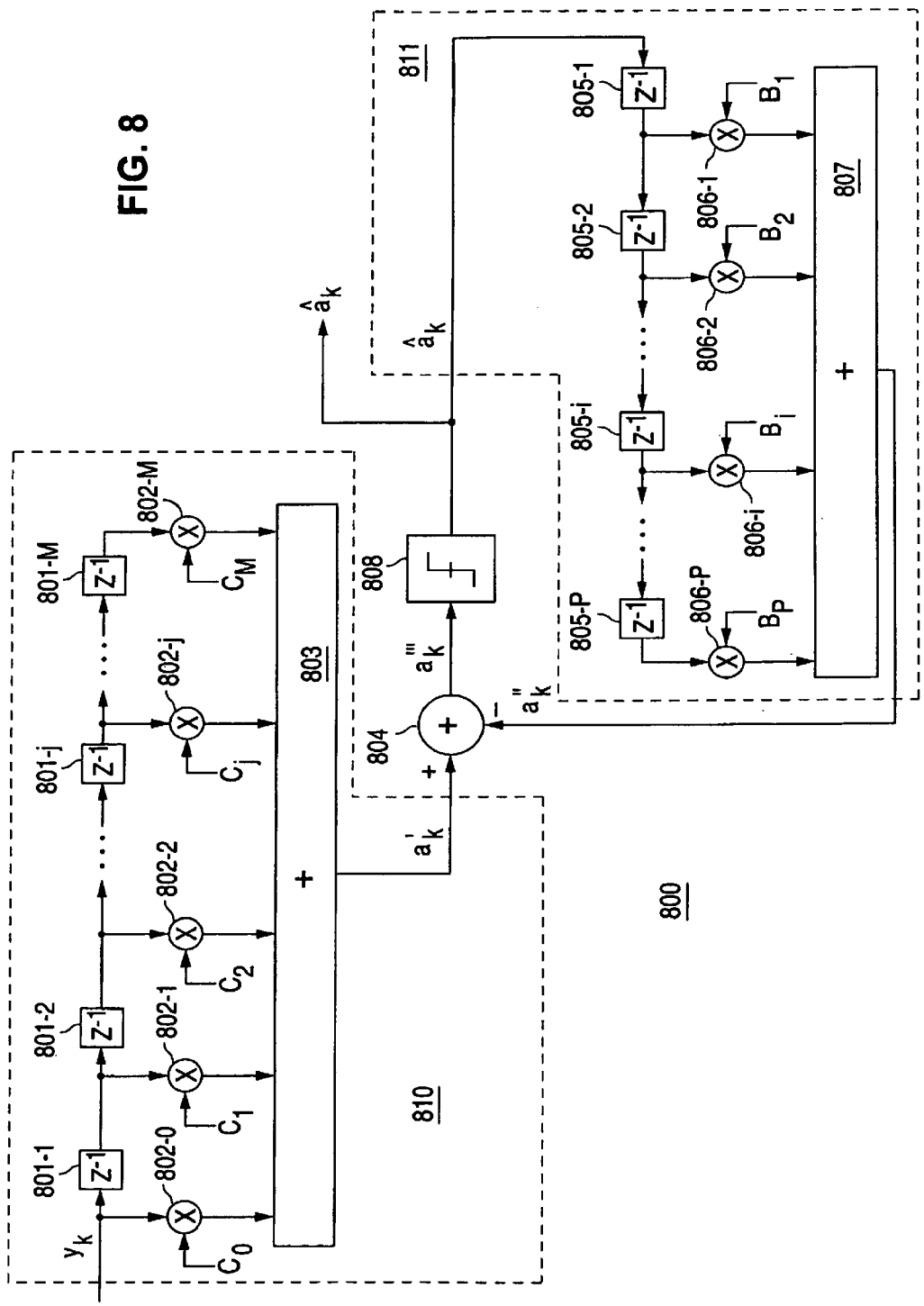
FIG. 8 shows a block diagram of a decision feedback equalizer.

FIG. 8 shows a decision feedback equalizer 800. Decision feedback equalizer 800 includes a feed-forward section 810, a feedback section 811 and adder 804. Feedforward section includes delays 801-1 through 801-M coupled in series, multipliers 802-1 through 802-M coupled to receive the output signals from delays 801-1 through 801-M, respectively, multiplier 802-0 coupled to receive the input sample to decision feedback equalizer 800, and adder 803 coupled to receive the output signals from each of multipliers 802-0 through 802-M. The output signal from each of multipliers 802-0 through 802-M is the input signal to that multiplier multiplied by the corresponding one of feedforward multiplier coefficients $C_0$ through $C_M$. Feedforward multiplier coefficients $C_0$ through $C_M$ can be adaptively chosen in order to optimize the performance of the equalizer. In FIG. 5B, for example, coefficient update 506-j adaptively chooses equalizer coefficients to optimize the performance of receiver 501-j.

Adder 803 (FIG. 8) sums the output signals from each of multipliers 802-0 through 802-M. Feedforward section 810, therefore, executes the transfer function $$T_{FF}=C_0+C_1Z^{-1}+\ldots+C_jZ^{-j}+\ldots+C_MZ^{-M}. \quad (9)$$

The output signal from feedforward section 810, therefore, is given by $$a_k'=C_0y_k+C_1y_{k-1}+\ldots+C_jy_{k-j}+\ldots+C_My_{k-M}, \quad (10)$$

where $y_{k-j}$ is the input sample to equalizer 800 during the (k-j)th time period. Again, the wire designation has been neglected for simplicity and it is understood that each of receivers 501-1 through 501-N (FIG. 5) includes an equalizer 505-1 through 505-N, respectively, any of which can be a decision feedback equalizer 800 (FIG. 8).

One embodiment of feedback section 811 includes delays 805-1 through 805-P coupled in series. Multipliers 806-1 through 806-P are coupled to receive the corresponding output signals from delays 805-1 through 805-P, respectively. Multipliers 806-1 through 806-P multiply each of their input signals by the corresponding one of feedback multiplier coefficients $B_1$ through $B_p$, respectively. Feedback coefficients $B_1$ through $B_p$ also can be adaptively chosen. Adder 807 sums the output signals from each of multipliers 806-1 through 806-P. Feedback section 811, therefore, executes the transfer function $$T_{FB}=B_1Z^{-1}+B_2Z^{-2}+\ldots+B_pZ^{-P}. \quad (11)$$

Because the input signal to feedback section 811 is symbol $\hat{a}_k$, the output signal from feedback section 811 is given by $$a_k''=B_1\hat{a}_{k-1}+B_2\hat{a}_{k-2}+\ldots+B_N\hat{a}_{k-P}. \quad (12)$$

A second embodiment of feedback section 811, which is later discussed in this disclosure, is shown as feedback section 1905 in FIG. 19 and includes look-up table 1906.

The output signal from feedback section 811, $a_k''$, is subtracted from the output signal from feedforward section 810, $a_k'$, in adder 804. The input signal to slicer 808, then, is given by $$a_k'''a_k'-a_k''. \quad (13)$$

Slicer 808 outputs the symbol $\hat{a}_k$ that is closest to the input signal $a_k'''$.

A decision feedback equalizer operates on the principle that if the past transmitted data is correctly detected, then the ISI effects of these past data symbols can be canceled from the currently received sample. As such, often feedforward section 810 contains no multipliers (i.e., $C_0=1$ and all other coefficients are 0) and $a_k'=y_k$, the input sample.

Past detected data samples contain no noise and therefore decision feedback equalizers do not suffer from noise enhancement. However, decision feedback equalizers do suffer from the effects of error propagation. If slicer 808 erroneously decides a previous symbol, the error will be propagated into subsequent decisions.

Figure 9:
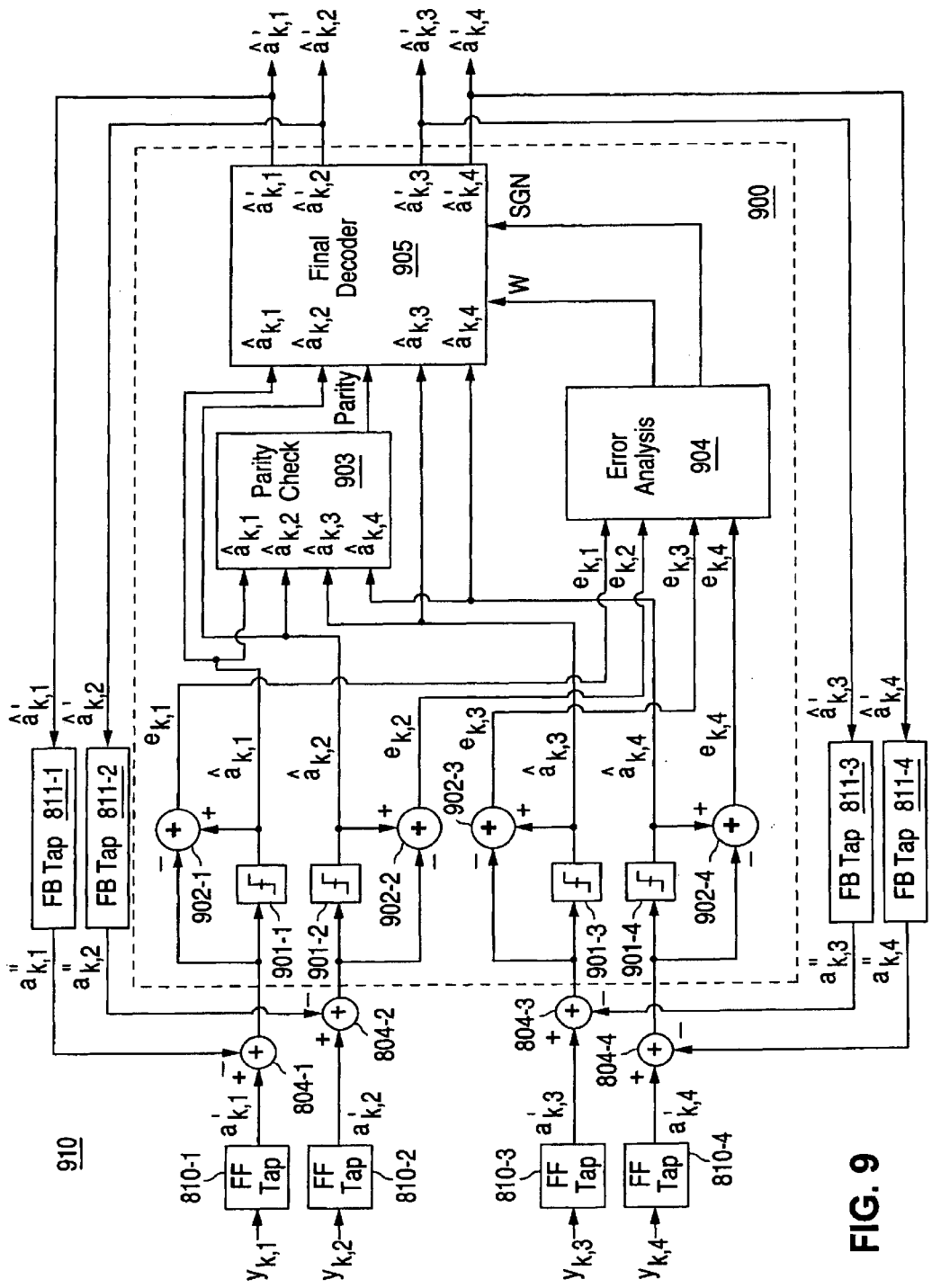
FIG. 9 shows a block diagram of the equalizer and decoder portions of a 4-D receiver system that includes decision feedback equalization.

FIG. 9 shows the equalization and decoder sections (see Equalizers 505-1 through 505-4 and decoder 507 of FIG. 5, for example) of a 4D receiver 910. The equalization is accomplished using four decision feedback equalizers, one for each of the four input channels shown. Again, one skilled in the art will recognize that a receiver can have any number of input channels and that a 4-D receiver is shown here for example only. In FIG. 9, receiver 910 includes 4-D decoder 900. Although decoder 900 is shown as a Parity code decoder, it is understood that decoder 900 can be any 4-D decoder. One skilled in the art will recognize that 4-D decoder 900 must correct symbols within a single clock cycle so that the results can be fed back through FB taps 811-1 through 811-4 to correct symbols $a_{k,1}'$ through $a_{k,4}'$, respectively.

The equalization for channel 104-1, for example, is accomplished by feedforward section 810-1, feedback section 811-1, and adder 804-1. Similarly, channels 104-2 through 104-4, each includes the corresponding ones of feedforward taps 810-2 through 810-4, respectively, feedback taps 811-2 through 811-4, respectively, and adders 804-2 through 804-4, respectively.

Samples $y_{k,1}$ through $y_{k,4}$ originate from receiver input signals received from channels 104-1 through 104-4, respectively. Samples $y_{k,1}$ through $y_{k,4}$ are received into feedforward taps 810-1 through 810-4, respectively. The symbol outputs from decoder 900, $\hat{a}_{k,1}'$ through $\hat{a}_{k,4}'$, corresponding to a single 4-D symbol, are input to feedback taps 811-1 through 811-4, respectively. As was discussed with relation to FIG. 8, the output signals from each of feedback sections 811-1 through 811-4, $a_{k,1}''$ through $a_{k,4}''$, respectively, is subtracted from the corresponding one of the output signals from feedforward sections 810-1 through 810-4, $a_{k,1}'$ through $a_{k,4}'$, respectively, in adders 804-1 through 804-4, respectively. The output signals from adders 804-1 through 804-4, $a_{k,1}'''$ through $a_{k,4}'''$, respectively, are inputted to decoder 900.

In an embodiment where decoder 900 is a 4-D parity code decoder, the input signals to decoder 900, $a_{k,1}'''$ through $a_{k,4}'''$, are received by slicers 901-1 through 901-4, respectively. Each of slicers 901-1 through 901-4 decides on an output symbol, $\hat{a}_{k,1}$ through $\hat{a}_{k,4}$, respectively, based on its corresponding input signal, $a_{k,1}'''$ through $a_{k,4}'''$, respectively. The output symbols from slicers 901-1 through 901-4 are inputted to parity check 903 and final decoder 905.

Parity check 903 sums the 1D symbols $\hat{a}_{k,1}$ through $\hat{a}_{k,4}$ and determines whether the 4D symbol is of even parity or odd parity. In parity coding using PAM-5 symbols, the 4D symbol is chosen from an even subset and therefore each 4D symbol includes an even number of 1-D PAM-5 symbols from family X (odd parity) and an even number from family Y (even parity). Therefore, the sum of the 1-D PAM-5 symbols is even. If the parity of the 4-D symbol is even, then final decoder 905 outputs the symbols $\hat{a}_{k,1}$ through $\hat{a}_{k,4}$ as output symbols $\hat{a}_{k,1}'$ through $\hat{a}_{k,4}'$.

Error signals $e_{k,1}$ through $e_{k,4}$ are calculated in adders 902-1 through 902-4, respectively, by, in each of the transport channels, taking the difference between the output symbol of slicers 901-1 through 901-4, $\hat{a}_{k,1}$ through $\hat{a}_{k,4}$, respectively, and the corresponding one of the input signals, $a_{k,1}'''$ through $a_{k,4}'''$, respectively:

$$e_{k,i} = a_{k,i}''' - \hat{a}_{k,i}, \quad i=1, 2, 3 \text{ or } 4. \quad (14)$$

The error signals at each of slicers 901-1 through 901-4 are input to error analysis 904. Error analysis 904 determines which of the symbols $\hat{a}_{k,1}$ through $\hat{a}_{k,4}$ is associated with the largest error signal $e_{k,1}$ through $e_{k,4}$, respectively, and the sign of the largest error. Error analysis 904 outputs an identifier of the symbol having the largest absolute error, W, and the sign of that error, SGN, to final decoder 905. If the parity signal indicates odd parity, the erroneous symbol is most likely to be the one with the largest error, indicated by identifier W. Final decoder 905, then, adjusts the symbol having the largest error up or down the symbol alphabet by one symbol depending on the sign SGN (in this example, up if the sign is positive and down if the sign is negative) and outputs the resulting 4-D output symbol defined by $\hat{a}_{k,1}'$ through $\hat{a}_{k,4}'$.

The combination of N-D trellis code encoding with a DFE architecture requires a DFE on all four wires for each state within the trellis (see, e.g., FIG. 3). The DFE output at a particular state is used for parallel branch decisions and branch metric computation for the branches leaving that state. The equalization in this situation uses a process called "per survivor processing", described more fully in Riccardo Raheli, Andreas Polydoros, Ching-Kai Tzou, "Per-Survivor Processing: A General Approach to MLSE in Uncertain Environments," IEEE Trans. Commun., Vol. 43, No. 2/3/4, pp. 354–364, February/March/April 1995, incorporated by reference in its entirety, to determine the feedback symbols.

The multiple decision feedback equalizers in the trellis decoder helps to minimize the effects of error propagation. However, a DFE architecture suffers from the disadvantage that it does not utilize the sample power contained in the intersymbol interference caused by the dispersion in the channel. More particularly, information about a 1-D symbol being transmitted during a time period k is contained in future received 1-D symbols from that channel and DFE does not utilize this signal power in deciding the currently received symbol.

A third type of equalization, sequence detection, does not suffer the performance degradation of either a linear equalizer or a decision feedback equalizer. However, a typical sequence detector produces hard outputs that can severely limit the performance of an error correction code. According to the present invention, a soft-output sequence detector is provided.

Figure 10:
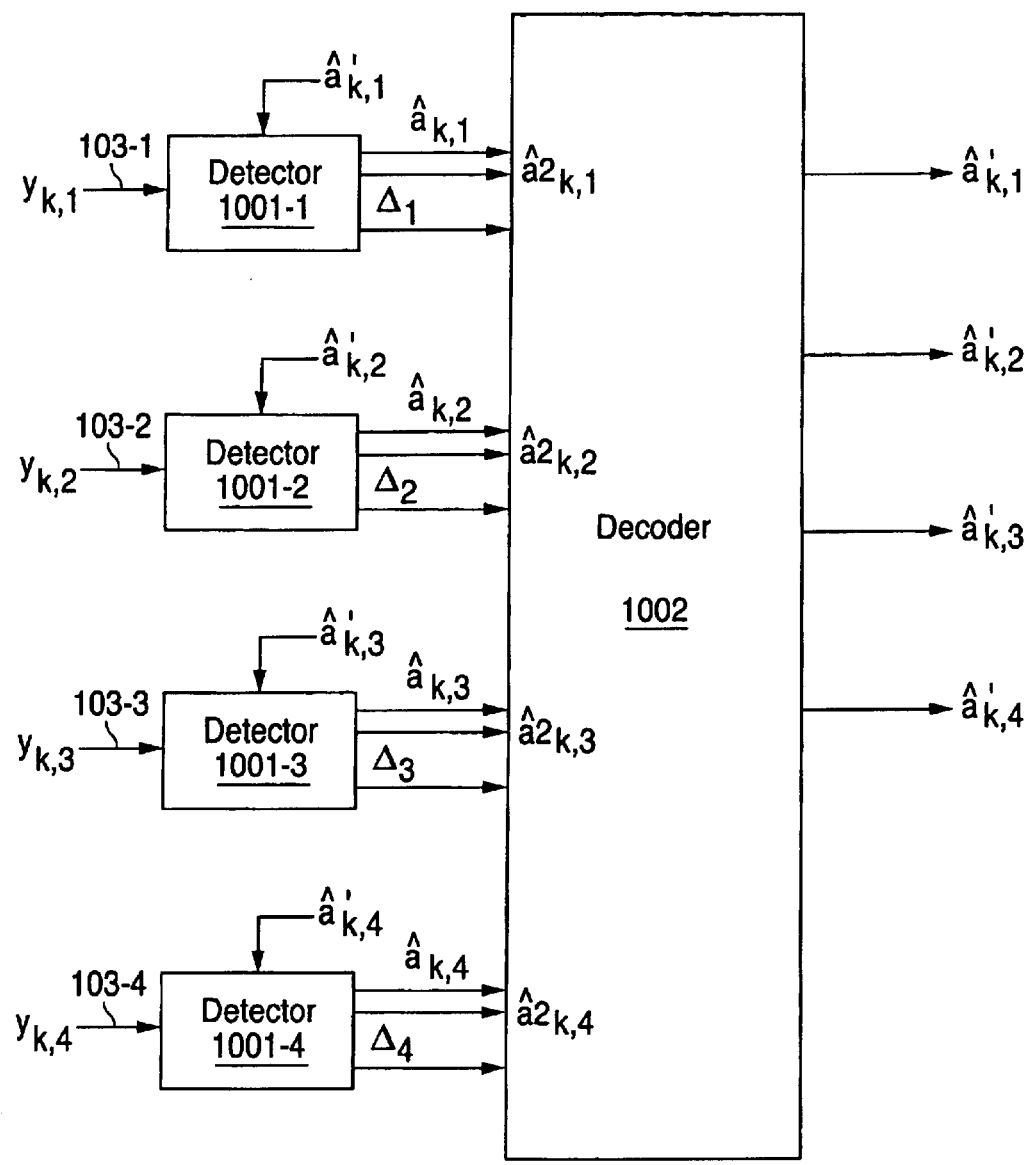
FIG. 10 shows a block diagram of a 4-D receiver system that includes sequence detection equalizers.

As an example, FIG. 10 shows a portion of a 4-D receiver utilizing sequence detection according to the present invention. The receiver shown in FIG. 10 includes sequence detectors 1001-1 through 1001-4, one for each of the four transmission channels corresponding to wires 103-1 through 103-4. One skilled in the art will recognize that a receiver can include any number N of transmission channels, each of the transmission channels providing signals to one of N detectors. Some or all of the N detectors can be sequence detectors.

The output samples from sequence detectors 1001-1 through 1001-4, $\hat{a}_{k,1}$ through $\hat{a}_{k,4}$, respectively, along with the second best output samples, $\hat{a}2_{k,1}$ through $a2_{k,4}$, and the errors $\Delta_1$ through $\Delta_4$ are input to decoder 1002. Decoder 1002 decides on the receiver output samples, $\hat{a}_{k,1}$ through $\hat{a}_{k,4}$, based on, for example, the parity coding scheme or the N-D lattice coding scheme. One skilled in the art will recognize that the decision of decoder 1002 can be based on any coding scheme that can correct errors in one clock cycle. Feedback is provided to sequence detectors 1001-1 through 1001-4 so that future sequences are decided using the results of the N-D decisions.

Figures 11A, 11B:
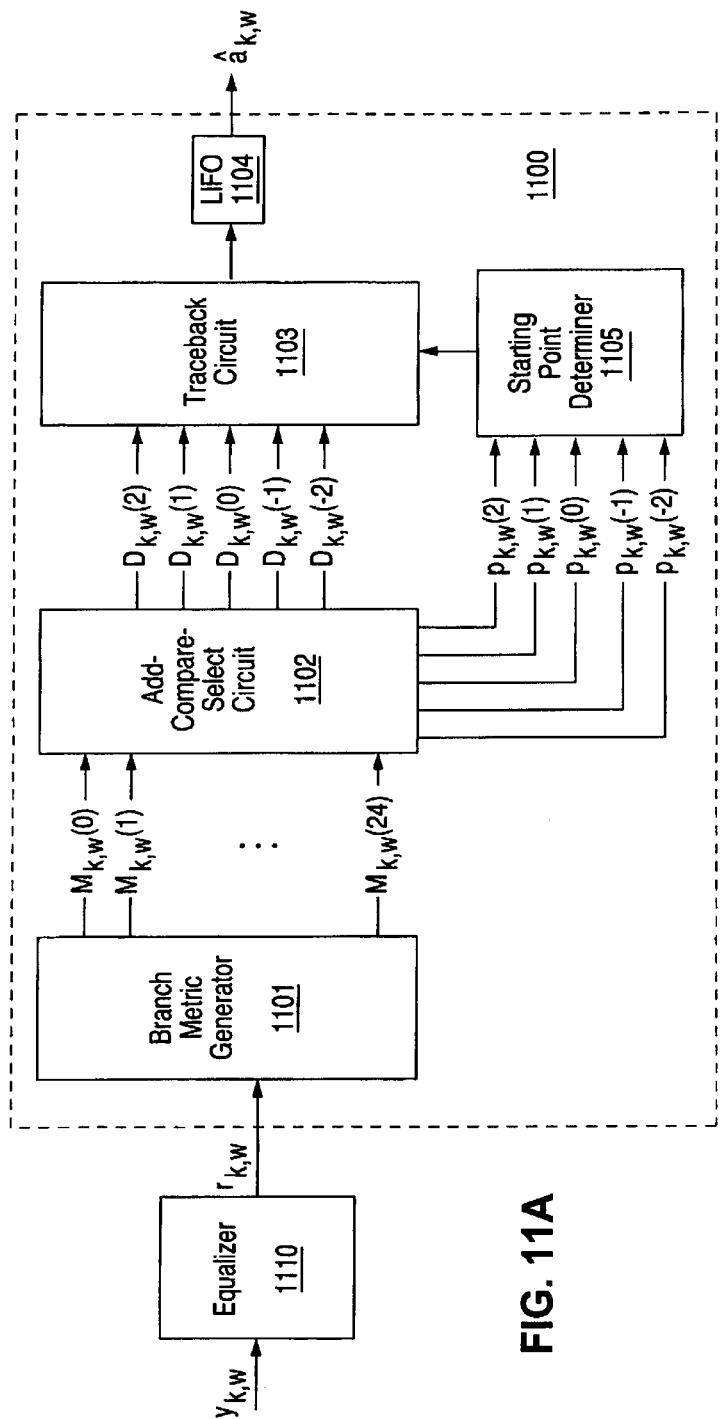
FIG. 11A shows a block diagram of a sequence detector.
FIG. 11B shows a block diagram of an embodiment of an equalizer system.

FIG. 11A shows a block diagram of a sequence detector 1100 for the PAM-5 symbol alphabet, $\{A\}=\{+2, +1, 0, -1, -2\}$, where the intersymbol interference includes the effects of only one other symbol, i.e., the ISI length $\delta$ is one (1). In general, sequence detector 1100 can utilize any alphabet and any number of ISI symbols (A>2 and $\delta$>1). Detector 1100 includes a Branch Metric Generator 1101, an Add-Compare-Select (ACS) unit 1102, Traceback Circuitry 1103, a Last-In-First-Out (LIFO) buffer 1104, and a starting point determiner 1105. Sequence detectors are discussed in U.S. patent application Ser. No. 08/974,459, "Detection for Digital Communication Receivers," to Sreen Raghavan, which has been previously incorporated by reference in this application.

Figure 11A:
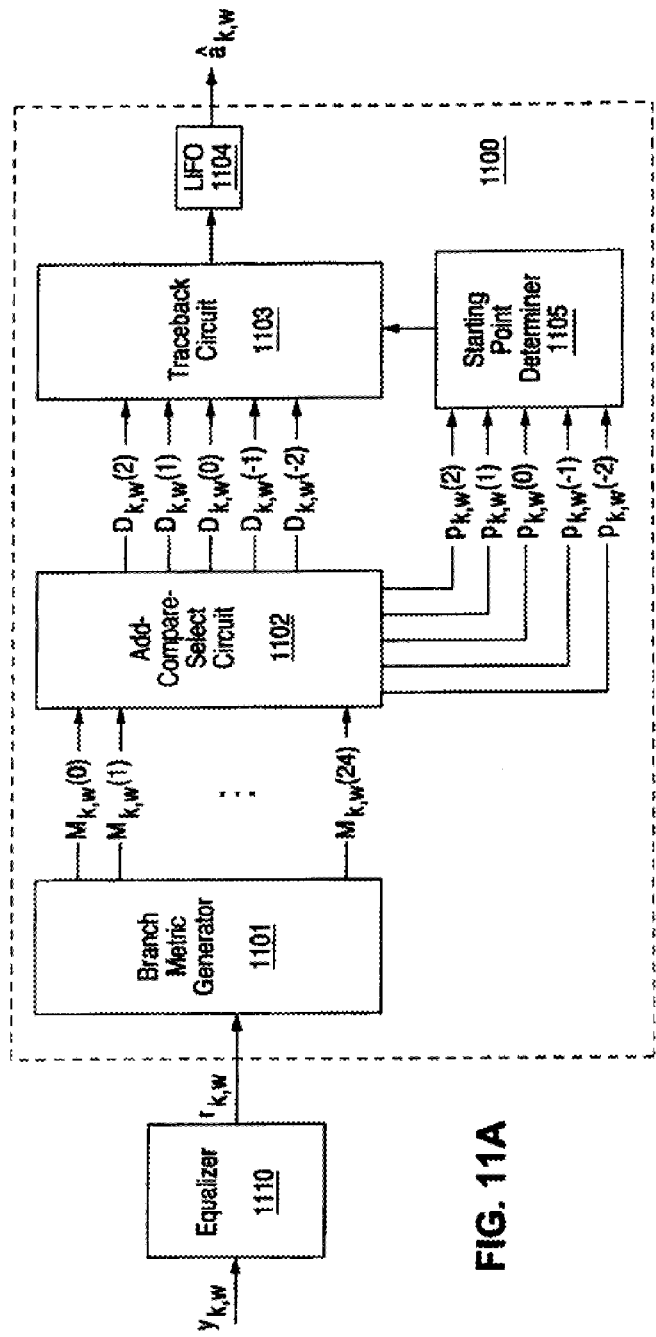
Figure 11B:
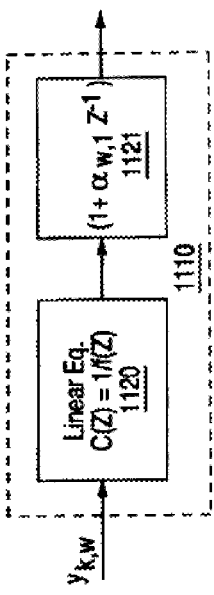
Figure 13:
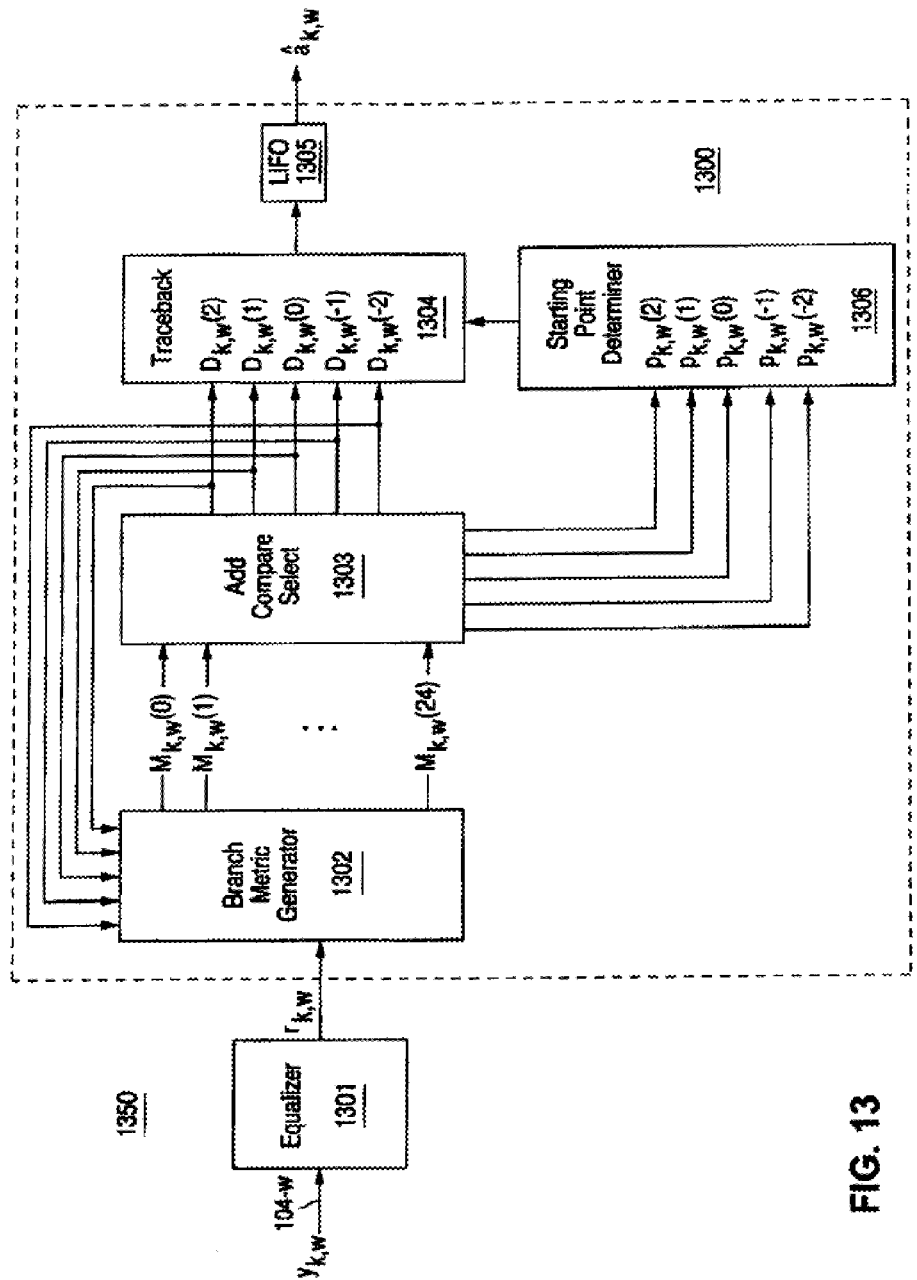
Figure 14:
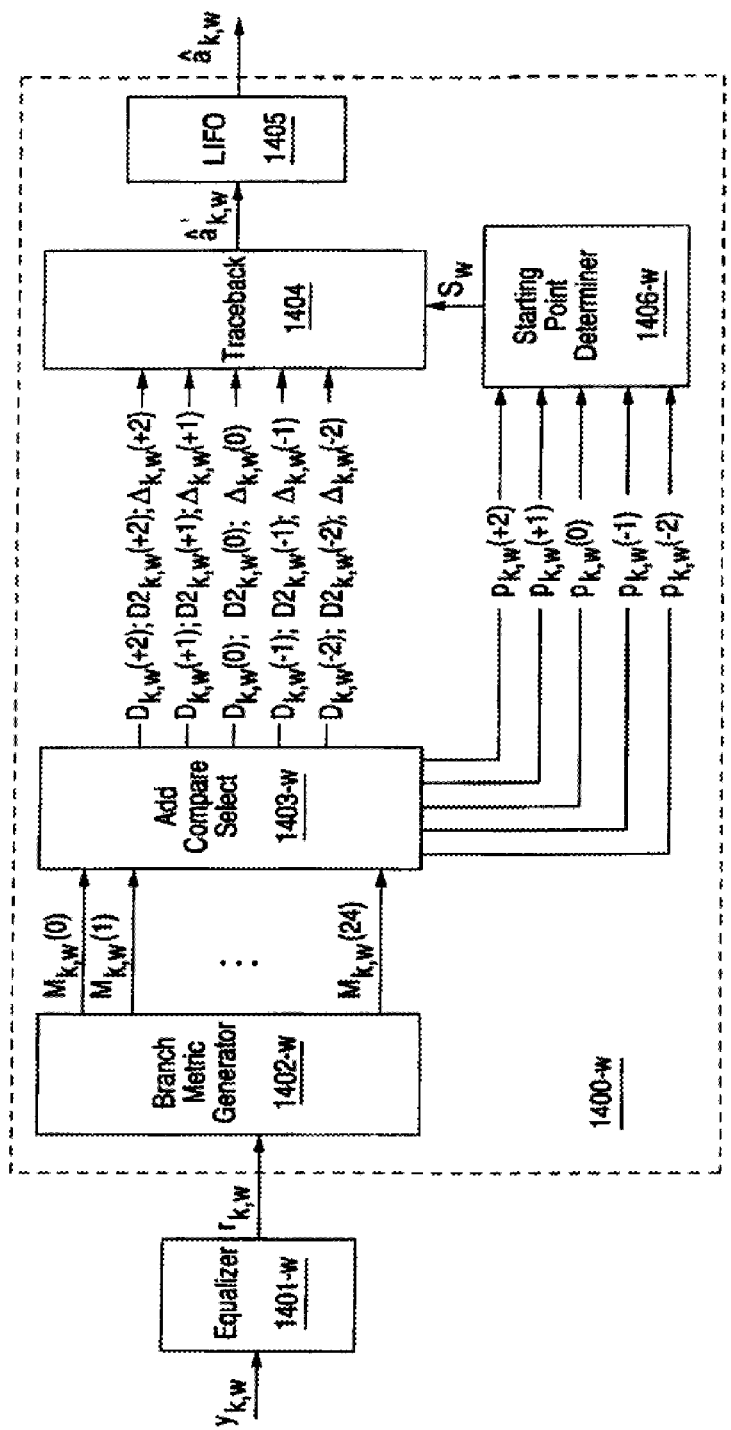
Figure 15:
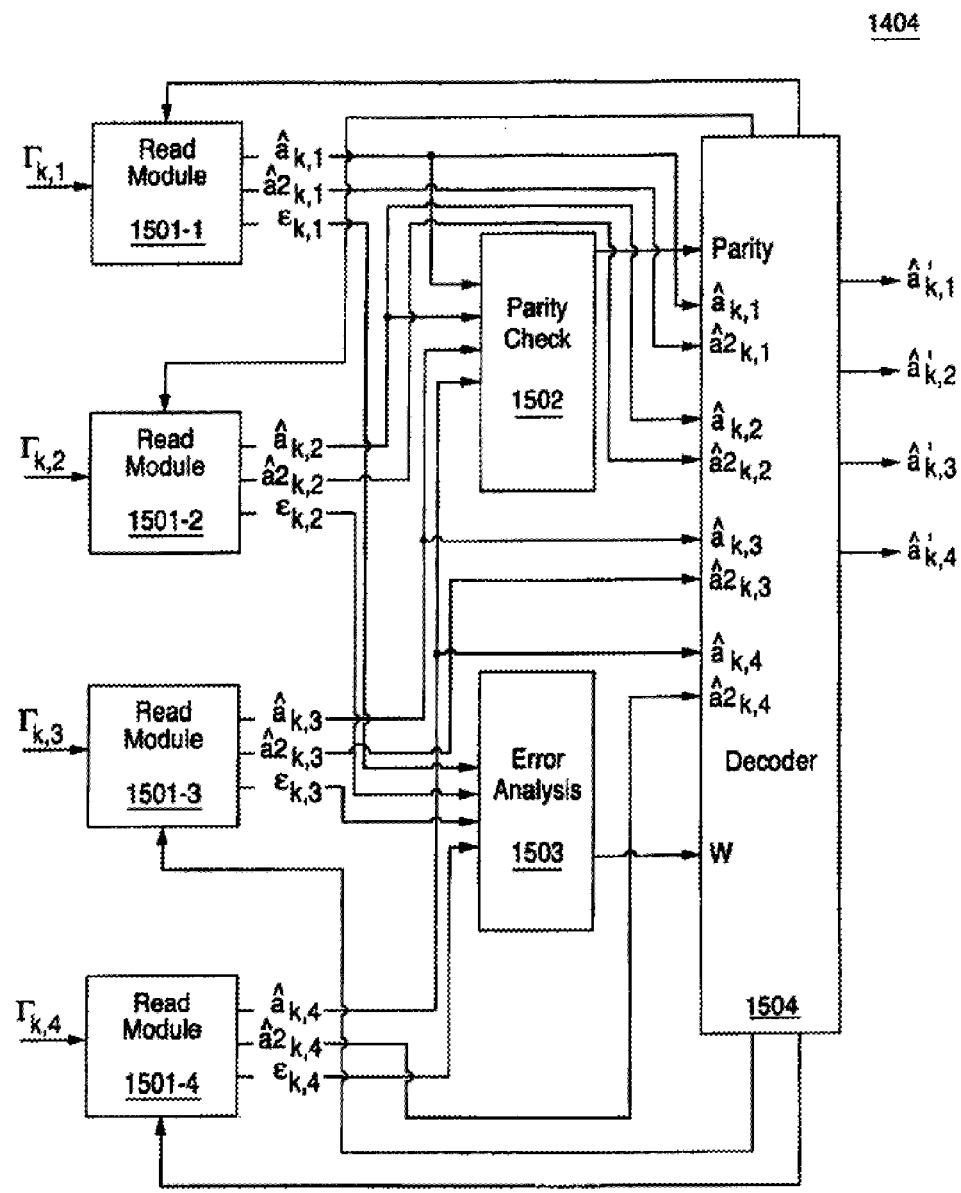
Figure 16:
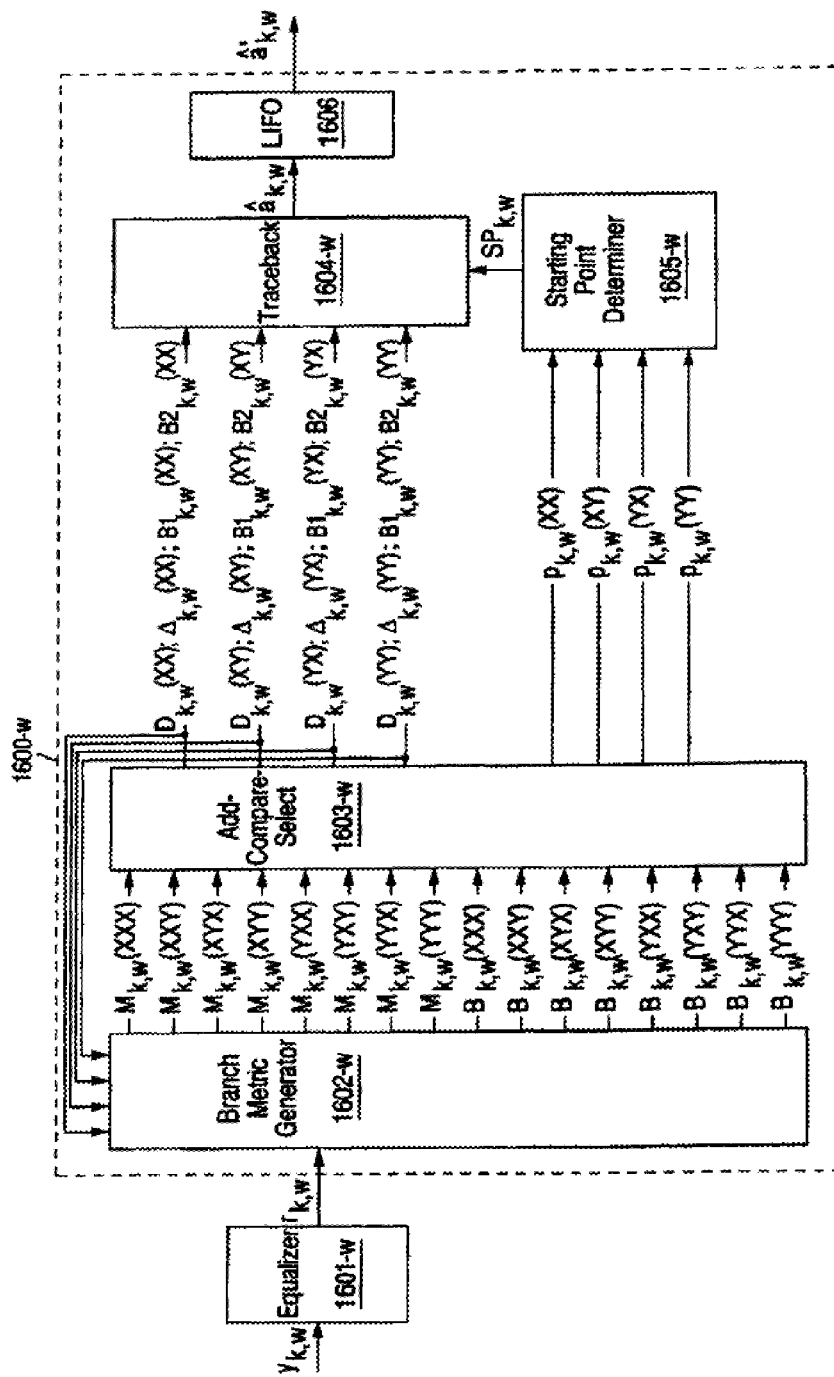
Figure 17:
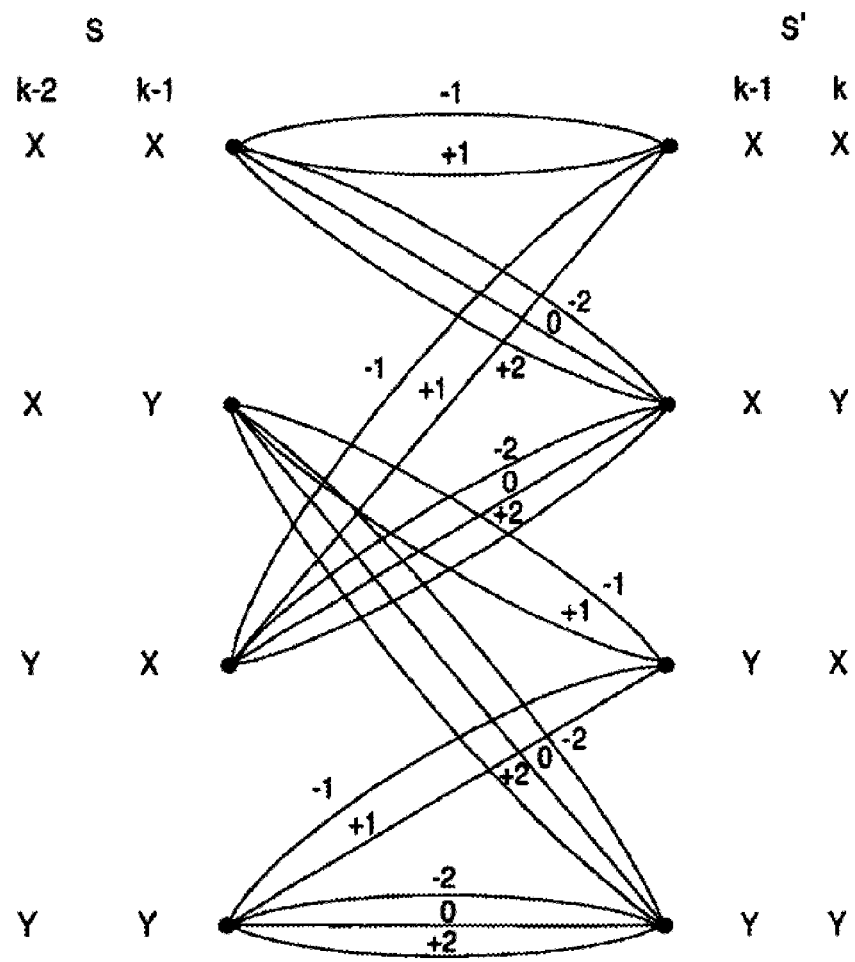
Figure 18:
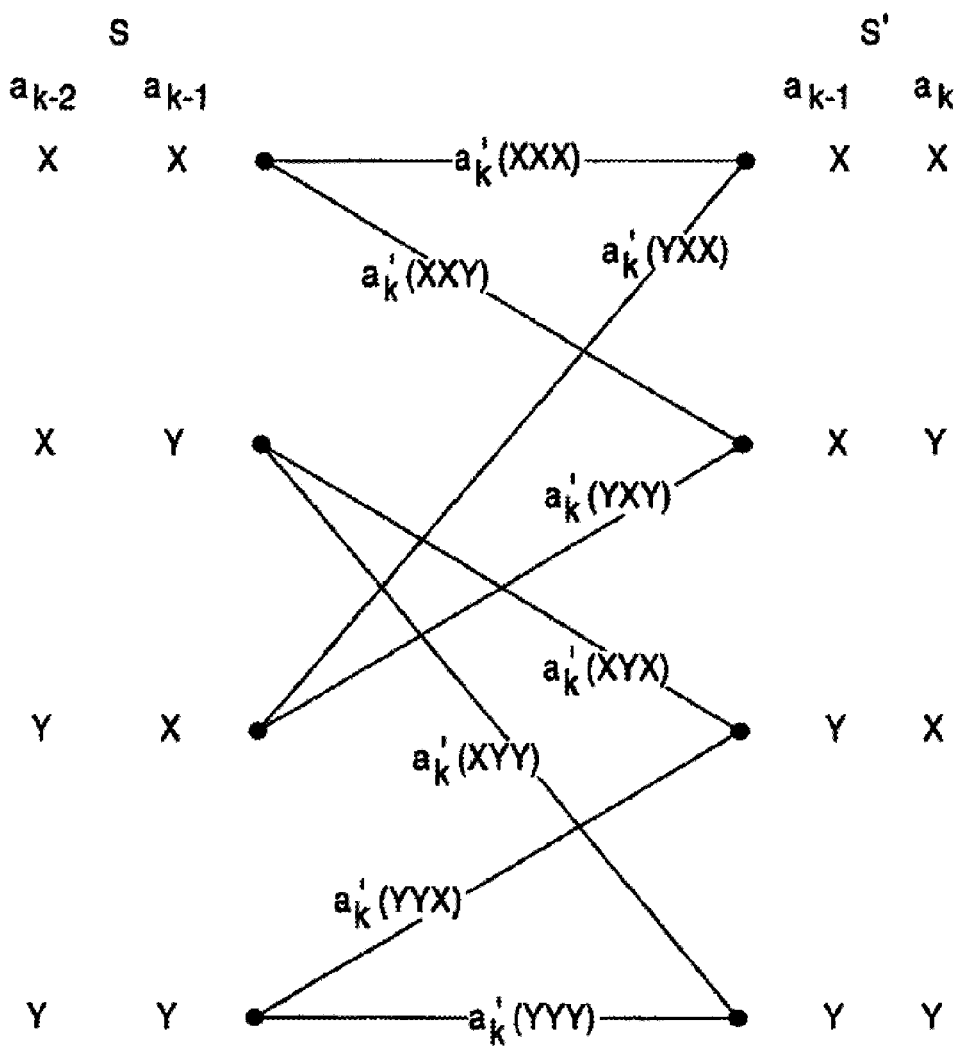

The ISI addressed by the embodiment of detector 1100 shown in FIG. 11 is caused by just one previously transmitted symbol. Thus, the input sample to sequence detectors 1100 is given by $$r_{k,w} = a_{k,w} + \alpha_1 a_{k-1,w} + h_{k,w}, \quad (15)$$

where, $\alpha_{1,w}$ is the equalizer ISI coefficient, $h_{k,w}$ is the noise component of the output signal from the linear filter over wire w and $a_{k,w}$ is the transmitted symbol over wire w received in time period k. The sequence detector estimates the transmitted data sequence $\{a_{k,w}\}$ from the sequence of received samples $\{r_{k,w}\}$.

The state of detector 1100, $S_{k,w}$, is defined as the past data symbol estimates. In general, a system with a symbol alphabet having A symbols and which suffers intersymbol interference from $\delta$ previous symbols will have $A^\delta$ possible states. Each state corresponds to a possible transition path through the $\delta$ previous symbols. For example, a system using a symbol alphabet with two symbols, $\{A\}=\{+1, -1\}$, and suffering ISI from two past symbols, $\delta$=2, will have four possible sequence states of the system: symbol +1 at time k−2 and symbol +1 at time k−1; symbol +1 at time k−2 and symbol −1 at time k−1; symbol −1 at time k−2 and symbol +1 at time k-l; and symbol −1 at time k−2 and symbol −1 at time k−1. Sequence detector 1100 for the example embodiment shown in FIG. 11A, a PAM-5 symbol alphabet with ISI resulting from one symbol, has five states—+2, +1, 0, −1, and −2—corresponding to the five symbols in the PAM-5 alphabet $\{A\}$.

A trellis diagram depicting a state transition from time (k−1) to time k for sequence detector 1100 is shown in FIG.

12. A trellis diagram provides a graphical mechanism for predicting what the signal output would be for the channel in transitions from one state in time k−1 to another state at time k. As an example, from Equation 15 above, and neglecting noise, a transition from state +2 at time k−1 to a state +1 at time k results in a signal input to sequence detector 1100 of $1+2\alpha_{w,1}$.

Figure 12:
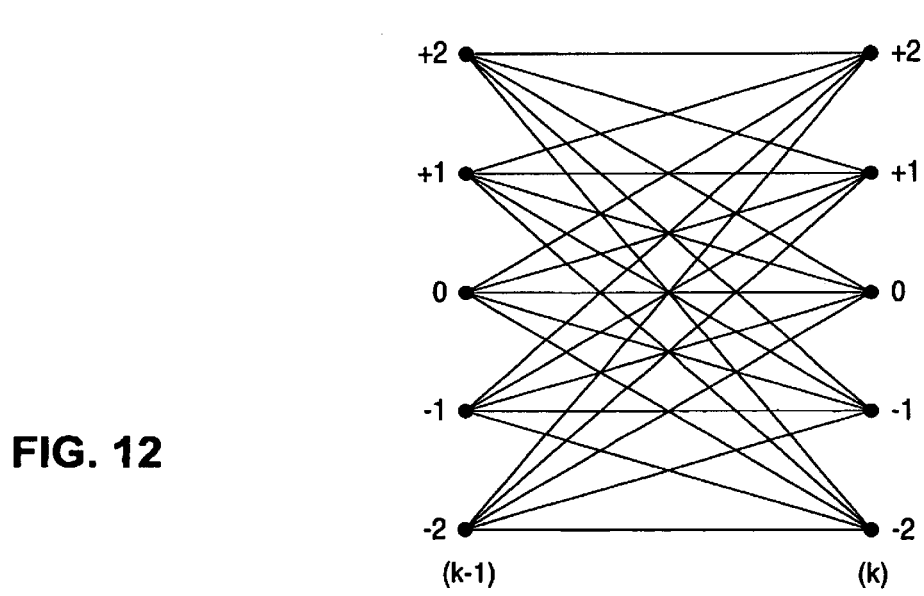
FIG. 12 shows an example of a trellis diagram for state transitions between PAM-5 symbols.

In sequence detector 1100 shown in FIG. 11A, a branch metric generator 1101 generates distance metrics corresponding to the branches illustrated in the trellis diagram of FIG. 12. The distance metrics represent the difference between the input signal to branch metric generator 1101, $r_{k,w}$, and the calculated signal that is expected to be observed in each of the allowed transitions of a trellis diagram: In general, if there are $A^\delta$ states of sequence detector 1100 then there are $A^{\delta+1}$ branch metrics to calculate. In some embodiments, however, not all branches are allowed and therefore the number of branch metrics is reduced.

For PAM-5 signaling suffering from one ISI symbol, there are twenty five (25) distance metrics $M_{k,w}$. The twenty five (25) distance metrics generated by branch metric generator 1101 for the case where ISI is the result of one past symbol and neglecting random noise (i.e. A=5, $\delta=1$ and $f_w(z)=1+\alpha_{w,1}z^{-1}$) are given by:

$$M_{k,w}(0)=[r_{k,w}-(-2-2\alpha_{w,1})]^2;$$
$$M_{k,w}(1)=[r_{k,w}-(-2-\alpha_{w,1})]^2;$$
$$M_{k,w}(2)=[r_{k,w}-(-2)]^2;$$
$$M_{k,w}(3)=[r_{k,w}-(-2+\alpha_{w,1})]^2;$$
$$M_{k,w}(4)=[r_{k,w}-(-2+2\alpha_{w,1})]^2;$$
$$M_{k,w}(5)=[r_{k,w}-(-1-2\alpha_{w,1})]^2;$$
$$M_{k,w}(6)=[r_{k,w}-(-1-\alpha_{w,1})]^2;$$
$$M_{k,w}(7)=[r_{k,w}-(-2)]^2;$$
$$M_{k,w}(8)=[r_{k,w}-(-1+\alpha_{w,1})]^2;$$
$$M_{k,w}(9)=[r_{k,w}-(-1+2\alpha_{w,1})]^2;$$
$$M_{k,w}(10)=[r_{k,w}-(-2\alpha_{w,1})]^2;$$
$$M_{k,w}(11)=[r_{k,w}-(-\alpha_{w,1})]^2;$$
$$M_{k,w}(12)=[r_{k,w}]^2;$$
$$M_{k,w}(13)=[r_{k,w}-(\alpha_{w,1})]^2;$$
$$M_{k,w}(14)=[r_{k,w}-(2\alpha_{w,1})]^2;$$
$$M_{k,w}(15)=[r_{k,w}-(1-2\alpha_{w,1})]^2;$$
$$M_{k,w}(16)=[r_{k,w}-(1-\alpha_{w,1})]^2;$$
$$M_{k,w}(17)=[r_{k,w}-1]^2;$$
$$M_{k,w}(18)=[r_{k,w}-(1+\alpha_{w,1})]^2;$$
$$M_{k,w}(19)=[r_{k,w}-(1+2\alpha_{w,1})]^2;$$
$$M_{k,w}(20)=[r_{k,w}-(2-2\alpha_{w,1})]^2;$$
$$M_{k,w}(21)=[r_{k,w}-(2-\alpha_{w,1})]^2;$$
$$M_{k,w}(22)=[r_{k,w}-2]^2;$$
$$M_{k,w}(23)=[r_{k,w}-(2+\alpha_{w,1})]^2;$$
$$M_{k,w}(24)=[r_{k,w}-(2+2\alpha_{w,1})]^2. \qquad (16)$$

Other metrics which represent the difference between the input symbol and the predicted input symbols, assuming each of the possible state transitions, may be used as distance metrics. In general, there will be a distance metric for every transition from any state S' at time k−1 to state S at time k, $A^{\delta+1}$ for a metrics system with A symbols and $\delta$ interfering symbols if all transitions are allowed. PAM-5 symboling is shown here only as an example and embodiments of detector 1100 can utilize other symbol alphabets and more ISI symbols.

Add-compare-select (ACS) circuit 1102 in FIG. 11A updates a state metric for each possible state of the system, denoted by $P_{k,w}(+2)$, $P_{k,w}(+1)$, $P_{k,w}(+0)$, $P_{k,w}(-1)$, and $P_{k,w}(-2)$ in the PAM-5 example, at each time step k. For the PAM-5 symbol alphabet the state metrics are given by:

$$P_{k,w}(i)=\min_{j=\{-2,-1,0,1,2\}}\{p_{k-1,w}(j)+M_{k,w}((j+2)+5(i+2))\}; \text{ for } i=\{2,1,0,-1,-2\}. \qquad (17)$$

In general, the state metrics represent the accumulated distance metrics of past states along transition paths that minimize the accumulated distance metric. Therefore, the transition metric for state S at time period k, $p_{k,w}(S)$, is the accumulated distance metric for previous states along a transition path which ends at state S at time period k, state S being one of the possible states of the system. At time k−1, the state of the system may be at any state S' in the group of possible states of the system. Therefore, $p_{k,w}(S)$ is the minimum one of $p_{k-,w}(S')$ plus the distance metric for transition from S' to S. A mathematical proof that this technique results in the least detection error is given in the Appendix of "Improved Detection for Digital Communication Receivers," U.S. application Ser. No. 08/974,450.

In the example of FIG. 11A, the comparison results, $D_{k,w}(+2)$, $D_{k,w}(+1)$, $D_{k,w}(0)$, $D_{k,w}(-1)$ and $D_{k,w}(-2)$, are stored in a memory of traceback circuit 1103 for each of the five states. The comparison results indicate the state at time period k−1 which results in the state metric $p_{k,w}(S)$ for state S at time period k. In the PAM-5, $\delta=1$ example shown in FIG. 11A, the ACS results for each of the five states are given by $$D_{k,w}(i)=j \text{ if } p_{k,w}(i)=p_{k-1,w}(j)+M_{k,w}((j+2)+5(i+2)); \text{ for } i=\{2,1,0,-1,-2\}; j=\{2,1,0,-1,-2\}. \qquad (18)$$

In general, $D_{k,w}(S)$ points toward the state S' at time k−1 from which results the lowest state metric for arriving at state S at time k.

When it is time for decoding, traceback circuit 1103 traces back from a starting state, and fetches the data from memory in traceback circuit 1103.

In one example of a traceback, if the traceback depth is 2*TB, then it is expected that a traceback of TB is performed every TB/2 sample times and traceback circuit 1106 outputs TB/2 data symbols. With little loss of generality, TB can be an even integer such as 6, 8 or 16. A greater traceback depth will result in less error in determining the final sequence of symbols. Greater traceback depths, however, incur an implementation cost of requiring more memory in traceback circuit 1103.

During the traceback procedure, starting state determiner 1105 picks the starting state, which can be based on the state metrics $p_{k,w}(S)$. Traceback circuit 1103 follows the sequence back through the comparison results stored in memory in traceback circuit 1103. The earliest TB/2 symbols, which result in the earliest states, are written into last-in-first-out buffer 1104. The new comparison results are stored in the memory locations previously occupied by the outputted results.

Traceback circuit 1103 determines the optimum sequence of symbols based on the state metrics $p_{k,w}(S)$ stored in starting state determiner 1105. Starting state determiner 1105 initializes the traceback procedure by setting a starting sequence.

LIFO 1104 simply time-reverses the data coming out of traceback circuit 1103 because the traceback is performed from the current time to previous times.

Sequence Detection with Pre-Equalization

When the channel ISI length $\delta$ is large, or if the transmitted symbol alphabet size A is large, the above method of full sequence estimation becomes impractical at high symbol rates. Full sequence estimations require the implementation of $A^\delta$ states in the detector. Accordingly, equalizer 1110 can provide pre-equalization by preprocessing the input samples $y_{k,w}$ in order to reduce the number of ISI symbols to be processed by sequence detector 1100. Equalizer 1110 can be any equalizer that reduces the number of ISI symbols. Again, for purposes of example, assume that the channel input alphabet size is A=5, i.e., $\{A\}=\{+2, +1, 0, -1, -2\}$, and that the reduced ISI length (as seen by the sequence detector) is $\delta'=1$. As before, the technique is applicable to larger alphabets and may accommodate more than one interfering symbol in the reduced length.

The output of the equalizer 1110 with A=5 and $\delta'=1$ is, as previously described, given by $$r_{k,w} = a_{k,w} + \alpha_{w,1} * a_{k-1,w} + h_{k,w}, \quad (19)$$

where $\alpha_{w,1}$ is the equalized ISI coefficient and $h_k$ is the noise component of the output of the linear equalizer 1110. The transfer function (in Z-transform notation, See A. V. OPPENHEIM AND R. W. SCHAFER, DISCRETE-TIME SIGNAL PROCESSING, (1989)) for equalizer 1110 is, then, given by $$E_w(z) = (1 + \alpha_{w,1} z^{-1})/f_w(z). \quad (20)$$

The coefficient $\alpha_{w,1}$ is chosen to minimize the noise variance at the output of the equalizer. Equalizer 1110, therefore, is a reduced sequence equalizer because it reduces the ISI length from $\delta$ to $\delta'$. The reduced ISI length $\delta'$ is one (1) in this example.

In one embodiment, reduced sequence equalizer 1110 is implemented adaptively. One architecture used for adaptive implementation is shown in FIG. 11B. In this embodiment, equalizer 1110 includes a linear equalizer 1120 implementing a transfer function $C(Z)=1/f(Z)=C_0+C_1 Z^{-1}+\ldots+C_\delta Z^{-\delta}$, adaptively followed by a filter 1121 implementing the function $(1+\alpha_{w,1}z^{-1}+\ldots+\alpha_{w,\delta'}Z^{-\delta'}$. By implementing both equalizer 1120 and filter 1121 adaptively, optimal performance can be achieved for any cable length. Linear equalizer 1120 can be adaptively implemented by using the least mean squares (LMS) algorithm (See E. A. LEE AND D. G. MESSERCHMITT, DIGITAL COMMUNICATIONS (1988)) and a finite impulse response filter as shown in FIG. 6.

The coefficients $\alpha_{w,1}$ through $\alpha_{w,\delta'}$ can be chosen adaptively in the sequence detector by observing the frequency response of linear equalizer 1120. From linear equalizer 1120, the channel frequency response is deduced and $\alpha_{w,1}$ through $\alpha_{w,\delta'}$ can be selected from a look-up table. In one embodiment with $\delta'=1$, two possible values of $\alpha_{w,1}$ (0 and 1/2) are used. One of the two possible coefficients is chosen for $\alpha_{w,1}$ by observing the two largest equalizer coefficients of linear equalizer 1120, $C_0$ and $C_1$. For example, in one embodiments if $C_1/C_0 < -0.5$ then $\alpha_{w,1}=0.5$, otherwise $\alpha_{w,1}=0$.

The benefits of combining linear equalization with sequence detection include (a) reduced complexity in the sequence detector, especially for large ISI lengths, and (b) reduced noise enhancement in the linear equalization.

In the example described in FIG. 11 with $\delta'=1$, the number of states in the sequence estimator is reduced from $5^\delta$ to 5. The reduced state sequence estimator can be implemented using the Viterbi algorithm.

Sequence Detection with Pre-equalization and Decision Feedback

Figure 13:
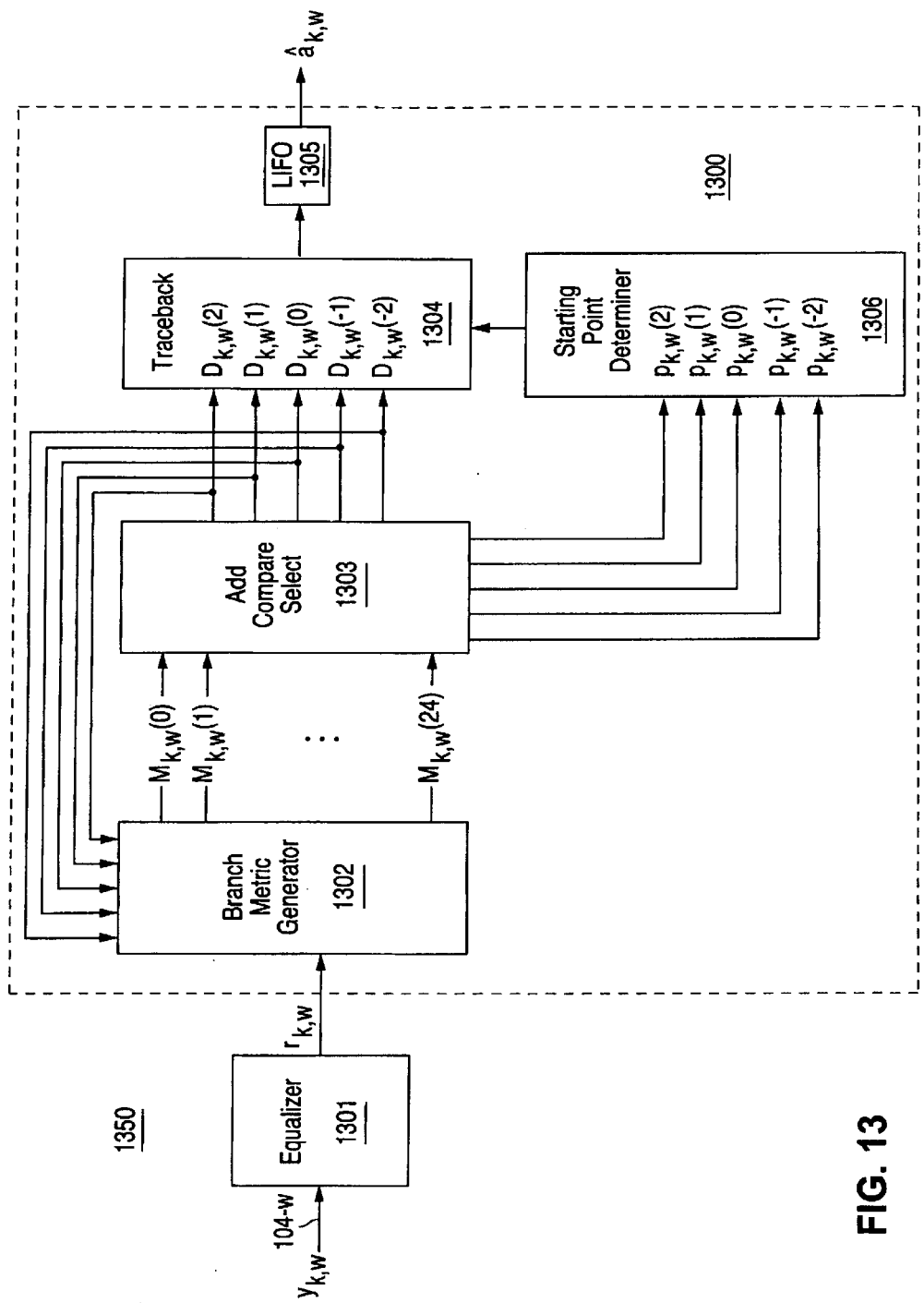
FIG. 13 shows a block diagram of an embodiment of a sequence detector equalizer with decision feedback according to the present invention.

FIG. 13 shows a receiver 1350 that includes an embodiment of a sequence detector 1300 having decision-feedback. In this embodiment, equalizer 1301, which as before can be any equalizer structure, pre-equalizes transmission channel 104-w to a pre-determined ISI polynomial $G_w(z)$ of length $\eta \leq \delta$, where $\delta$ is the ISI length of the frequency response $f_w(Z)$ of transmission channel 104-w. In the example of FIG. 11, $\eta$ is 2 and the ISI polynomial $G_w(z)$ is given by $$G_w(z) = 1 + \alpha_{w,1}z^{-1} + \alpha_{w,2}z^{-2}. \quad (21)$$

The transfer function of equalizer 1301 is given by $$E_w(z) = G_w(z)/f_w(z). \quad (22)$$

Sequence detector 1300 includes branch metric generator 1302, add compare select 1303, traceback 1304, LIFO 1305 and starting point determiner 1306. In general, the detection technique implemented in sequence estimator 1300 may be used for any combination of $\delta$ and $\eta$ such that $\eta \leq \delta$. Although the technique may be implemented with any sized alphabet, the example shown in FIG. 13 is for the PAM-5, (A=5), alphabet. The coefficients, $\alpha_{w,1}$ and $\alpha_{w,2}$, can be chosen adaptively to optimize performance of the receiver 1350.

To perform the sequence estimation using the Viterbi algorithm, as outlined above, sequence detector 1300 is still implemented with twenty five states (if the data symbols are PAM-5 values). The branch metric computations from a trellis diagram now accounts for the intersymbol interference due to the symbols transmitted two sample times before as well as the symbol transmitted during the last period. In one embodiment, the branch metrics computed by branch metric generator 1302 with decision feedback are given by:

$$M_{k,w}(0) = [r_{k,w} - \alpha_{w,2}D_{k-1}(-2) - (-2-2\alpha_{w,1})]^2;$$

$$M_{k,w}(1) = [r_{k,w} - \alpha_{w,2}D_{k-1}(-1) - (-2-\alpha_{w,1})]^2;$$

$$M_{k,w}(2) = [r_{k,w} - \alpha_{w,2}D_{k-1}(0) - (-2)]^2;$$

$$M_{k,w}(3) = [r_{k,w} - \alpha_{w,2}D_{k-1}(1) - (-2+\alpha_{w,1})]^2;$$

$$M_{k,w}(4) = [r_{k,w} - \alpha_{w,2}D_{k-1}(2) - (-2+2\alpha_{w,1})]^2;$$

$$M_{k,w}(5) = [r_{k,w} - \alpha_{w,2}D_{k-1}(-2) - (-1-2\alpha_{w,1})]^2;$$

$$M_{k,w}(6) = [r_{k,w} - \alpha_{w,2}D_{k-1}(-1) - (-1-\alpha_{w,1})]^2;$$

$$M_{k,w}(7) = [r_{k,w} - \alpha_{w,2}D_{k-1}(0) - (-1)]^2;$$

$$M_{k,w}(8) = [r_{k,w} - \alpha_{w,2}D_{k-1}(1) - (-+\alpha_{w,1})]^2;$$

$$M_{k,w}(9) = [r_{k,w} - \alpha_{w,w}D_{k-1}(2) - (-1+2\alpha_{w,1})]^2;$$

$$M_{k,w}(10) = [r_{k,w} - \alpha_{w,1}D_{k-1}(-2) - (-2\alpha_{w,1})]^2;$$

$$M_{k,w}(11) = [r_{k,w} - \alpha_{w,1}D_{k-1}(-1) - (-\alpha_{w,1})]^2;$$

$$M_{k,w}(12) = [r_{k,w} - \alpha_{w,2}D_{k-1}(0)]^2;$$

$$M_{k,w}(13) = [r_{k,w} - \alpha_{w,2}D_{k-1}(1) - \alpha_{w,1}]^2;$$

$$M_{k,w}(14) = [r_{k,w} - \alpha_{w,2}D_{k-1}(2) - 2\alpha_{w,1}]^2;$$

$$M_{k,w}(15) = [r_{k,w} - \alpha_{w,2}D_{k-1}(-2) - (1-2\alpha_{w,1})]^2;$$

$$M_{k,w}(16) = [r_{k,w} - \alpha_{w,2}D_{k-1}(-1) - (1-_{w,1})]^2;$$

$M_{k,w}(17)=[r_{k,w}-\alpha_{w,2}D_{k-1}(0)-1]^2;$ $M_{k,w}(18)=[r_{k,w}-\alpha_{w,2}D_{k-1}(1)-(1+\alpha_{w,1})]^2;$ $M_{k,w}(19)=[r_{k,w}-\alpha_{w,2}D_{k-1}(2)-(1+2\alpha_{w,1})]^2;$ $M_{k,w}(20)=[r_{k,w}-\alpha_{w,2}D_{k-1}(-2)-(2-2\alpha_{w,1})]^2;$ $M_{k,w}(21)=[r_{k,w}-\alpha_{w,2}D_{k-1}(-1)-(2-\alpha_{w,1})]^2;$ $M_{k,w}(22)=[r_{k,w}-\alpha_{w,2}D_{k-1}(0)-2]^2;$ $M_{k,w}(23)=[r_{k,w}-\alpha_{w,2}D_{k-1}(1)-(2+\alpha_{w,1})]^2;$ $M_{k,w}(24)=[r_{k,w}-\alpha_{w,2}D_{k-1}(2)-(2+2\alpha_{w,1})]^2.$ (23)

The ISI due to the transmitted symbol at time (k−2) is removed from the received sample $r_{k,w}$ before the branch metric of the sequence detector that accounts for the ISI due to the transmitted symbol at time (k−1) is computed. After this calculation, the previously described calculation is performed to remove the ISI due to the (k−1)th transmitted symbol.

Add compare select (ACS)1303 then computes the state metrics $p_{k,w}(j)$ and the comparison results $D_{k,w}(j)$ as described above in equations 16 and 17, respectively. Traceback 1304 accepts a starting point from starting point determiner 1306, as described above, and outputs a set of decided on symbols to LIFO 1305. LIFO 1305, then, outputs the resulting symbols in reverse chronological order from that received.

Sequence Detection in Combination with Error Correction

Although achieving excellent noise margins, the combination of sequence detection with error correction codes is problematic. Sequence detectors usually produce hard decisions (i.e., decisions that do not contain information on reliability), which become input signals to error correcting codes. Most error correcting techniques, such as the parity coding or 4-D lattice coding proposed for Gigabit Ethernet, rely on soft decisions (i.e., decisions that contain reliability information) to achieve full performance. See, e.g., S. LIN AND D. J. COSTELLO, JR., ERROR CONTROL CODING: FUNDAMENTALS AND APPLICATIONS (1983). Thus, a typical sequence detector in combination with a decoder using an error correcting code does not achieve the improved SNR margins of both the sequence detector and the error correcting code unless the decoder is provided with a soft decision from the sequence detector.

Figure 14:
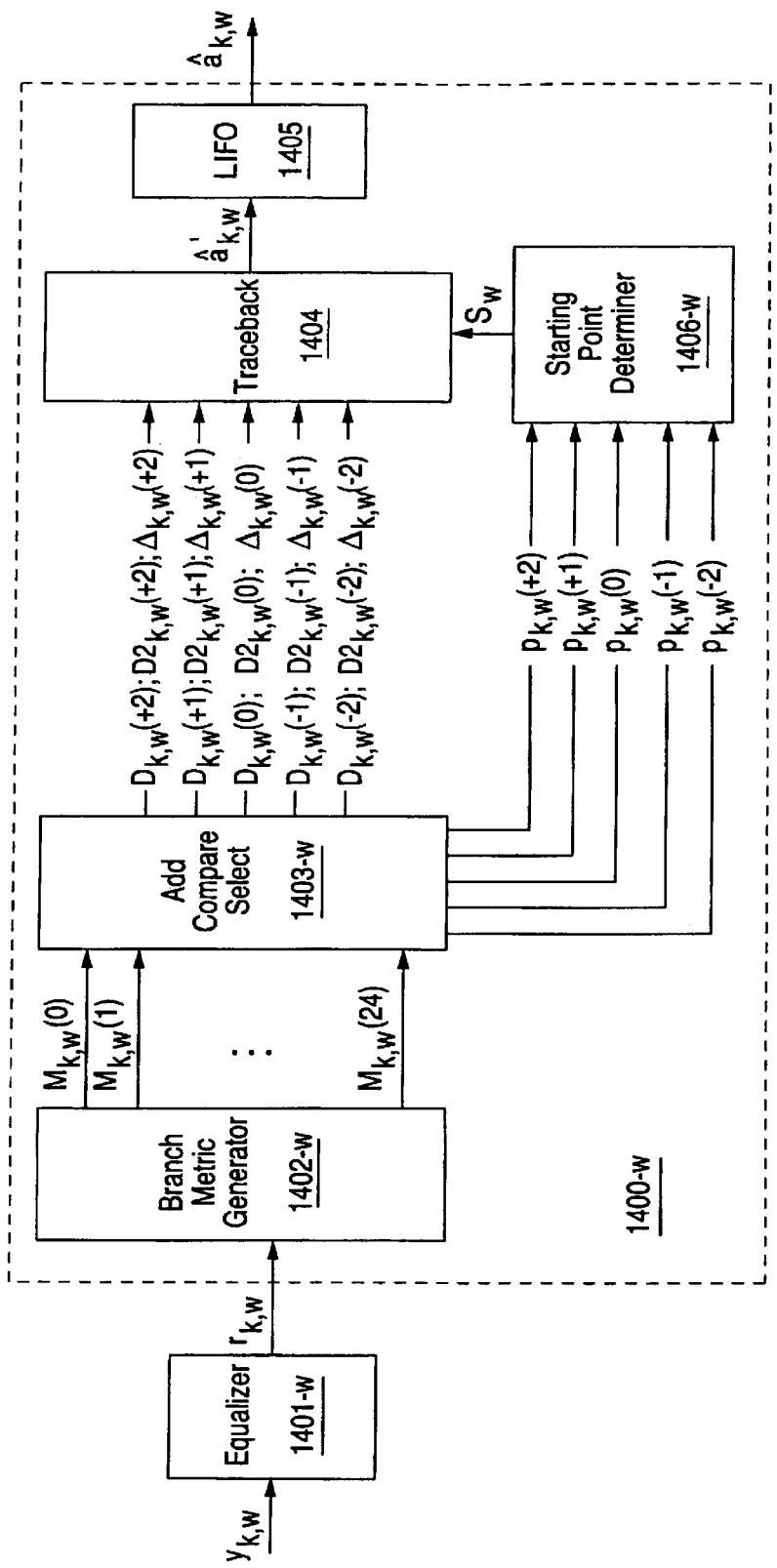
FIG. 14 shows a block diagram of an embodiment of a sequence detector equalizer having soft outputs according to the present invention.

FIG. 14 shows a sequence detector 1400-w according to the present invention. Sequence detector 1400-w is coupled to receive signal $r_{k,w}$ from wire w. Sequence detector 1400-w includes branch metric generator 1402-w, add compare select (ACS) 1403-w, and starting point determiner 1406-w. Add compare select 1402-w and starting point determiner 1406-w are each coupled to traceback 1404.

Traceback 1404 is coupled to each wire w so that the traceback can be accomplished on N-D symbols rather than performing a separate traceback on N 1-D symbols, where N is the number of wires. Traceback 1404 is also coupled with LIFO 1405. LIFO 1405 outputs the final symbol stream $â'_{k,w}$ for each wire w.

Although a sequence detector according to the present invention can accommodate any symbol alphabet and any number of ISI symbols, for example sequence detector 1400 shown in FIG. 14 is for a PAM-5 alphabet where input signals suffer the influence of one past ISI symbol (i.e., the ISI length is 1). Equalizer 1401-w, as has been previously discussed, executes a transfer function $E(Z)=(1+(1+\alpha_{w,1}Z^{-1})/f_w(Z)$ and therefore sequence detector 1400-w detects a signal that includes ISI from one past symbol. Branch metric generator 1402-w, therefore generates the branch metrics as described in Equation 16.

Add compare select (ACS) 1403-w computes the state metrics $p_{k,w}(i)$ (i=−2,−1,0,1,2) according to Equation 17 and the ACS results $D_{k,w}(i)$ according to Equation 18. Additionally, ACS 1403-w computes a second best state metric $p2^{k,w}(i)$, a second ACS result $D2_{k,w}(i)$, and a difference result $\Delta_{k,w}(i)$. The second best state metric can be computed according to the equation $p2_{k,w}(i)$=second minimum $(p_{k-1,w}(j)+M_{k,w}(5(i+2)+(j+2)))$; $j=\{-2, -1, 0, 1, 2\}$, (24)

where $i=(-2, -1, 0, 1, 2\}$. The second ACS result can be computed according to $D2_{k,w}(i)=j$ if $p2_{k,w}(i)=p_{k-1,w}(j)+M_{k,w}(5(i+2)+(j+2))$, (25)

where $i=\{-2, -1,0,1,2\}$ and $j=(-2, -1,0,1,2\}$. Finally, the difference result can be computed according to $\Delta_{k,w}(i)=p2_{k,w}(i)-p_{k,w}(i).$ (26)

Traceback 1404 receives the ACS results, the second ACS results, and the difference results from each state on each wire as well as a starting point signal from starting point determiner 1406-w for each wire w.

Figure 15:
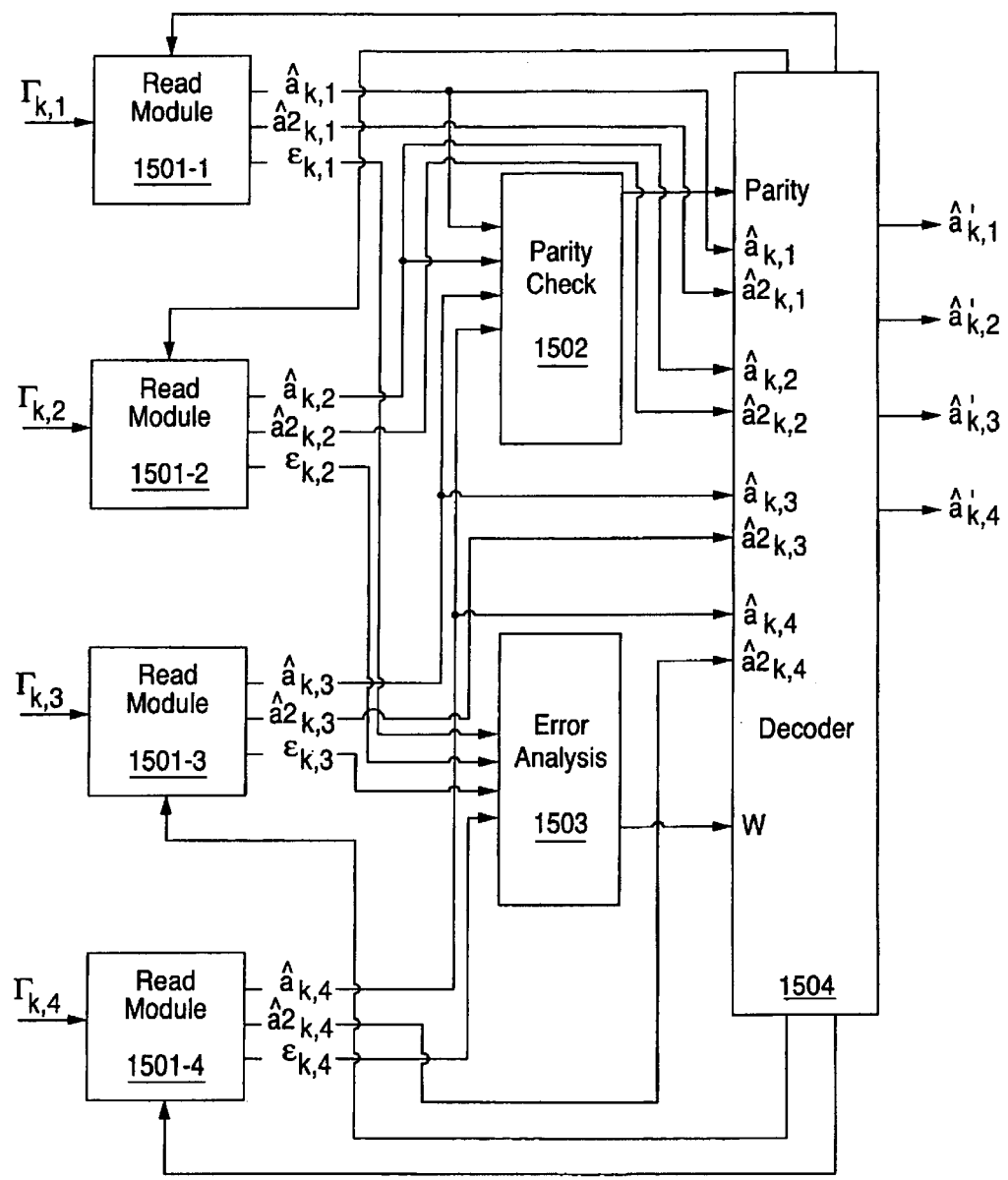
FIG. 15 shows a block diagram of an embodiment of a parity code receiver that includes soft output sequence detection equalizers according to the present invention.

FIG. 15 shows an embodiment of a 4-D traceback 1404 in combination with a series of sequence detectors 1400-w. It is understood that, in general, for an N-wire configuration, traceback 1404 coupled into N sequence detectors similar to that shown in FIG. 14, one for each wire w. In FIG. 15, traceback 1404 includes a parity code decoder 1504 although other coding schemes can be used, provided that the coding scheme can correct symbols within one clock cycle.

For exemplary purposes, FIG. 15 shows a four-wire parity-code decoder. Traceback 1404 includes a read module 1501-1 through 1501-4, one for each of the four wires. Read module 1501-1 through 1501-4 receives parameters $\Gamma_{k,w}$ from add compare select 1403-w and starting point determiner 1406-w (FIG. 14). Parameters $\Gamma_{k,w}$ includes the add compare results $D_{k,w}(i)$, $D2_{k,w}(i)$ and $\Delta_{k,w}(i)$, where i=(−2, −1, 0, 1, 2) for PAM-5 signaling, as well as a starting point $SP_{k,w}$ for each wire w. As was discussed before, starting point determiner 1406-w chooses a starting point $SP_{k,w}$, which can be based on the state metrics $p_{k,w}(i)$, for traceback 1404.

Traceback 1404 in FIG. 15 traces back to arrive at the best sequence $â_{k,w}$ for wire w. For each clock cycle k, read module 1501-w arrives at a best symbol $â_{k,w}$, a second best symbol $â2_{k,w}$ and an associated reliability $\epsilon_{k,w}$ for each wire w.

As described above, the 4-D parity coding scheme only transmits 4-D symbols having even parity. A single error in one 1-D symbol will cause the parity of the 4-D symbol to become odd. Similar to "4-D slicing", traceback 1404 recognizes the parity error and makes corrections to the 4 1-D symbols from read modules 1501-1 through 1501-4 for clock cycle k based on the reliability of each of the 1-D symbols.

Hagenauer has shown that, within a Viterbi decoder, the reliability of decision symbol paths merging at each state grows with the difference between the state metrics between the two paths. See J. Hagenauer and P. Hocher, "A Viterbi Algorithm with Soft-Decision Outputs and its Applications," Proc. GLOBECOM '89, 1680–1686, November 1989). Similar to Hageauer's Soft Output Viterbi Algorithm (SOVA), each of read modules 1501-1 through 1501-4 outputs the difference metric, i.e. the reliability measure, between the best two paths entering each state, $\epsilon_{k,1}$ through $\epsilon_{k,4}$, respectively. SOVA uses these metrics over a range of sample times within the trellis to output soft decisions for every symbol.

However, 4-D parity traceback 1404 can recognize when a single error occurs. Therefore, only the difference metrics at the time of the error are required to correct errors. Because the actual decoding is accomplished during traceback in each of sequence detectors 140-1 through 140-4, traceback 1404 recognizes an error in its channel and corrects the error in its own sequence path.

For each clock cycle k, traceback 1404 retrieves each of the first choice 1-D symbols $â_{k,1}$ through $â_{k,4}$, the second choice 1-D symbols $â2_{k,1}$ through $â2_{k,4}$, and the reliability measures $\epsilon_{k,1}$ through $\epsilon_{k,4}$, and determines the finally decided 4 1-D symbols $â_{k,1}$ through $â_{k,4}$.

For each clock cycle k, parity check 1502 receives the first choice symbols $â_{k,1}$ through $â_{k,4}$ from read modules 1501-1 through 1501-4, respectively, determines the parity of the resulting 4-D symbol and outputs a parity signal indicating the parity of the 4-D symbol. Error analysis 1503 receives reliability measures $\epsilon_{k,1}$ through $\epsilon_{k,4}$ from read modules 1501-1 through 1501-4, respectively, determines which of the sequence detectors w has the least reliability, indicating which result is most likely to be incorrect, and outputs a wire signal W indicating which symbol is most likely to be incorrect. Decoder 1504 receives the first choice symbols $âk,1$ through $â_{k,4}$, the second choice symbols $â2_{k,1}$ through $â2_{k,4}$, the parity signal from parity check 1502, and the wire signal from error analysis 1503.

If the parity signal indicates that the parity of the first choice 4-D symbol is even, then the first choice symbols $â_{k,1}$ through $â_{k,4}$ are output as the finally decided symbols $â'_{k,1}$ through $â'_{k,4}$. However, an odd parity indicates an error in one of the first choice symbols âk,1through âk,4. If the parity signal indicates an odd parity, the symbol indicated by the wire signal W is replaced by a corresponding one of second choice symbols $â2_{k,1}$ through $â2_{k,4}$ and the resulting 4-D symbol is output as finally decided symbols $â_{k,1}$ through $â'_{k,4}$.

Additionally, decoder 1504 informs read modules 1501-1 through 1501-4 of the finally decided symbols $â'_{k,1}$ through $â'_{k,4}$ by indicating, for each of read modules 1501-1 through 1501-4, which of the first choice symbols or the second choice symbols was output as the finally decided symbols for clock cycle k. Read modules 1501-1 through 1501-4 can then traceback accordingly and output the first choice symbols, second choice symbols, and reliability measures for clock cycle k−1 (i.e., $â_{k-1,1}$ through $â_{k-1,4}$, $â2_{k-1,1}$ through $â2_{k-1,4}$, and $\epsilon_{k-1,1}$ through $\epsilon_{k-1,4}$, respectively).

In other words, read module 1501-w outputs the best possible step back $â_{k,w}$, the second best step back $â2_{k,w}$, and the reliability measure $\epsilon_{k,w}$ for each wire for clock cycle k. Parity check 1502 performs a parity check on the best possible step back $â_{k,w}$. Error analysis 1503 determines the wire most likely to be incorrect. If the parity passes, decoder 1504 outputs the best possible step back $â_{k,w}$ for clock cycle k. If parity fails, then decoder 1504 replaces one of the best possible symbols with the associated second best symbol, based on which wire is most likely to be incorrect, and outputs the resulting 4-D symbol. The choice of best symbol or second best symbol for each wire w is communicated back to read module 1501-w so that read module 1501-w can use the appropriate symbol to step back to clock cycle k−1. The replacement choice, then, affects only one read module. Therefore, the next set of symbols will be affected in one read module only.

As shown in FIG. 14, the output symbols $â'_{k,w}$ are output to LIFO 1405, which time reverses the order of the symbol stream and outputs the resulting symbol stream $â'_{k,w}$.

One skilled in the art will recognize that in general a sequence detector according to this invention can accommodate any symbol alphabet and the effects of any number of ISI symbols. Additionally, the sequence detector may include decision feedback as shown in FIG. 13.

Reduced Complexity Sequence Detection Using State Reduction

If the alphabet size is large or if the ISI length at the sequence detector is large then sequence detector 1400-w shown in FIG. 14 and traceback 1404 using parity coding shown in FIG. 15 become impractical at high symbol rates. The number of states required in read modules 1501-1 through 1501-4 is $A^\eta$ on each wire, where A represents the number of symbols in alphabet {A} and η represents the ISI symbol length at the sequence detector (i.e. at the input terminal of sequence detector 1400 in FIG. 14). With a PAM-5 alphabet and η=2 ISI symbols, each of read modules 1501-1 through 1501-4 requires twenty five (25) states in order to perform sequence detection. A decoder utilizing a large number of states is expensive, difficult to implement, and consumes a lot of power.

Figure 16:
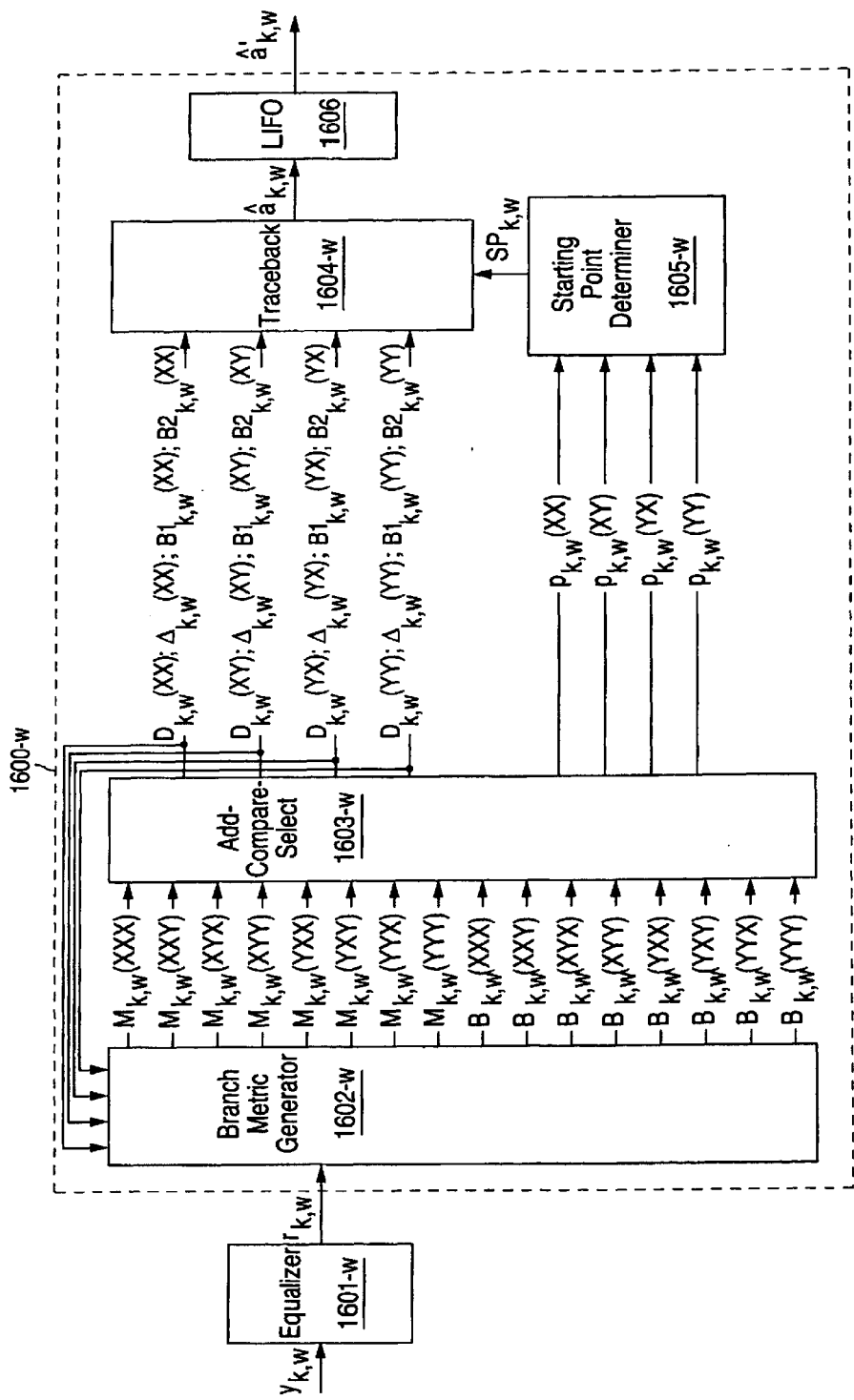
FIG. 16 shows an embodiment of a reduced complexity sequence detector having soft outputs according to the present invention.

FIG. 16 shows a sequence detector 1600-w having reduced complexity sequence detection. In particular, sequence detector 1600-w includes branch metric generator 1602-w, add-compare-select 1603-w, and starting point determiner 1605-w. Traceback 1604 and LIFO 1606 are coupled into sequence detector 1600-2 as well as similar detectors coupled to the remaining N wires. As an example, sequence detector 1600-w is shown for the PAM-5 alphabet, although embodiments of sequence detector 1600-w can utilize other symbol alphabets as well.

The PAM-5 symbol alphabet can be segregated into two families, an odd family X having the PAM-5 symbols {−1, +1} and an even family Y having the PAM-5 symbols {−2, 0, +2}. A detector state can now be defined as the previous T families X or Y, as opposed to the previous η PAM-5 symbols {−2, −1, 0, +1, +2}. Therefore, the number of states required for the PAM-5 symbol alphabet with η=2 ISI symbols is reduced from 25 states to 4 states on each transmission channel w=1 through L. For a four wire system (4-D decoding, for example), there are a total of sixteen (16) states instead of one hundred (100) states.

Reduced state detection can be accomplished when the minimum squared distance between any two parallel branches of a state transition S→S' exceeds the minimum squared distance between any two paths in the trellis. A parallel branch refers to transitions S→S' between individual states through different symbols. For example, a state S=X can transition to a state S'=X through receipt of either a −1 symbol or a +1 symbol.

The actual squared minimum distance between sequences does not decrease and thus the performance suffers little or no degradation from that of full state sequence detection. Gigabit Ethernet using a PAM-5 symbol set suffering ISI from two (2) symbols meets this criteria.

Figure 17:
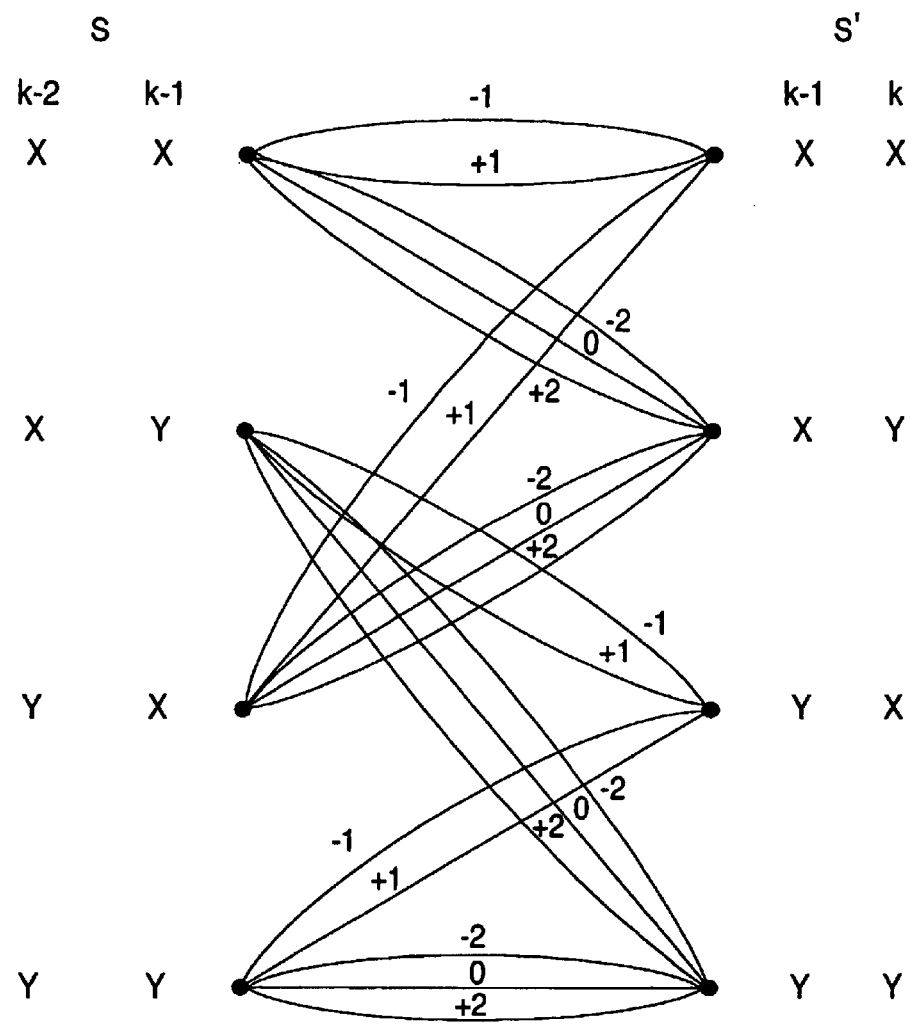
FIG. 17 shows an example of a trellis diagram illustrating state changes between reduced states of a reduced complexity sequence detector, including multiple branches between states.

FIG. 17 shows a trellis diagram displaying the reduced state transitions and all parallel PAM-S transitions. In FIG. 17, a state is represented by two consecutive symbols (reflecting an ISI length of 2). A transition from state S at time k−1 to state S' at time k has two or three parallel branches, depending upon whether the new symbol entering at state S' is in family X or family Y. For example, a transition from state XX at time k−1 to state XX at state k has two branches because the incoming symbol must be either a −1 or +1 PAM-5 symbol. A transition from state XX at time k−1 to a state XY at time k, however, indicates that either a −2, 0 or +2 symbol is received and therefore there are three branches.

In FIG. 16, equalizer 1601-w can execute the transfer function $$E(Z)=(1+\alpha_1 Z^{-1}+\alpha_2 Z^{-2})/f(z). \tag{27}$$

Therefore, the expected signal input to decoder system 1600 is $$r_{k,w}=a_{k,w}+\alpha_1 a_{k-1,w}+\alpha_2 a_{k-2,w}. \tag{27}$$

Branch metric generator 1602-w computes the branch metrics for the state transitions displayed in FIG. 17. In the reduced state trellis shown in FIG. 17, branch metric 1602-w first decides on which of the two or three branches of the transition from state S to state S' to assign to the state transition S→S'. The decision of which branch performs the S→S' transition is based on calculating a distance metric for each branch and choosing the branch having the lowest metric. For example, in the transition from state S=XX to state S'=XX branch metric generator first determines which of the two branches (−1 or +1) are traversed before calculating the metric. The decision of which branch is traversed is stored in branch decision $B_{k,w}(S \rightarrow S')$. The branch decision and the metric are both communicated to ACS 1603-w.

For each state S at k−1, symbols $\hat{a}_{k-1}(S)$ and $\hat{a}_{k-2}(S)$ are known based upon feedback from ACS 1603-w to Branch Metric Generator 1602-W, as is shown in FIG. 16. For each state transition S→S', branch metric generator takes the difference between the input signal and the ISI portion of Equation 27 to obtain a difference $$\sigma(S \rightarrow S')=r_{k,w}-\alpha_1 \hat{a}_{k-1,w}(S)-\alpha_2 \hat{a}_{k-2,w}(S). \tag{28}$$

The difference σ is then compared with the symbols for each possible branch of the state transition S to S'. The symbol chosen for the branch, $a'_{k,w}(S \rightarrow S')$, is then assigned to the transition from state S to state S'.

Figure 18:
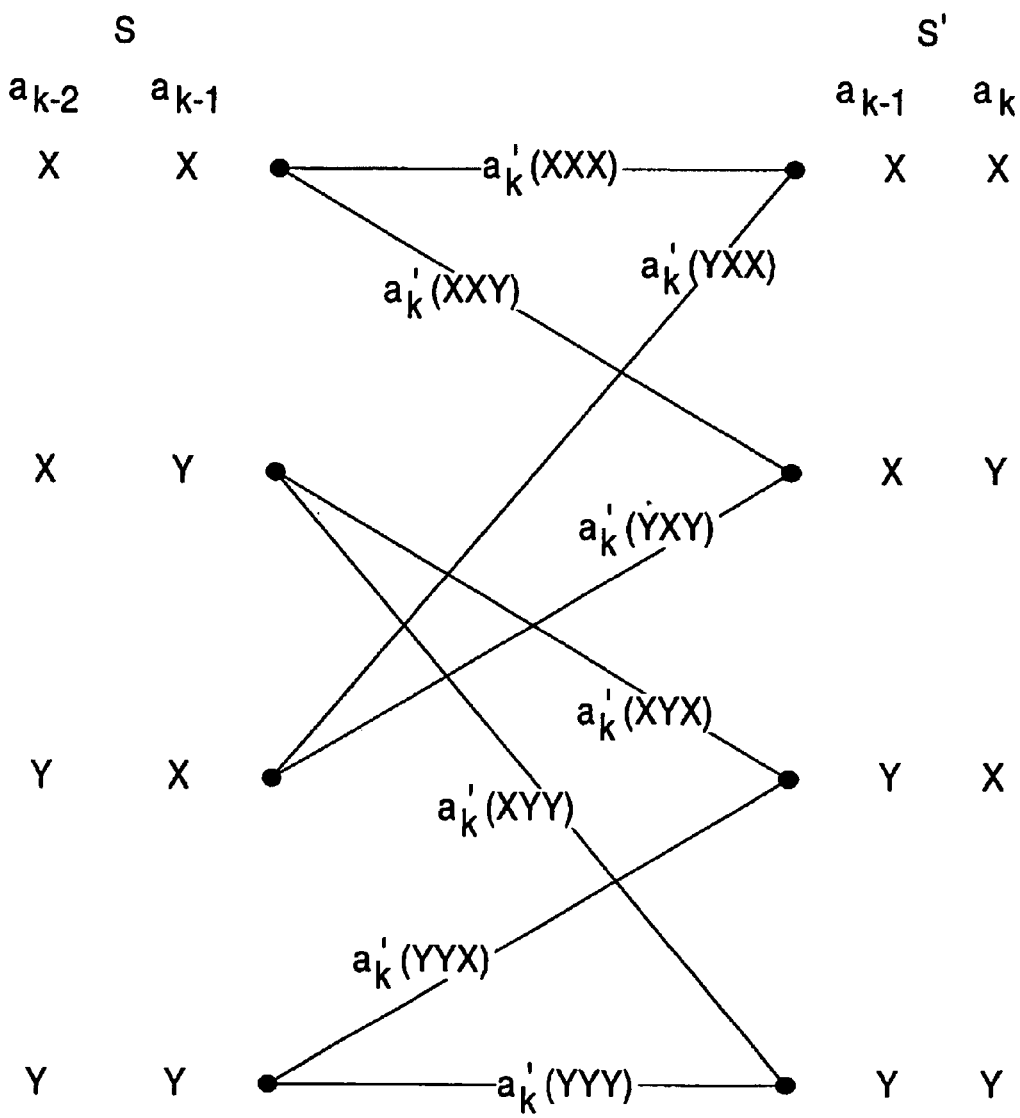
FIG. 18 shows a trellis diagram illustrating state changes between the reduced states of a reduced complexity sequence detector after branch path decisions have been made.

As is shown in FIG. 18 The branch metrics can be computed for each transition S to S' according to the equation:

$$M_{k,w}(S \rightarrow S')=[r_{k,w}-a'_{k,w}(S \rightarrow S')-\alpha_1 \hat{a}_{k-1,w}(S)-\alpha_2 \hat{a}_{k-2,w}(S)]^2, \tag{29}$$

where the valid transitions (S→S') in FIG. 18 are S→S'= XXX, XXY, YXX, YXY, XYX, XYY, YYX and YYY. The notation "ABC" used above and on FIG. 18 indicates an S→S' transition from S=AB to S'=BC.

Add-compare-select 1603-w receives the branch metrics $M_{k,w}((S \rightarrow S'))$ and branch decisions $B_{k,w}(S \rightarrow S')$ from branch metric generator 1602-w and calculates the state metrics $P_{k,w}(S')$ according to the equation $$P_{k,w}(S')=\min_{j=\{S\}}(P_{k-1,w}(j)+M_{k,w}(S \rightarrow S')), \tag{30}$$

where j is equal to each S such that S→S' is allowable.

Add-compare-select 1603-w also determines the ACS results for each of the four final states S' and communicates those results to traceback circuit 1604. The ACS result $D_{k,w}(S')$ is the path resulting in state S' having the lowest metric M(S→S'). Because there are only two allowed paths that result in state S' (see FIGS. 17 and 18), the second best choice is automatically the path that is contraindicated by $D_{k,w}(S')$ and need not be separately stored.

The error Δk,w(S') is the difference in metrics between the two paths resulting in state S':

$$\Delta_{k,w}(S')=|M(S_1 S')-M(S_2 S')|, \tag{31}$$

where $S_1$ is one of the two initial states that transition to the final state S' and $S_2$ is the other of the two initial states that transition to the final state S'. For example, from FIG. 18, if S'=YX, then $S_1$ and $S_2$ are the states XY and YY, respectively.

Finally, the branch decisions of branch metric generator 1602-w are also communicated to traceback circuit 1604. Branch decision $B1_{k,w}(S')$ corresponds to the decision on the path S→S' indicated by $D_{k,w}(S')$. Branch decision $B2_{k,w}(S')$ corresponds to the decision on the path S→S' contraindicated by $D_{k,w}(S')$. Therefore, in the soft-decision process, if the traceback circuit 1604 is altered to the second most likely path, the parallel path decision for the second most likely path is available to traceback circuit 1604.

Traceback circuit 1604 can be the same as traceback 1404 of FIG. 15 except that read modules 1501-1 through 1501-4 receive a different set of parameters $\Gamma_{k,w}$. In traceback circuit 1604, $\Gamma_{k,w}$ includes the ACS parameters $D_{k,w}(S_i)$, $\Delta_{k,w}(S_i)$, $B1_{k,w}(S_i)$, $B2_{k,w}(S_i)$, where $S_i$=(XX, XY, YX, YY), and the starting point $SP_{k,w}$ from starting point determiner 1605-w. As described above, read modules 1501-1 through 1501-4 store the ACS results in memory and, starting from starting point $SP_{k,w}$ determined by starting point determiner 1605, determines the most likely symbol $\hat{a}_{k,w}$ and the second most likely symbol $\hat{a}2_{k,w}$ for clock cycle k. An reliability measure indicating the difference in distance metrics between the most likely symbol and the second most likely symbol, $\epsilon_{k,w}$, is also determined.

As is shown in FIG. 15, read modules 1501-1 through 1501-4 output the parameters $\hat{a}_{k,w}$ to parity check 1502 and decoder 1504, parameters $\hat{a}2_{k,w}$ to decoder 1504, and parameters $\epsilon_{k,w}$ to error analysis 1503. As was previously discussed, decoder 1504 outputs a the best symbols $\hat{a}'_{k,w}$ based on the parity check and informs read modules 1501-1 through 1501-4 of the choice. Read modules 1501-1 through 1501-4 then proceed to determine most likely and second most likely symbols for clock cycle k−1 until the traceback is complete.

In sequence detector 1600-w of FIG. 16, the minimum squared distance between parallel branches of any transition S→S' should be at least twice as large as the minimum squared distance of the overall decoder. Because there is no protection between parallel branch decisions S→S" of sequence detector 1600-w, this requirement on minimum squared distances should hold true in order to prevent the overall minimum distance from decreasing because of reduced state detection.

As was previously discussed, the 4-D parity code provides 3 dB of coding gain, which doubles the squared minimum distance between possible paths. However, this code provides no protection between parallel branches of transitions along one wire. Therefore, this overall requirement on minimum distances prevents the minimum squared distance from decreasing because of reduced state detection. This requirement holds for Gigabit Ethernet standards, as described above. Although the requirement should hold in general, it may not be held for all embodiments of the invention.

Simplified DFE

Reduced sequence detection can also be accomplished utilizing decision feedback equalization (DFE). However, a simplified DFE provides a simple and easy implementation for accomplishing the equalization process in the allotted time (8 ns in the example of gigabit transmission over four wires).

Figure 19:
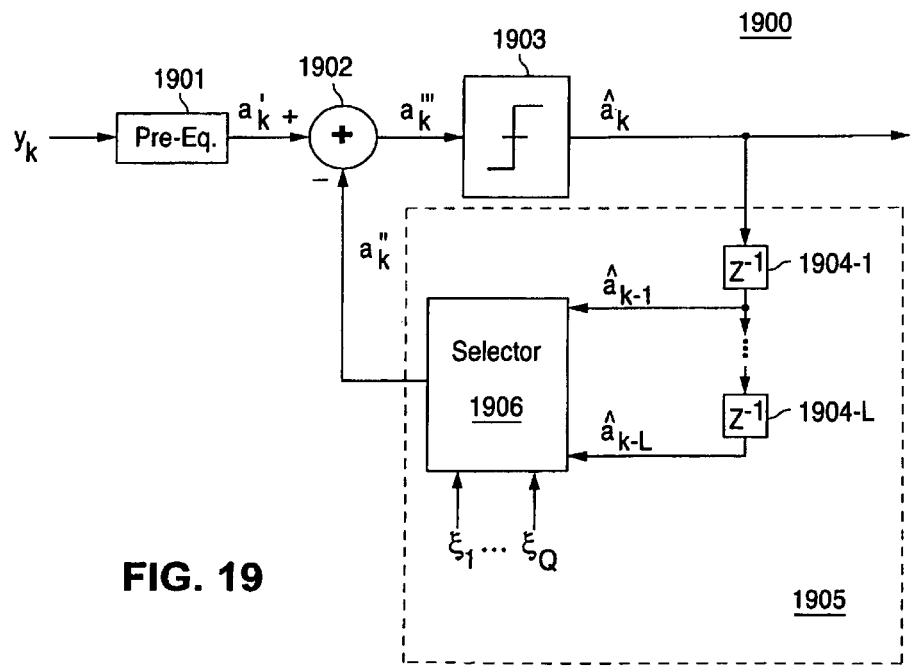
FIG. 19 shows a block diagram of a decision feedback equalizer having a simplified feedback section according to the present invention.

FIG. 19 shows an example of a simplified decision feedback equalizer 1900. The simplified decision feedback equalizer includes a pre-equalizer section 1901, adder 1902, slicer 1903, delays 1904 and 1905, and selector 1906. Pre-equalizer section 1901 can be any equalizer structure that reduces the ISI length to L symbols. Pre-equalizer section 1901, therefore, executes the transfer function $$T(Z) = \frac{1 + \alpha_1 Z^{-1} + \cdots + \alpha_L Z^{-L}}{f(Z)}, \quad (32)$$

where $\alpha_1$ through AL are the multiplier coefficients of pre-equalizer section 1901 and f(Z) is the response of the input channel (see Equation 2 for the response of a transfer channel).

The output signal from feedforward section 1901, $a'_k$, is input to adder 1902. Adder 1902 subtracts the signal from selector 1906, $a''_k$, from the output signal from feedforward section 1902, $a'_k$. The resulting signal, $a'''_k = a'_k - a''_k$, is input to slicer 1903. Slicer 1903 outputs a symbol $\hat{a}_k$ that is closest to the input signal $a'''_k$. The feedback section 1905 (see also feedback section 811 of FIG. 8) of decision feedback equalizer 1900 comprises delays 1904 and 1905 and selector 1906. Selector 1906 receives each of L past symbols $\hat{a}_{k-1}$ through $\hat{a}_{k-L}$ and uses these symbols to access a lookup table. The lookup table holds values $\zeta_1$ through $\zeta_Q$. The output signal of selector 1906, $a''_k$, then is that one of $\zeta_1$ through $\zeta_Q$ that corresponds to the combination of inputs $\hat{a}_{k-1}$ through $\hat{a}_{k-L}$. The time required to look the results up in a look-up table is much less than the time required to perform the L multiplies and L additions required of the feedback section shown, for example, as feedback section 811 of FIG. 8.

In some embodiments, selector 1906 receives the look-up values $\zeta_1$ through $\zeta_Q$ as input signals. In some embodiments, the look-up values $\zeta_1$ through $\zeta_Q$ are preset. The look-up values $\zeta_1$ through $\zeta_Q$ can also be adaptively chosen to optimize performance of the receiver of which decision feedback equalizer 1900 is a part. In most embodiments, $Q=A^L$ where A is the size of the symbol alphabet.

As an example, in a system using the PAM-5 alphabet where L=2, and Q is 25 there are twenty-five (25) lookup values (i.e., Q=25). Because the intersymbol interference in the input signal to adder 1902 is the result of two (2) ISI symbols, $$a'_k = a_k + \alpha a_{k-1} + \beta a_{k-2} + n_k, \quad (33)$$

where $\alpha$ and $\beta$ are the interference parameters and $n_k$ is random noise. The twenty-five values for the look-up table, therefore, are given by:

| | | (34) |
|---|---|---|
| $a''_k = \xi_1 = 2\alpha + 2\beta$ | if ($\hat{a}_{k-1} = 2$) and ($\hat{a}_{k-2} = 2$); | |
| $a''_k = \xi_2 = 2\alpha + \beta$ | if ($\hat{a}_{k-1} = 2$) and ($\hat{a}_{k-2} = 1$); | |
| $a''_k = \xi_3 = 2\alpha$ | if ($\hat{a}_{k-1} = 2$) and ($\hat{a}_{k-2} = 0$); | |
| $a''_k = \xi_4 = 2\alpha - \beta$ | if ($\hat{a}_{k-1} = 2$) and ($\hat{a}_{k-2} = -1$); | |
| $a''_k = \xi_5 = 2\alpha - 2\beta$ | if ($\hat{a}_{k-1} = 2$) and ($\hat{a}_{k-2} = -2$); | |
| $a''_k = \xi_6 = \alpha + 2\beta$ | if ($\hat{a}_{k-1} = 1$) and ($\hat{a}_{k-2} = 2$); | |
| $a''_k = \xi_7 = \alpha + \beta$ | if ($\hat{a}_{k-1} = 1$) and ($\hat{a}_{k-2} = 1$); | |
| $a''_k = \xi_8 = \alpha$ | if ($\hat{a}_{k-1} = 1$) and ($\hat{a}_{k-2} = 0$); | |
| $a''_k = \xi_9 = \alpha - \beta$ | if ($\hat{a}_{k-1} = 1$) and ($\hat{a}_{k-2} = -1$); | |
| $a''_k = \xi_{10} = \alpha - 2\beta$ | if ($\hat{a}_{k-1} = 1$) and ($\hat{a}_{k-2} = -2$); | |
| $a''_k = \xi_{11} = 2\beta$ | if ($\hat{a}_{k-1} = 0$) and ($\hat{a}_{k-2} = 2$); | |
| $a''_k = \xi_{12} = \beta$ | if ($\hat{a}_{k-1} = 0$) and ($\hat{a}_{k-2} = 1$); | |
| $a''_k = \xi_{13} = 0$ | if ($\hat{a}_{k-1} = 0$) and ($\hat{a}_{k-2} = 0$); | |
| $a''_k = \xi_{14} = -\beta$ | if ($\hat{a}_{k-1} = 0$) and ($\hat{a}_{k-2} = -1$); | |

-continued

| | |
|---|---|
| $a''_k = \xi_{15} = -2\beta$ | if ($\hat{a}_{k-1} = 0$) and ($\hat{a}_{k-2} = -2$); |
| $a''_k = \xi_{16} = -\alpha + 2\beta$ | if ($\hat{a}_{k-1} = -1$) and ($\hat{a}_{k-2} = 2$); |
| $a''_k = \xi_{17} = -\alpha + \beta$ | if ($\hat{a}_{k-1} = -1$) and ($\hat{a}_{k-2} = 1$); |
| $a''_k = \xi_{18} = -\alpha$ | if ($\hat{a}_{k-1} = -1$) and ($\hat{a}_{k-2} = 0$); |
| $a''_k = \xi_{19} = -\alpha - \beta$ | if ($\hat{a}_{k-1} = -1$) and ($\hat{a}_{k-2} = -1$); |
| $a''_k = \xi_{20} = -\alpha - 2\beta$ | if ($\hat{a}_{k-1} = -1$) and ($\hat{a}_{k-2} = -2$); |
| $a''_k = \xi_{21} = -2\alpha + 2\beta$ | if ($\hat{a}_{k-1} = -2$) and ($\hat{a}_{k-2} = 2$); |
| $a''_k = \xi_{22} = -2\alpha + \beta$ | if ($\hat{a}_{k-1} = -2$) and ($\hat{a}_{k-2} = 1$); |
| $a''_k = \xi_{23} = -2\alpha$ | if ($\hat{a}_{k-1} = -2$) and ($\hat{a}_{k-2} = 0$); |
| $a''_k = \xi_{24} = -2\alpha - \beta$ | if ($\hat{a}_{k-1} = -2$) and ($\hat{a}_{k-2} = -1$); |
| $a''_k = \xi_{25} = -2\alpha - 2\beta$ | if ($\hat{a}_{k-1} = -2$) and ($\hat{a}_{k-2} = -2$). |

The parameters $\alpha$ and $\beta$ can be adaptively chosen and the table updated periodically by calculating the look-up values $\zeta_1$ through $\zeta_Q$ and inputting them into selector 1906. When decision feedback equalizer 1900 is utilized, for example, as equalizer 505-j in receiver 501-j of FIG. 5B, look-up values $\zeta_1$ through $\zeta^Q$ can be calculated by coefficient update 506-j and read into equalizer 505-j.

Figure 20A:
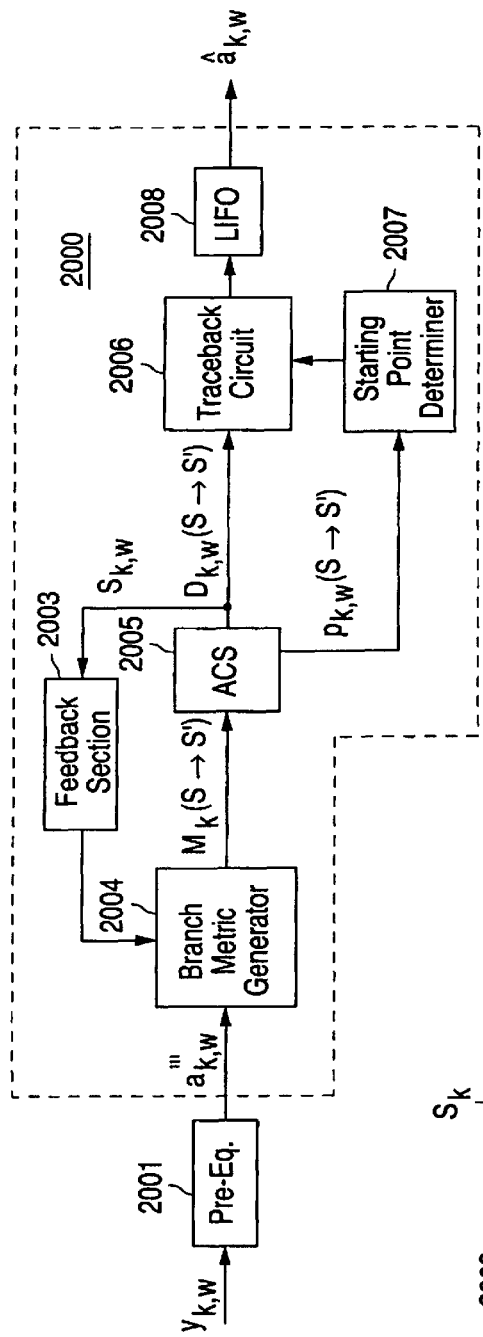
FIG. 20A shows a sequence detector in combination with a decision feedback equalizer.

FIG. 20A shows a sequence detector 2000. Sequence detector 2000 can be any sequence detector system having feedback, including sequence detector 1300 (FIG. 13) and sequence detector 1600 (FIG. 16). As before, sequence detector 2000 utilizes any symbol alphabet and includes trellis decoding for any number of past ISI symbols.

Pre-equalizer section 2001 receives signal $Y_{k,w}$, and executes a transfer function, such as that shown in Equation 32, that removes the ISI influence from all but L past symbols. Feedback section 2003 outputs a signal $a''_{k,w}$ that removes the influence from an additional M past symbols based on the inputs from the ACS. Sequence detector, therefore, utilize states describing the past L-M ISI symbols. FIG. 12, for example, illustrates a trellis diagram for L-M=1. FIGS. 17 and 18, for example, illustrate a trellis diagram for a reduced state sequence detector with L-M =2.

As was described before, branch metric generator 2004 outputs a set of branch metrics $M_k(S \rightarrow S')$ for transitions between states S and state S' of the decoder. ACS 2005 outputs the ACS results to traceback circuitry 2006, the transition metrics to starting point 2007. Traceback circuit 2006 outputs the symbols decided by sequence detector 2000, in reverse chronological order, and LIFO 2008 reverses the order of those symbols to output symbol stream $\hat{a}_{k,w}$.

The output signals $S_{k,w}$ outputted from ACS 2005 to feedback section 2003 are given by the traced back sequence from traceback circuit 2006.

From FIG. 20, if the past L symbols have been properly decoded than the influence of intersymbol interference will be completely canceled. In general, feedback section 2003 can be any feedback structure. An example feedback section is feedback section 811 shown in FIG. 8. Feedback section 811, however, includes M multipliers (multipliers 806-1 through 806-M) and an M-input adder (adder 807) for the case of M ISI symbol cancellation.

One embodiment of feedback section 2003 includes feedback sections like feedback section 811. For Gigabit Ethernet, at symbol rates of 125 Mhz on each wire, the timing constraints of the sequence detector are severe. When "per-survivor processing" (see, e.g., sequence detector 1300 of FIG. 13) is used feed-back section 2003 must include feedback section 811 repeated for each state of equalizer 2000 because the final state of equalizer 2000 is not determined until the latest decision of ACS 2005 (i.e., the parameters $S_{k,w}$ are determined by ACS 2005).

Figure 20B:
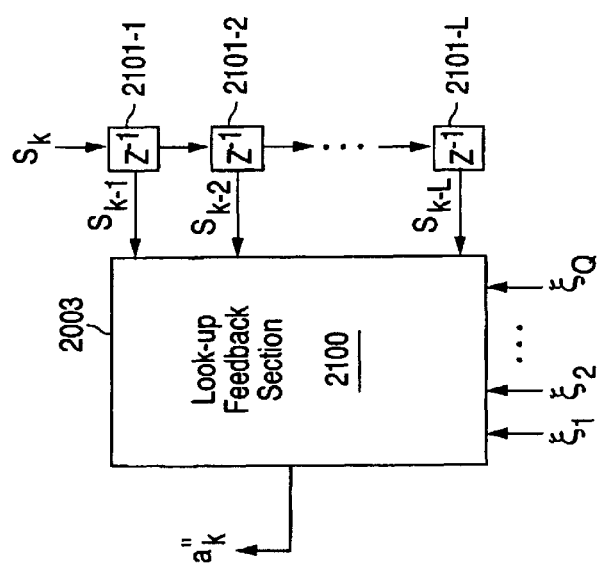
FIG. 20B shows an embodiment of the feedback section of the decision feedback equalizer shown in FIG. 20A that includes a simplified feedback section.
Figure 1:
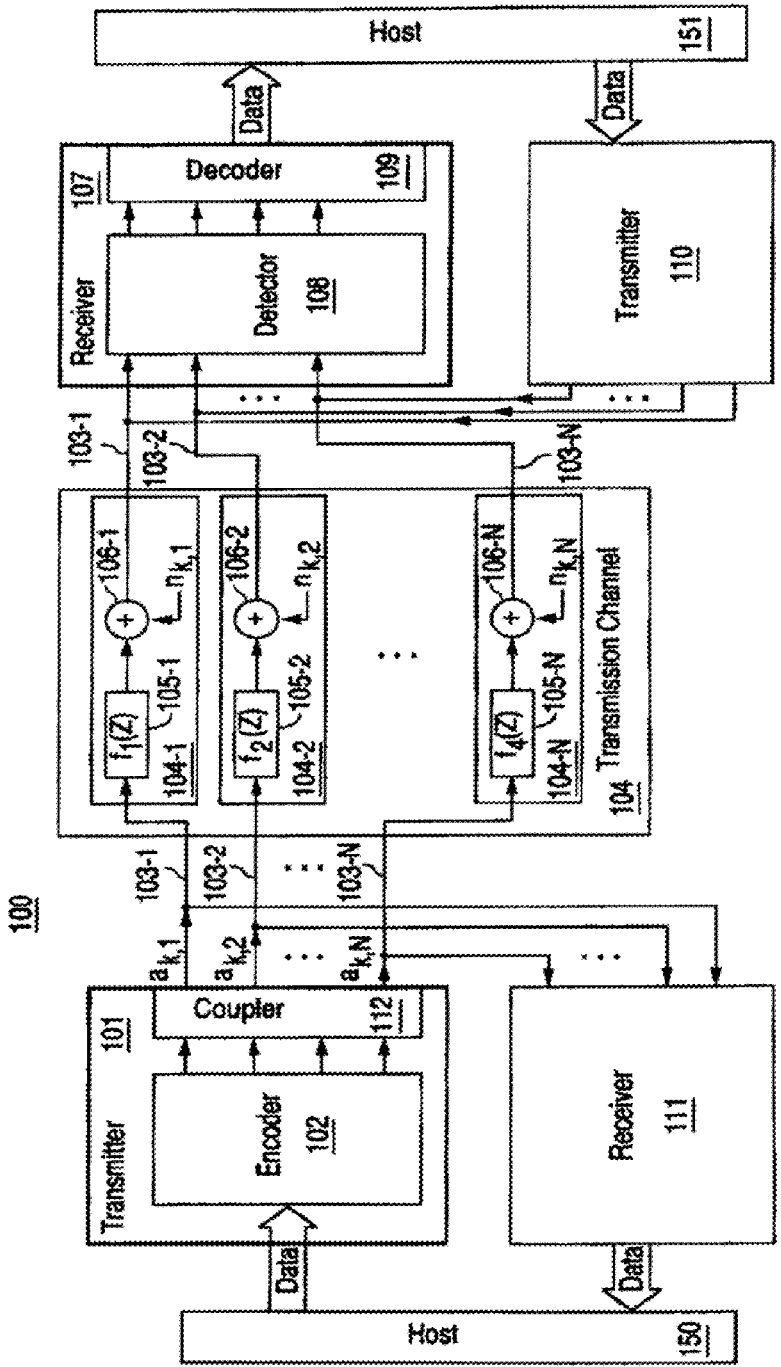
Figure 2:
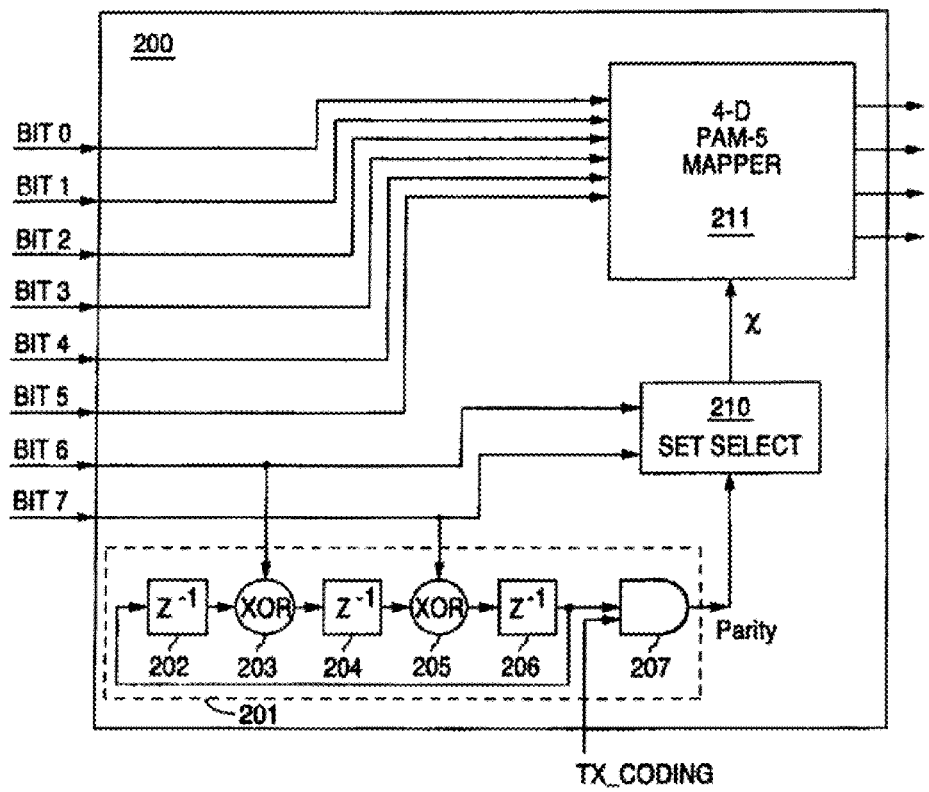
Figure 4:
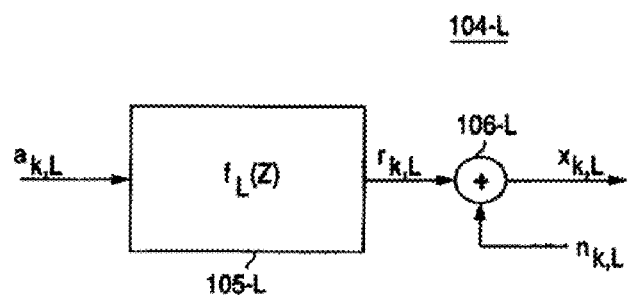
Figure 3:
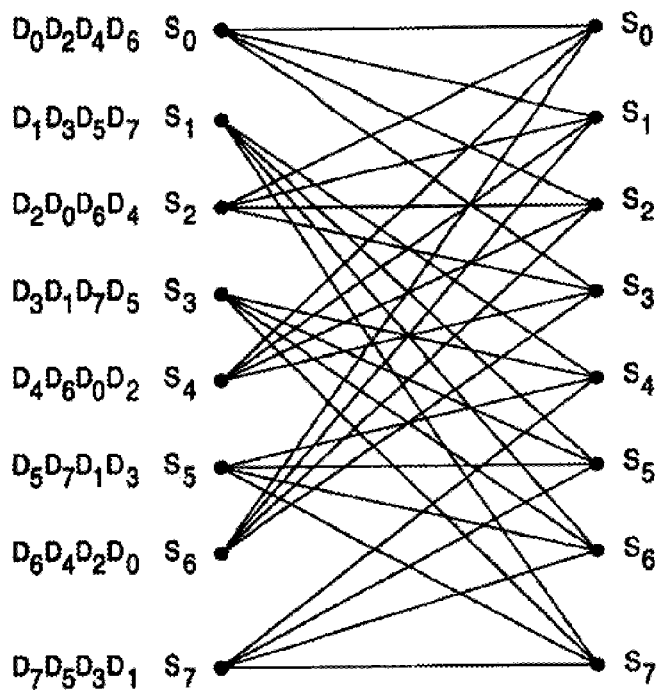
Figure 12:
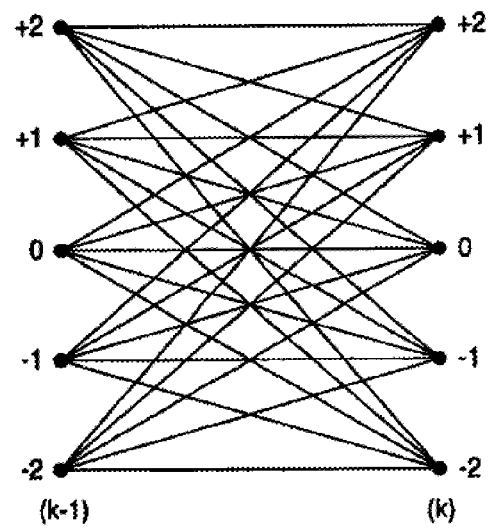
Figure 5A:
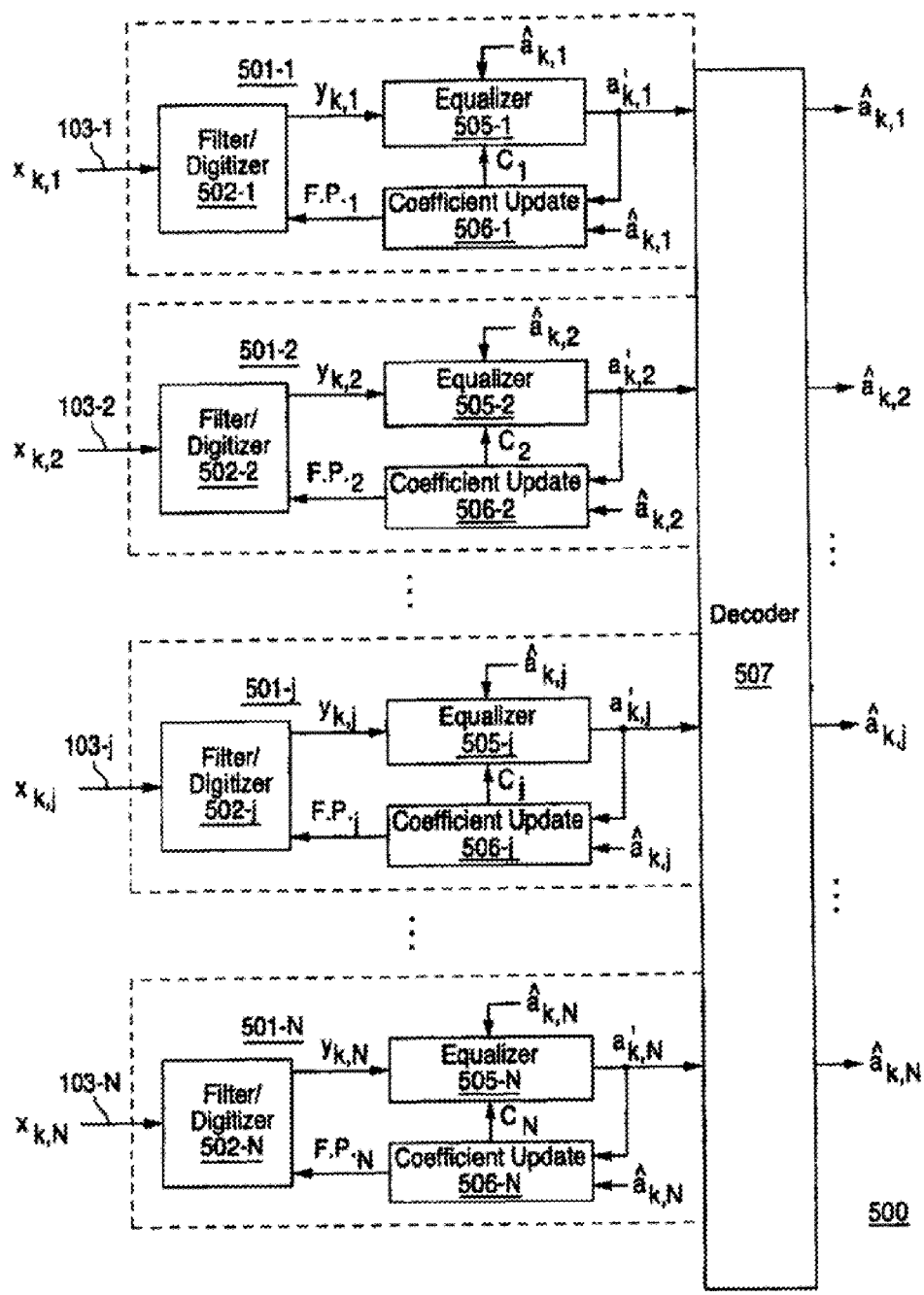
Figure 5B:
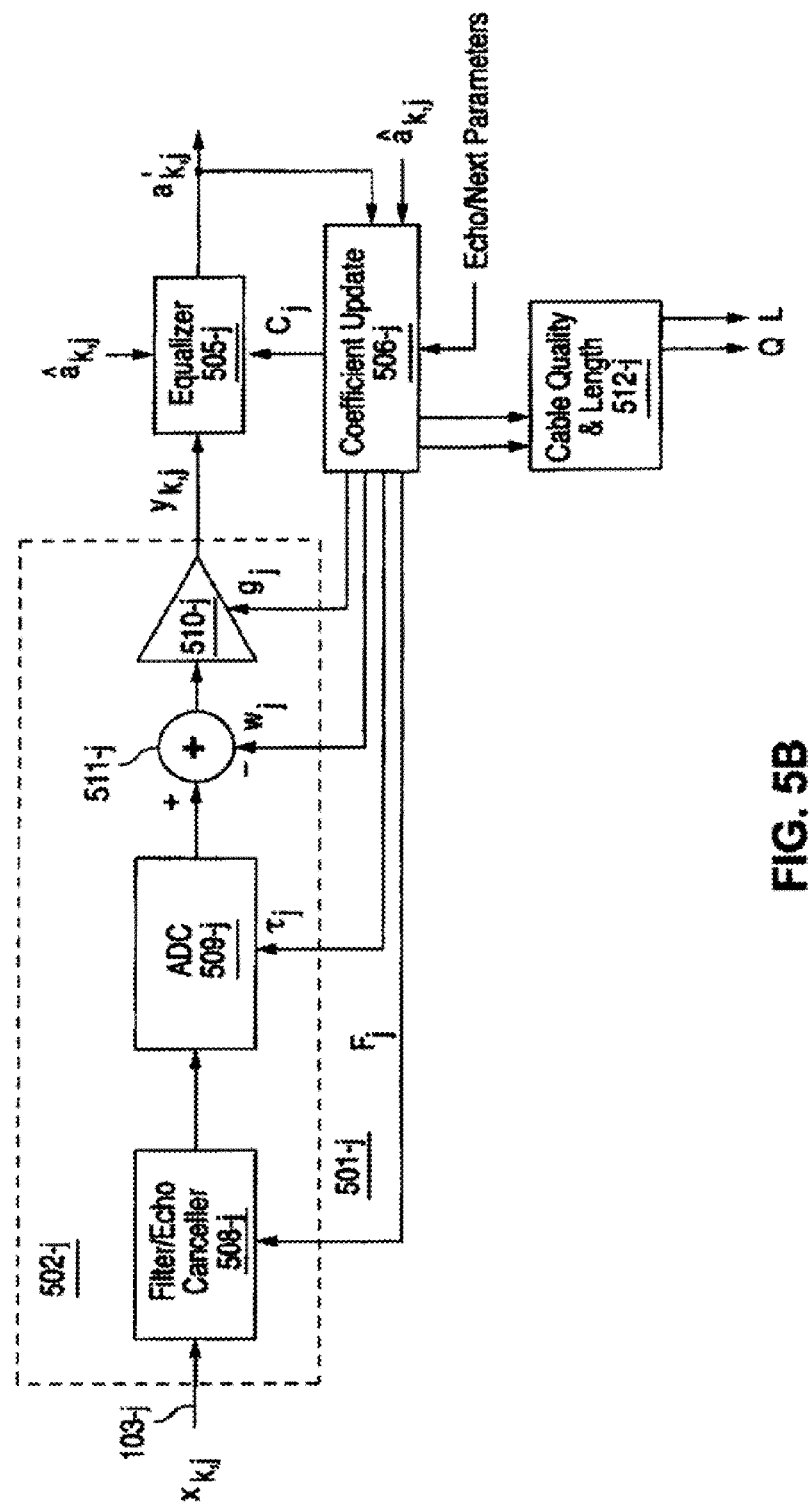
Figure 6:
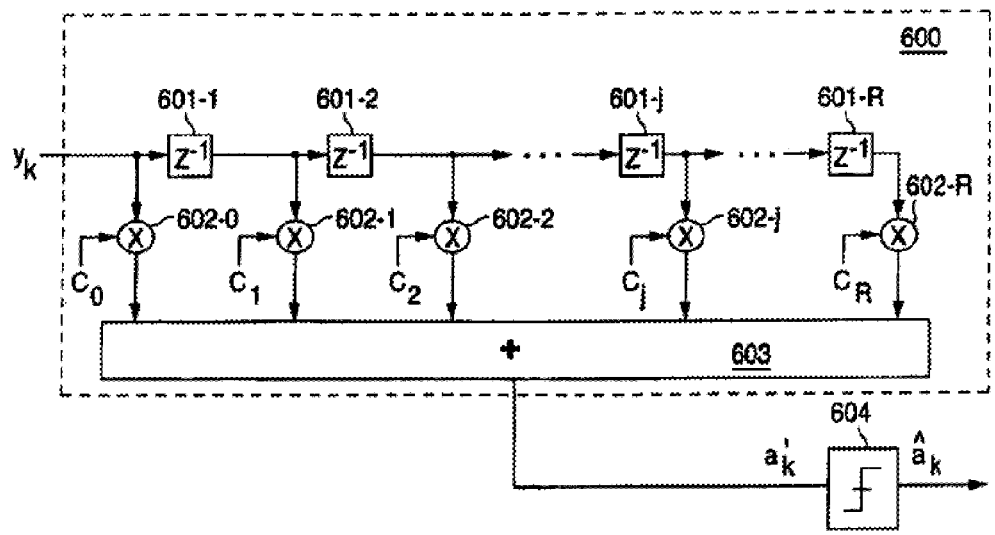
Figure 19:
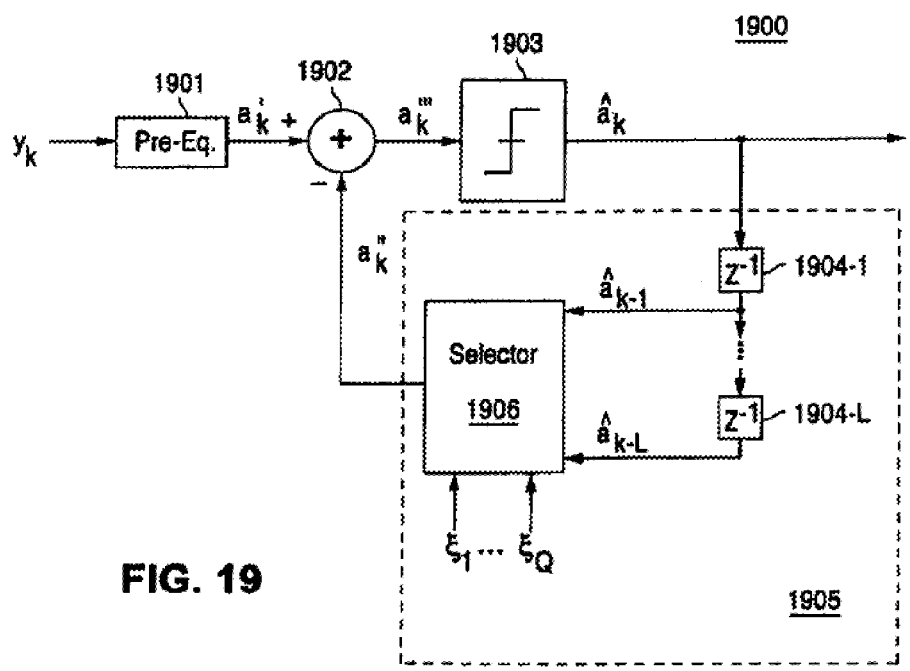
Figure 7:
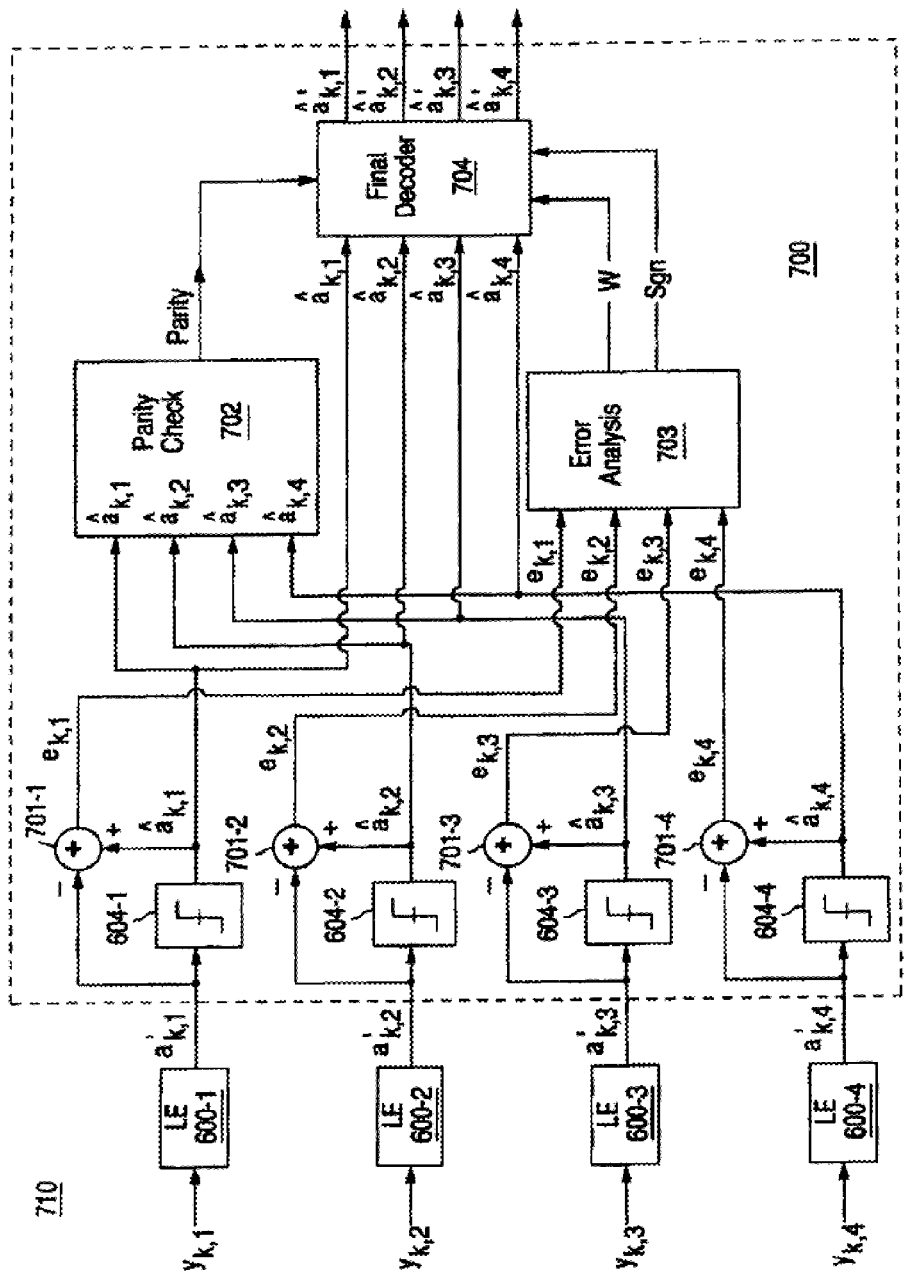
Figure 8:
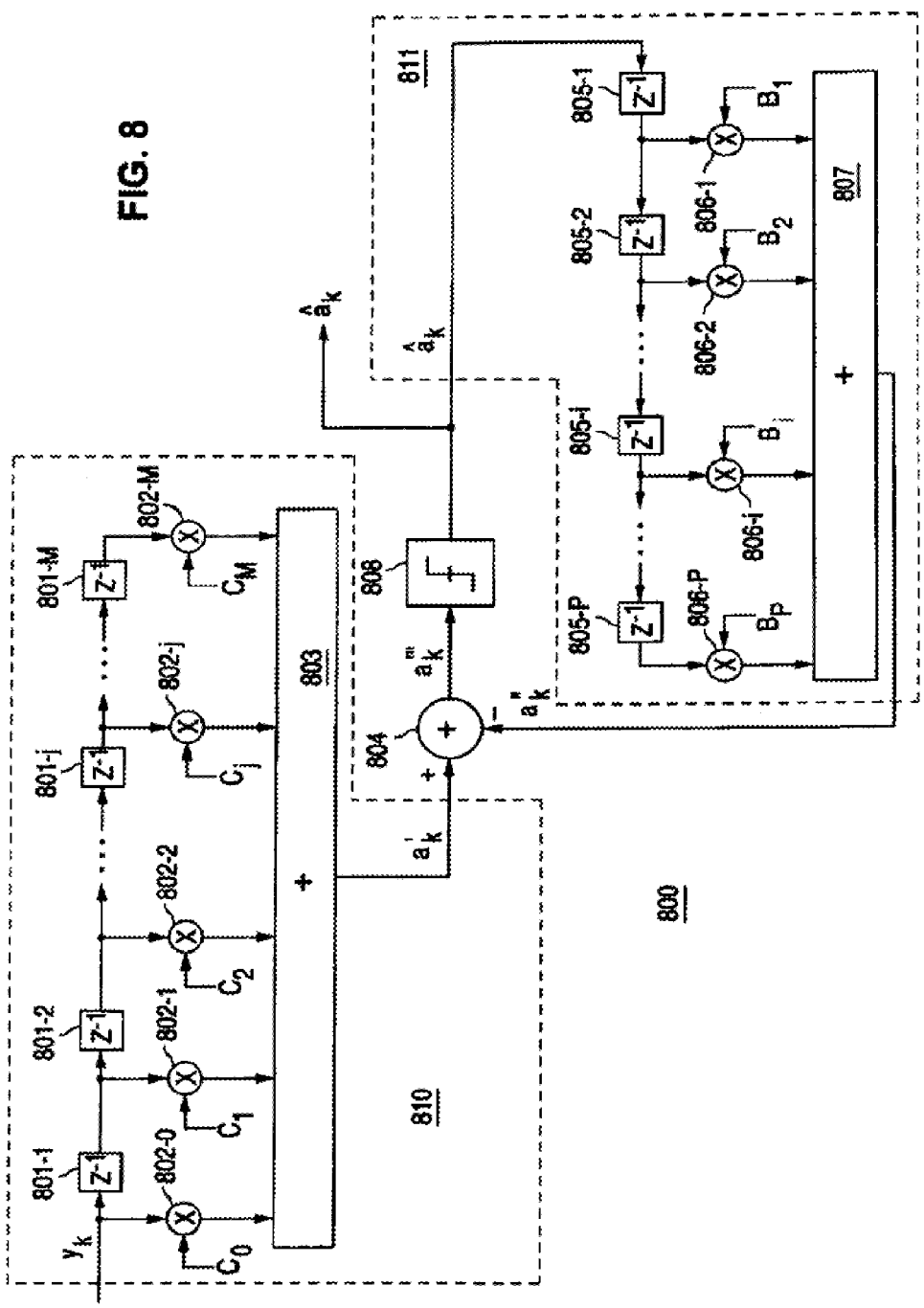
Figure 9:
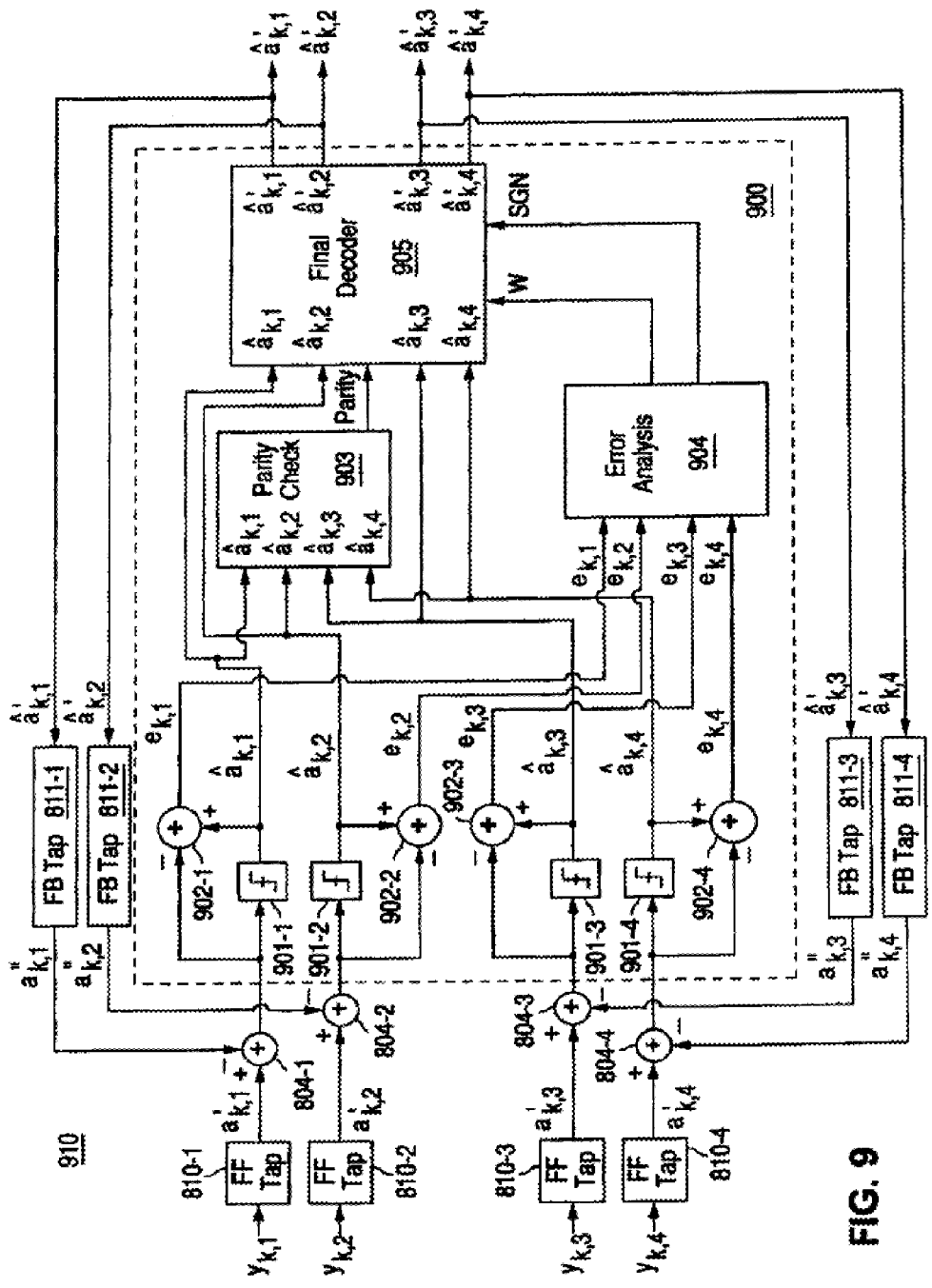
Figure 10:
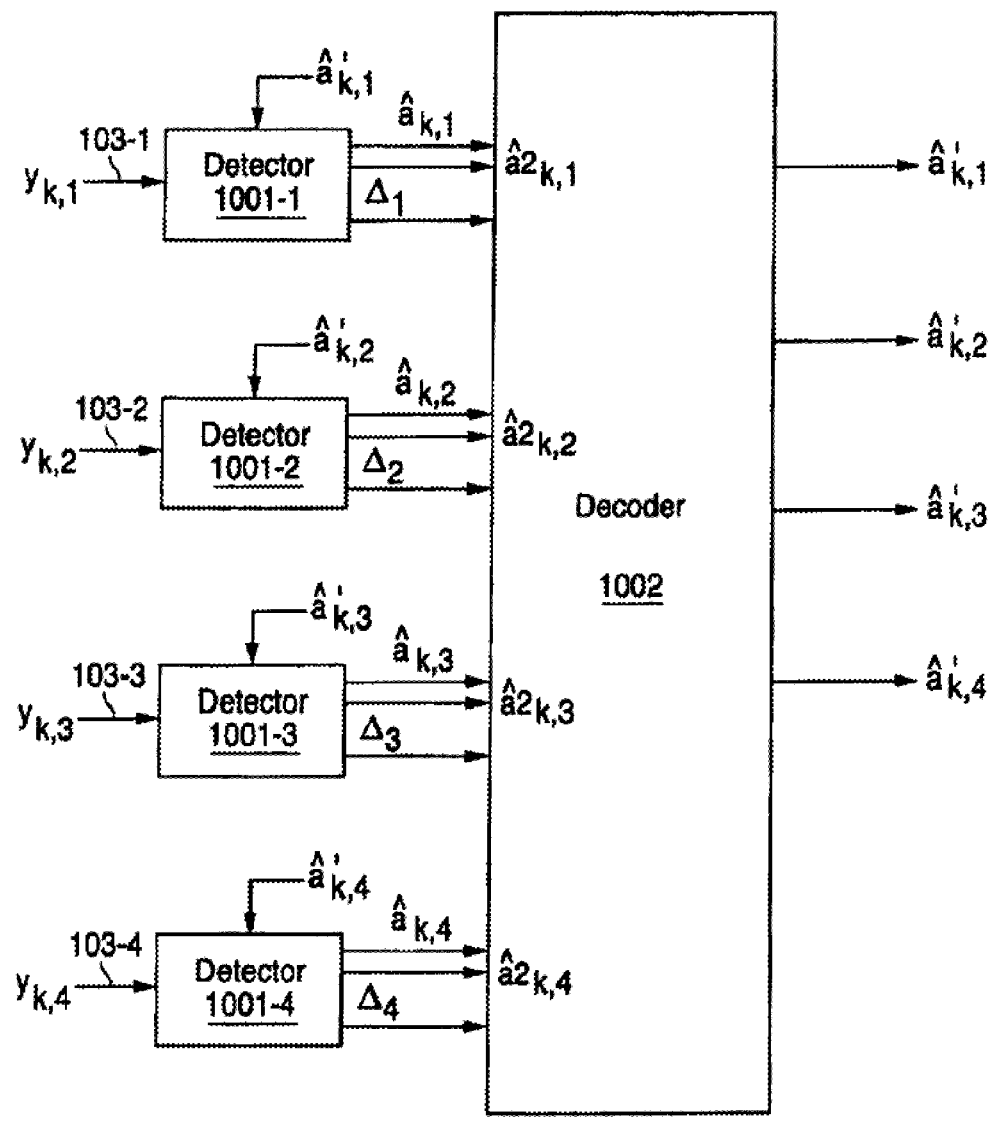

FIG. 20B shows an embodiment of feedback section 2003 that includes a look-up feedback section 2100. Look-up feedback section 2100 outputs an output signal $a''_k$ from look-up values $\zeta_1$ through $\zeta_Q$ in response to the ACS parameters $S_{k-1}$ through $S_{k-L}$. Look-up values $\zeta_1$ through $\zeta_Q$ can be preloaded into feedback section 2100 or may be periodically adaptively chosen and read into feedback section 2100. Values for look-up values through $\zeta_Q$ for two ISI symbols and a PAM-5 symbol alphabet are given above in Equation 34.

The embodiments discussed above are exemplary only and are not intended to be limiting. One skilled in the art will recognize multiple variations of these embodiments that are intended to be included within the scope of this disclosure. As such, the invention is limited only by the following claims.

We claim:

1. A receiver system comprising:

a group of one-dimensional ("1-D") receivers each comprising (a) an input section that processes a corresponding different one of a group of receiver input signals respectively corresponding to the receivers according to a process that comprises serially filtering and digitizing that input signal to generate a corresponding processed signal as a stream of filtered digitized values and (b) an equalizer that performs equalization on an intermediate signal comprising the filtered digitized values or further values generated from the filtered digitized values to produce a corresponding equalized signal as a stream of equalized values;

a group of 1-D symbol selectors respectively corresponding to the receivers, each symbol selector providing a corresponding symbol signal as a stream of 1-D symbols chosen, from a set of predefined 1-D symbols, to be respectively substantially closest to the equalized values of the equalized signal of the corresponding receiver, data for a feedback signal used by the equalizer in each receiver for generating the current equalized value of that receiver's equalized signal being supplied from a lookup table as a function of at least one previous symbol provided from the corresponding symbol selector; and a multi-dimensional decoder that furnishes a stream of multi-dimensional symbols in response to the streams of 1-D symbols.

2. A system as in claim 1 wherein the equalizers alleviate intersymbol interference in the receiver input signals.

3. A system as in claim 1 wherein the feedback signal used by the equalizer in each receiver is supplied from the lookup table for that feedback signal as a function of at least the immediately previous symbol provided from the corresponding symbol selector.

4. A system as in claim 1 wherein the feedback signal used by the equalizer in each receiver is supplied from the lookup for that feedback signal as a function of multiple previous symbols provided from the corresponding symbol selector.

5. A system as in claim 1 wherein the feedback signal used by the equalizer in each receiver is supplied from the lookup table for that feedback signal as a function of multiple consecutive previous symbols, including the immediately previous symbol, provided from the corresponding symbol selector.

6. A system as in claim 1 wherein the equalizer of each receiver produces its equalized signal by negatively adding that equalizer's feedback signal to the corresponding intermediate signal or to an additional signal produced from the corresponding intermediate signal.

7. A system as in claim 1 wherein the equalizer in each receiver comprises:

a pre-equalizer which generates a partially equalized signal in response to the corresponding intermediate signal;

a feedback circuit which generates the feedback signal for that receiver's equalizer; and an arithmetic element which produces that receiver's equalized output signal by negatively adding the feedback signal for that receiver's equalizer to the partially equalized signal.

8. A system as in claim 7 wherein, in generating the current equalized value of the equalized output signal of each receiver, the pre-equalizer in that receiver provides equalization on at least one selected value of that receiver's processed signal where each selected value corresponds to a signal provided by the corresponding symbol selector prior to each symbol used in generating the feedback signal for that receiver's equalizer.

9. A system as in claim 1 wherein:

each symbol selector also generates an error signal as an accuracy estimate for that symbol selector's symbol signal;

the system further includes (a) an error correction circuit responsive to the error signal for generating an error result signal that indicates which of the current equalized values of the equalized signals is most likely incorrect and (b) a parity check circuit responsive to the symbol signals for supplying a parity signal that indicates whether each multi-dimensional is of correct parity; and the multi-dimensional decoder also operates in response to the parity and error result signals for modifying the multi-dimensional symbols in accordance with the current equalized value of the equalized signal most likely to be incorrect if the parity signal indicates a parity error.

10. A system as in claim 1 wherein the receivers include coefficient update circuitry for adaptively changing equalization parameters for the equalizers.

11. A system as in claim 1 wherein the input section of each receiver comprises a filter and an analog-to-digital converter coupled together in series.

12. A system as in claim 11 wherein the filters have echo cancellation capability.

13. A system as in claim 11 wherein the filters have near-end crosstalk cancellation capability.

14. A system as in claim 11 wherein the filters have anti-aliasing capability.

15. A system as in claim 11 wherein each receiver includes an amplifier coupled in series with that receiver's filter and analog-to-digital converter.

16. A system as in claim 1 wherein the receivers have baseline wander correction capability.

17. A receiver system comprising:

a group of one-dimensional ("1-D") receivers, each comprising (a) an input section that processes a corresponding different one of a group of receiver input signals respectively corresponding to the receivers according to a process that comprises serially filtering and digitizing that input signal to generate a corresponding processed signal as a stream of filtered digitized values and (b) a sequence detector that performs sequence detection on an intermediate signal constituted with intermediate values comprising the filtered digitized values or further values generated from the filtered digitized values to approximate sequences of the intermediate values, as sequences, to respectively corresponding sequences of 1-D symbols chosen from a set of predefined 1-D symbols and to provide the sequences of 1-D symbols as a stream of 1-D symbols; and a multi-dimensional decoder that furnishes a stream of multi-dimensional symbols in response to the streams of 1-D symbols.

18. A system as in claim 17 wherein the sequence detectors alleviate intersymbol interference in the receiver input signals.

19. A system as in claim 17 wherein each sequence detector comprises:

a branch metric generator which generates an array of branch metrics for each predefined 1-D symbol for that sequence detector at a kth time period that immediately follows a (k−1)th time period where each branch metric is a measure of how much one of the intermediate values to that sequence detector at the kth time period differs from a transition value for a transition to that predefined 1-D symbol at the kth time period along an allowable path from each different one of the predefined 1-D symbols at the (k−1)th time period;

a determining/comparing circuit which (a) determines a state metric for each predefined 1-D symbol at the kth time period with respect to the intermediate value to that sequence detector at the kth time period and (b) generates a comparison result indicating which state at the (k−1)th time period for each predefined 1-D symbols results in the state metric for that predefined 1-D symbol at the kth time period; and a detector output circuit which provides a sequence of the 1-D symbols based on the comparison results.

20. A system as in claim 19 wherein the determining/comparing circuit of each sequence detector determines its state metrics at the kth time period by a process that entails determining the minimum of a group of sums for each predefined 1-D symbol where each sum is the sum of (a) one of the branch metrics for that predefined 1-D symbol at the kth time period and (b) the associated state metric at the (k−1)th time period.

21. A system as in claim 19 wherein each sequence detector includes a starting point determining circuit which determines a starting state in response to the state metrics for that sequence detector.

22. A system as in claim 19 wherein the branch metric generator in each sequence detector employs the comparison results for that sequence detector in generating the branch metrics for that sequence detector.

23. A system as in claim 19 wherein the determining/comparing circuit of each sequence detector generates for each predefined 1-D symbol at the kth time period (a) a best state metric and a second-best state metric, (b) a best comparison result and a second-best comparison result, and (c) a difference result as a measure of how much the best state metric differs from second-best state metric.

24. A system as in claim 23 wherein the multi-dimensional decoder utilizes the best comparison, second-best comparison, and difference results to correct any errors in the stream of multi-dimensional symbols.

25. A system as in claim 23 wherein the multi-dimensional decoder comprises:

a group of read modules respectively corresponding to the sequence detectors, each read module operating in response to the best comparison, second-best comparison, and difference results for the corresponding sequence detector at the kth time period to generate a best one of the predefined 1-D symbols at the kth time period, a second-best one of the predefined 1-D symbols at the kth time period, and a associated reliability measure at the kth time period;

a parity check circuit which, in response to the best predefined 1-D symbols at the kth time period, generates a parity signal for the kth time period;

an error analysis circuit which operates in response to the reliability measures at the kth time period to generate an error indication signal for the kth time period to indicate which of the best predefined 1-D symbols at the kth time period is most likely to be incorrect; and a decoder circuit which, in response to the best predefined 1-D symbols at the kth time period, the second-best predefined 1-D symbols at the kth time period, the parity signal for the kth time period, and the error indication signal for the kth time period, determines final ones of the predefined 1-D symbols for the kth time period and generates a corresponding multi-dimensional symbol for the kth time period.

26. A system as in claim 25 wherein each read module operates in response to the final predefined 1-D symbols at the kth time period for the corresponding sequence detector to determine a best one of the predefined 1-D symbols at the (k−1)th time period, a second-best one of the predefined 1-D symbols at the (k−1)th time period, and an associated reliability measure at the (−−1)th time period.

27. A system as in claim 25 wherein the branch metric generator employs the comparison results in generating the branch metrics.

28. A system as in claim 27 wherein each sequence detector employs reduced complexity sequence detection.

29. A system as in claim 17 wherein there are at least five different predefined 1-D symbols.

30. A system as in claim 17 wherein each 1-D receiver includes a pre-equalizer that performs equalization on the filtered digitized values of that receiver's processed signal to generate the intermediate values of that receiver's intermediate signal as partially equalized values.

31. A system as in claim 20 wherein each pre-equalizer employs feedforward equalization.

32. A system as in claim 30 wherein coefficients for the pre-equalizers are adaptively chosen.

33. A system as in claim 17 wherein the input section of each receiver comprises a filter and an analog-to-digital converter coupled together in series.

34. A system as in claim 33 wherein the filters have echo cancellation capability.

35. A system as in claim 33 wherein the filters have near-end crosstalk cancellation capability.

36. A system as in claim 33 wherein the filters have anti-aliasing capability.

37. A system as in claim 33 wherein each receiver includes an amplifier coupled in series with that receiver's filter and analog-to-digital converter.

38. A system as in claim 17 wherein the receivers have baseline wander correction capability.

39. A method of receiving a group of input signals transmitted over respectively corresponding channels, the method comprising:

processing each input signal according to a process that comprises serially filtering and digitizing that input signal to generate a corresponding processed signal as a stream of filtered digitized values;

performing equalization on an intermediate signal comprising the filtered digitized values or further values generated from the filtered digitized values to produce a corresponding equalized signal as a stream of equalized values;

generating, for each equalized signal, a corresponding symbol signal as a stream of one-dimensional ("1-D") symbols chosen, from a set of predefined 1-D symbols, to be respectively substantially closest to the equalized values of that equalized signal;

accessing, for use in producing a feedback signal utilized in generating the current value of each equalized signal, a lookup table to obtain data as a function of at least one previous symbol of the corresponding symbol signal; and decoding the streams of 1-D symbols to produce a stream of multi-dimensional symbols.

40. A method as in claim 39 wherein each feedback signal is produced by obtaining, from the lookup table for that feedback signal, data as a function of multiple previous symbols of the symbol signal generated from the corresponding equalized signal.

41. A method as in claim 39 wherein the equalization-performing and table-accessing acts comprise negatively adding each feedback signal to the corresponding intermediate signal or to an additional signal produced from the corresponding intermediate signal.

42. A method as in claim 39 wherein the equalization-performing and table-accessing acts include:

performing, in generating the current equalized value of each equalized signal, equalization on at least one selected value of the corresponding intermediate signal to generate a corresponding partially equalized signal where each selected value corresponds to a symbol of the corresponding symbol signal provided prior to each symbol used in generating the corresponding feedback signal; and negatively adding each feedback signal to the corresponding partially equalized signal.

43. A method as in claim 39 further including:

generating an error signal as an accuracy estimate for each symbol signal;

generating an error result signal that indicates which of the current values of the equalized signals is most likely incorrect;

supplying a parity signal indicating whether each multi-dimensional symbol is of correct parity; and, if the parity signal indicates a parity error, modifying the multi-dimensional symbols in accordance with the current equalized value of the equalized signal most likely to be incorrect.

44. A method as in claim 39 further including adaptively generating coefficients to change algorithms for generating the equalized signals.

45. A method as in claim 39 wherein the signal-processing act includes amplifying each input signal.

46. A method as in claim 39 wherein the filtering of the input signals includes utilizing one or more of echo cancellation, near-end crosstalk cancellation, and anti-aliasing.

47. A method of receiving a group of input signals transmitted over respectively corresponding channels, the method comprising:

processing each input signal according to a process that comprises serially filtering and digitizing that input signal to generate a corresponding processed signal as a stream of filtered digitized values;

performing, for each processed signal, sequence detection on a corresponding intermediate signal constituted with intermediate values comprising the filtered digitized values of that processed signal or further values generated from the filtered digitized values of that processed signal to approximate sequences of those intermediate values, as sequences, to respectively corresponding sequences of one-dimensional ("1-D") symbols chosen from a set of predefined 1-D symbols and to provide the sequences of 1-D symbols as a stream of 1-D symbols; and decoding the streams of 1-D symbols to produce a stream of multi-dimensional symbols.

48. A method as in claim 47 wherein, for each intermediate signal, the sequence-detection-performing act comprises:

generating an array of branch metrics for each predefined 1-D symbol at a kth time period that immediately follows a (k−1)th time period where each branch metric is a measure of how much one of the intermediate values associated with that intermediate signal at the kth time period differs from a transition value for a transition to that predefined 1-D symbol at the kth time period along an allowable path from each different one of the predefined 1-D symbols at the (k−1)th time period;

determining a state metric for each predefined 1-D symbol at the kth time period with respect to the intermediate value of that intermediate signal at the kth time period;

generating a comparison result indicating which state at the (k−1)th time period for each predefined 1-D symbol results in the state metric for that predefined 1-D symbol at the kth time period; and providing a sequence of 1-D symbols based on the comparison results.

49. A method as in claim 48 wherein, for each intermediate signal, the state-metric-determining act comprises determining the minimum of a group of sums for each predefined 1-D symbol where each sum is the sum of (a) one of the branch metrics for that predefined 1-D symbol at the kth time period and (b) the associated state metric at the (k−1)th time period.

50. A method as in claim 48 further including, for each intermediate signal, determining a starting state in response to the state metrics.

51. A method as in claim 48 wherein, for each intermediate signal, the branch-metric-generating act includes employing the comparison results in generating the branch metrics.

52. A method as in claim 48 further including, for each intermediate signal, generating for each predefined 1-D symbol at the kth time period (a) a best state metric and a second-best state metric, (b) a best comparison result and a second-best comparison result, and (c) a difference result as a measure of how much the best state metric differs from second-best state metric.

53. A method as in claim 52 further including utilizing the best comparison, second-best comparison, and difference results to correct any errors in the stream of multi-dimensional symbols.

54. A method as in claim 52 wherein the decoding act comprises:

generating, for each intermediate signal, a best one of the predefined 1-D symbols at the kth time period, a second-best one of the predefined 1-D symbols at the kth time period, and an associated reliability measure at the kth time period in response to the best comparison, second-best comparison, and difference results for that intermediate signal at the kth time period;

generating a parity signal for the kth time period in response to the best predefined 1-D symbols at the kth time period;

generating an error indication signal for the kth time period in response to the reliability measures at the kth time period to indicate which of the best predefined 1-D symbols at the kth time period is most likely incorrect;

determining final ones of the predefined symbols for the kth time period in response to the best predefined 1-D symbols at the kth time period, the second-best predefined symbols of the kth time period, the parity signal for the kth time period, and the error indication signal for the kth time period; and generating a corresponding multi-dimensional symbol for the kth time period.

55. A method as in claim 54 further including, for each intermediate signal, determining a best one of the predefined 1-D symbols at the (k-1)th time period, a second-best one of the predefined 1-D symbols at the (k−1)th time period, and an associated reliability measure at the (k−1)th time period in response to the final predefined 1-D symbol at the kth time period.

56. A method as in claim 47 wherein the sequence-detection-performing act comprises employing reduced complexity sequence detection.

57. A method as in claim 47 further including, for each processed signal, performing equalization on the filtered digitized values of that processed signal to generate the intermediate values of the corresponding intermediate signal as partially equalized values.

58. A method as in claim 57 wherein the equalization comprises feedforward equalization.

59. A method as in claim 57 wherein the signal-processing act includes amplifying each input signal.

60. A method as in claim 57 wherein the filtering of the input signals includes utilizing one or more of echo cancellation, near-end crosstalk cancellation, and anti-aliasing.

* * * * *

UNITED STATES PATENT AND TRADEMARK OFFICE
CERTIFICATE OF CORRECTION

PATENT NO. : 7,050,517 B1  Page 1 of 39
APPLICATION NO. : 09/560109
DATED : May 23, 2006
INVENTOR(S) : Sallaway et al.

It is certified that error appears in the above-identified patent and that said Letters Patent is hereby corrected as shown below:

The title page showing an illustrative figure, should be deleted and substitute therefore the attached title page.

Delete drawing sheets 1 through 18 and substitute therefore the drawing sheets 1 – 18 as attached.

Please delete column 1 line 1 through column 36 line 20 and insert column 1 line 1 through column 36 line 23, as attached Signed and Sealed this Fifteenth Day of July, 2008

JON W. DUDAS
*Director of the United States Patent and Trademark Office*

United States Patent
Sallaway et al.

(10) Patent No.: US 7,050,517 B1
(45) Date of Patent: May 23, 2006

(54) SYSTEM AND METHOD SUITABLE FOR RECEIVING GIGABIT ETHERNET SIGNALS

(75) Inventors: Peter J. Sallaway, San Diego, CA (US); Sreen Raghavan, La Jolla, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/560,109

(22) Filed: Apr. 28, 2000

(51) Int. Cl.
*H04B 1/10* (2006.01)

(52) U.S. Cl. .................................................. 375/350
(58) Field of Classification Search ................ 375/350, 375/316, 341, 346, 262, 229, 233; 714/794, 714/795
See application file for complete search history.

(56) References Cited

U.S. PATENT DOCUMENTS

| | | | |
|---|---|---|---|
| 4,456,893 A | 6/1984 | Otani | 333/18 |
| 4,701,936 A | 10/1987 | Clark et al. | 375/14 |
| 4,888,560 A | 12/1989 | Ogura | 330/254 |
| 4,974,185 A | 11/1990 | Ohno et al. | 364/724.13 |
| 5,031,194 A | 7/1991 | Crespo et al. | 375/14 |
| 5,119,196 A | 6/1992 | Ayanoglu et al. | 358/167 |
| 5,245,291 A | 9/1993 | Fujimura | 324/617 |
| 5,291,499 A | 3/1994 | Behrens et al. | 371/43 |
| 5,465,272 A | 11/1995 | Smith | 375/295 |
| 5,481,564 A | 1/1996 | Kakuishi et al. | 375/230 |
| 5,502,735 A | 3/1996 | Cooper | 371/43 |
| 5,602,507 A | 2/1997 | Suzuki | 329/304 |
| 5,617,450 A | 4/1997 | Kakuishi et al. | 375/230 |
| 5,638,065 A | 6/1997 | Hassner et al. | 341/59 |
| 5,654,667 A | 8/1997 | Adachi | 329/306 |
| 5,809,079 A | 9/1998 | Hayashi | 375/262 |
| 5,818,378 A | 10/1998 | Cheng et al. | 341/155 |

(Continued)

FOREIGN PATENT DOCUMENTS

| | | |
|---|---|---|
| DE | 19626076 | 1/1997 |
| EP | 0410399 A2 | 1/1991 |
| JP | 2-215236 | 8/1990 ... 7/5 |
| JP | 6-334692 | 12/1994 |
| JP | 8-116275 | 5/1996 |
| JP | 08172366 A | 7/1996 |
| JP | 9-148944 | 6/1997 |
| JP | 9-153845 | 6/1997 |
| WO | WO97/11544 | 3/1997 |

OTHER PUBLICATIONS

Lee, E.A. et al., "Digital Communications" (1988), pp. 34–42.
Lee, E.A. et al., "Digital Communications" (1988), pp. 319–345.
Sklar, B., "Digital Communications, Fundamentals and Applications" (1988), pp. 333–337.
Oppenheim, A.V. et al., "Discrete-Time Signal Processing" (1989), pp. 149–191.

(Continued)

*Primary Examiner*—Khai Tran
(74) *Attorney, Agent, or Firm*—Ronald J. Meetin

(57) ABSTRACT

A receiver system contains a group of one-dimensional receivers (501-1–501-N) and a multi-dimensional decoder (507 or 1002). In one embodiment, data for a feedback signal ($a''_k$) used by a digital equalizer (1901/1902/1905) in each receiver for generating the current value of that equalizer's equalized signal ($a'''_k$) is supplied from a lookup table as a function of at least one previous symbol ($\hat{a}_{k,1} \cdots \hat{a}_{k,L}$) provided from a symbol selector (1903) for that receiver. In another embodiment, each receiver contains an input section (502-j) and a sequence detector (1001-j, 1100, 1300, 1400-w, or 1600-w). The input section serially filters and digitizes a corresponding receiver input signal ($x_{k,j}$) to generate a corresponding processed signal ($y_{k,j}$). The sequence detector performs sequence detection on the processed signal or an intermediate signal generated from the processed signal.

60 Claims, 18 Drawing Sheets

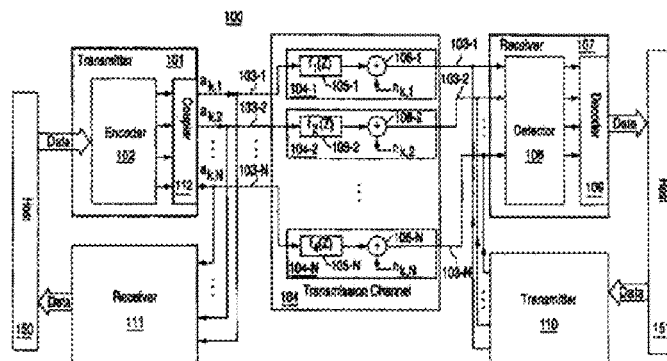

U.S. PATENT DOCUMENTS

| Patent | Date | Inventor | Class |
|---|---|---|---|
| 5,841,478 A | 11/1998 | Hu et al. | 348/426 |
| 5,841,484 A | 11/1998 | Hulyalkar et al. | 348/607 |
| 5,859,861 A | 1/1999 | Oh | 371/43.7 |
| 5,872,668 A | 2/1999 | Muto | 360/65 |
| 5,895,479 A | 4/1999 | Suganuma | 708/301 |
| 5,909,384 A | 6/1999 | Tal et al. | 364/724.19 |
| 5,940,442 A | 8/1999 | Wong et al. | 375/232 |
| 5,949,819 A | 9/1999 | Bjarnason et al. | 375/222 |
| 5,960,011 A | 9/1999 | Oh | 371/46 |
| 5,982,818 A | 11/1999 | Krueger et al. | 375/265 |
| 5,986,831 A | 11/1999 | Muto | 360/46 |
| 6,011,813 A | 1/2000 | Ghosh | 375/233 |
| 6,035,007 A | 3/2000 | Khayrallah et al. | 375/341 |
| 6,038,269 A | 3/2000 | Raghavan | 375/340 |
| 6,047,022 A | 4/2000 | Reuven | 375/222 |
| 6,047,024 A | 4/2000 | How | 375/229 |
| 6,115,418 A | 9/2000 | Raghavan | 375/233 |
| 6,148,046 A | 11/2000 | Hussein et al. | 375/345 |
| 6,178,198 B1 | 1/2001 | Samueli et al. | 375/214 |
| 6,226,332 B1 | 5/2001 | Agazzi et al. | 375/288 |
| 6,252,904 B1 | 6/2001 | Agazzi et al. | 375/233 |
| 6,253,345 B1 | 6/2001 | Agazzi et al. | 714/752 |
| 6,385,238 B1 | 5/2002 | Nguyen | 375/232 |
| 6,400,760 B1 | 6/2002 | Cm et al. | 375/233 |
| 6,415,003 B1 * | 7/2002 | Raghavan | 375/317 |
| 6,418,172 B1 | 7/2002 | Raghavan et al. | 375/262 |
| 6,421,381 B1 * | 7/2002 | Raghavan et al. | 375/233 |
| 6,438,163 B1 | 8/2002 | Raghavan et al. | 375/233 |
| RE37,826 E | 9/2002 | Samueli et al. | 370/402 |
| 6,542,477 B1 | 4/2003 | Pal et al. | 370/286 |

OTHER PUBLICATIONS

ANSI, Fibre Distributed Data Interface-Part: Token Ring Twisted Pair Physical Layer Medium Dependent (Mar. 1995), pp. 1-81.

IEEE, Standard 802.3u (1995), pp. 1-393.

IEEE, Draft P802.3ab/D1.1 (1997), pp. 1-125.

* cited by examiner

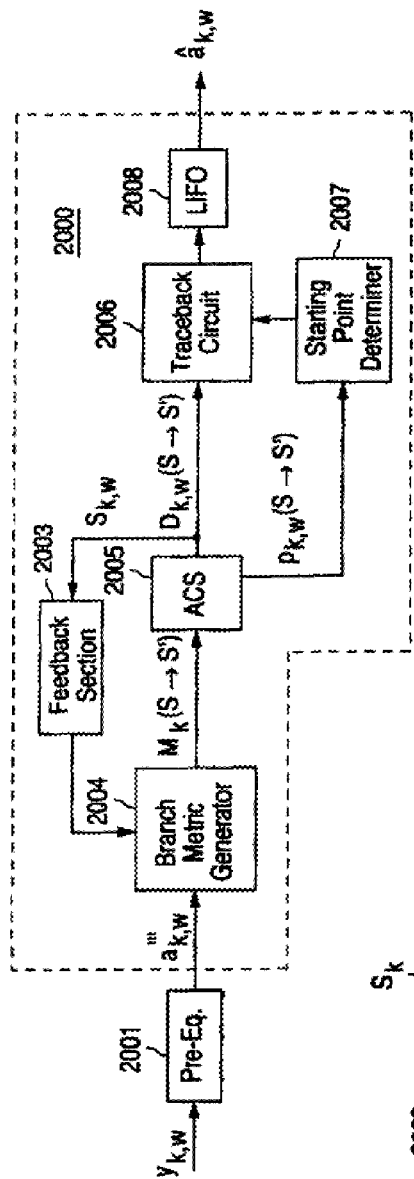
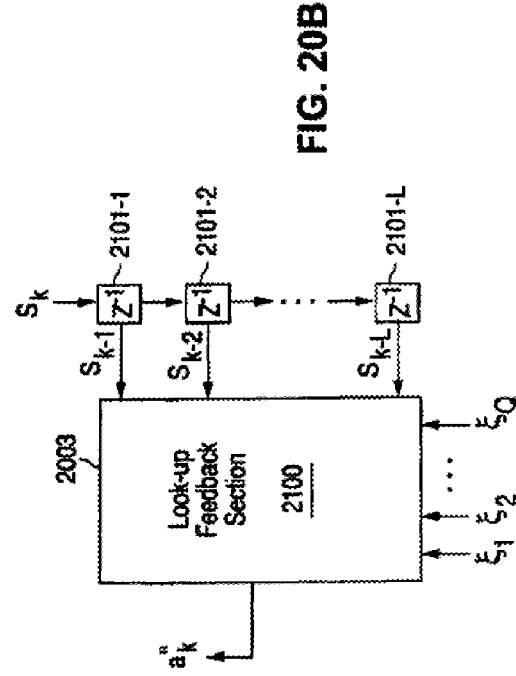
FIG. 20A
FIG. 20B

SYSTEM AND METHOD SUITABLE FOR RECEIVING GIGABIT ETHERNET SIGNALS

BACKGROUND

1. Field of the Invention

This invention relates to digital communication systems and, more particularly, to a detection system and method for an Ethernet receiver.

2. Discussion of Related Art

The dramatic increase in desktop computing power driven by Intranet-based operations and the increased demand for time-sensitive delivery between users has spurred development of high-speed Ethernet LANs. 100BASE-TX Ethernet, using existing category-5 copper wire, and the newly developed 1000BASE-T Ethernet for gigabit/s transfer of data over category-5 copper wire require new techniques in high speed symbol processing. Gigabit per second transfer can be accomplished utilizing four twisted pairs and a 125 megasymbol/s transfer rate on each pair where each symbol represents two bits.

Physically, data is transferred using a set of voltages where each voltage represents one or more bits of data. Each voltage in the set is referred to as a symbol and the whole set of voltages is referred to as a symbol alphabet. In gigabit transfer, for example, data is usually sent with a set of five voltage levels (PAM-5), each symbol representing two (2) bits.

One system of transferring data at high rates is Non Return to Zero (NRZ) signaling. In NRZ, the symbol alphabet $\{A\}$ is $\{-1, +1\}$. A logical "1" is transmitted as a positive voltage while a logical "0" is transmitted as a negative voltage. At 125 M symbols/s, the symbol rate required for gigabit transfer over four category-5 wires, the pulse width of each symbol is 8 ns.

Another example of a modulation method for high speed symbol transfer is MLT3 and involves a three level system. (See American National Standard Information system, *Fibre Distributed Data Interface (FDDI)—Part: Token Ring Twisted Pair Physical Layer Medium Dependent (TP-PMD)*, ANSI X3.263:199X). The symbol alphabet for MLT3 is $\{A\}=\{-1, 0, +1\}$. In MLT3 transmission, a logical 1 is transmitted by either a $-1$ or a $+1$ while a logic 0 is transmitted as a 0. A transmission of two consecutive logic "1"s does not require the system to pass through zero in the transition. A transmission of the logical sequence ("1", "0", "1") would result in transmission of the symbols $(+1, 0, -1)$ or $(-1, 0, +1)$, depending on the symbols transmitted prior to this sequence. If the symbol transmitted immediately prior to the sequence was a $+1$, then the symbols $(+1, 0, -1)$ are transmitted. If the symbol transmitted before this sequence was a $-1$, then the symbols $(-1, 0, +1)$ are transmitted. If the symbol transmitted immediately before this sequence was a 0, then the first symbol of the sequence transmitted will be a $+1$ if the previous logical "1" was transmitted as a $-1$ and will be a $-1$ if the previous logical "1" was transmitted as a $+1$.

The detection system in the MLT3 standard needs to distinguish between 3 voltage levels, instead of two voltage levels in a more typical two level system. The signal to noise ratio required to achieve a particular bit error rate is higher for MLT3 signaling than for two level systems. The advantage of the MLT3 system, however, is that the energy spectrum of the emitted radiation from the MLT3 system is concentrated at lower frequencies and therefore more easily meets FCC radiation emission standards for transmission over twisted pair cables. Other communication systems may use a symbol alphabet having more than two voltage levels in the physical layer in order to transmit multiple bits of data using each individual symbol.

In Gigabit Ethernet over twisted pair Category-5 cabling, for example, PAM-5 data can be transmitted over four twisted copper pairs at an individual twisted pair baud rate of 125 Mbaud. In PAM-5, data is sent with 5 voltage levels, designated as symbol alphabet $\{A\}=\{-2, -1, 0, 1, 2\}$ although the actual voltage levels may be different from those. Each symbol, therefore, can be used to code more than one bit of data.

Any other modulation scheme for symbol coding can be utilized, including quadrature amplitude modulation (QAM). In QAM schemes, for example, the symbols are arranged on a two-dimensional (real and imaginary) symbol constellation (instead of the one-dimensional constellations of the PAM-5 and MLT-3 symbol alphabets).

There is a need for transmitters and receivers for receiving transmission over multiple twisted copper pairs using larger symbol alphabets (i.e., 3 or more symbols). There is also a need for transceiver (transmitter/receiver) systems that, while operating at high symbol rates, have low bit error rates.

SUMMARY

Accordingly, a receiver and detection method for receiving transmission of data over multiple wires using encoded data symbol schemes having multiple symbols is described. A receiver according to the present invention includes multiple detectors for detecting one symbol from each of the multiple wires simultaneously (i.e., multiple 1-D detectors), an equalizer coupled to each of the detectors for equalizing the symbol stream from each of the multiple wires, and a multi-dimensional error analyzer/decoder for simultaneously making hard decisions regarding the symbol output of the symbols transmitted over each of the multiple wires.

Individual symbols can have any modulation scheme, including those with multi-dimensional constellations. The terminology of detecting N-dimensional (N-D) symbols refers to the number of individual symbols detected in each clock cycle, and not to the dimension of the symbol constellation.

Each of the equalizers can be any equalizer structure, including linear or decision feedback equalizers. In one embodiment of the invention, the equalizers include sequence detection equalizers. In another embodiment of the invention, the equalizers include simplified decision feedback equalizers.

In another embodiment, the equalizer includes a sequence detection equalizer in combination with a linear equalizer or a decision feedback equalizer. In some embodiments, the sequence detection equalizer is a reduced state sequence detector. In some embodiments, the decision feedback equalizer is a simplified decision feedback equalizer.

In general, a transceiver according to the present invention can utilize any symbol alphabet. In some embodiments, a PAM-5 symbol alphabet is utilized.

Some embodiments of the invention can also include an error analysis decoder. The receiver receives signals from N individual wires and, for each wire, includes a linear equalizer in combination with a one-dimensional (1-D) sequence detector. The N output signals from the N 1-D sequence detectors are input to a N-D decoder that makes a final decision on the N-D symbol. In some embodiments of the invention, the error analysis decoder operates with lattice encoding schemes. In some other embodiments of the invention, the error analysis decoder operates with a parity encoding scheme.

These and other embodiments of a transceiver system according to the present invention are further described below with reference to the following figures.

BRIEF DESCRIPTION OF THE FIGURES

FIG. 1 shows a block diagram of a transceiver having multiple transport channels.

FIG. 2 shows a block diagram of an encoder capable of both trellis encoding and parity encoding.

FIG. 3 shows a trellis diagram for state transitions among subsets of PAM-5 four-dimensional (4-D) symbols.

FIG. 4 shows a block diagram of a model of transmission channel between a transmitter and a receiver system.

FIG. 5A shows a block diagram of a N-D receiver system according to the present invention.

FIG. 5B shows a block diagram of a receiver according to the present invention for the N-D receiver system of FIG. 5A.

FIG. 6 shows a block diagram of a linear equalizer.

FIG. 7 shows a block diagram of the equalizer and decoder portions of a 4-D receiver system that includes linear equalizers and parity encoding.

FIG. 8 shows a block diagram of a decision feedback equalizer.

FIG. 9 shows a block diagram of the equalizer and decoder portions of a 4-D receiver system that includes decision feedback equalization.

FIG. 10 shows a block diagram of a 4-D receiver system that includes sequence detection equalizers.

FIG. 11A shows a block diagram of a sequence detector.

FIG. 11B shows a block diagram of an embodiment of an equalizer system.

FIG. 12 shows an example of a trellis diagram for state transitions between PAM-5 symbols.

FIG. 13 shows a block diagram of an embodiment of a sequence detector equalizer with decision feedback according to the present invention.

FIG. 14 shows a block diagram of an embodiment of a sequence detector equalizer having soft outputs according to the present invention.

FIG. 15 shows a block diagram of an embodiment of a parity code receiver that includes soft output sequence detection equalizers according to the present invention.

FIG. 16 shows an embodiment of a reduced complexity sequence detector having soft outputs according to the present invention.

FIG. 17 shows an example of a trellis diagram illustrating state changes between reduced states of a reduced complexity sequence detector, including multiple branches between states.

FIG. 18 shows a trellis diagram illustrating state changes between the reduced states of a reduced complexity sequence detector after branch path decisions have been made.

FIG. 19 shows a block diagram of a decision feedback equalizer having a simplified feedback section according to the present invention.

FIG. 20A shows a sequence detector in combination with a decision feedback equalizer.

FIG. 20B shows an embodiment of the feedback section of the decision feedback equalizer shown in FIG. 20A that includes a simplified feedback section.

In the figures, components having similar functions are often labeled similarly.

DETAILED DESCRIPTION

FIG. 1 shows a block diagram of a transceiver system 100 according to the present invention. Transceiver system 100 includes transmitter 101, receiver 107, and transport wires 103-1 through 103-N. A digital data stream is input to transmitter 101 by a first host 150. Transmitter 101 includes encoder 102, which encodes the data for transmission over transport wires 103-1 through 103-N. Transmission coupler 112 couples the encoded symbols received from encoder 102 to transmission channel 104. Data is output by transmission coupler 112 as symbols $a_{k,1}$ through $a_{k,N}$ over wires 103-1 through 103-N (collectively referred to as cable 103), respectively, which are coupled between transmitter 101 and receiver system 107. Wires 103-1 through 103-N can be of any transport medium or combination of transport media. Transport media include, for example, category-5 twisted copper pair, optical fiber and coax cable.

The index k in the above notation indicates the kth time cycle of the data transmission. The indicator N is an integer indicating the number of individual transport wires in cable 103. In general, any number of wires can be included in transceiver system 100. For gigabit transmission, N is usually four (4), indicating a four wire connection between transmitter 101 and receiver system 107. Wires 103-1 through 103-4 are often twisted copper pair.

Transmission channel 104 collectively represents cable 103 and any distortion of the signals that occurs between transmitter 101 and a receiver 107. Each of wires 103-1 through 103-N, along with output couplers of coupler 112 and input couplers of detector 108, distorts signals as indicated by the associated transmission channel 104-1 through 104-N, respectively. The signals through wires 103-1 through 103-N are distorted by channel functions $f_1(Z)$ through $f_N(Z)$, respectively, and additionally suffer from a random noise addition $n_{k,1}$ through $n_{k,N}$, respectively. Receiver 107 includes a signal detector 108 and a decoder 109 and ultimately outputs a data stream which corresponds to the data stream entering transmitter 101.

In Gigabit Ethernet, transmission can be conducted on four twisted copper pairs (i.e., wires 103-1 through 103-4 in FIG. 1) in a full duplex fashion to achieve one gigabit per second throughput. See IEEE 802.3ab, Gigabit Long Haul Copper Physical Layer Standards Committee, 1997 (hereinafter "Gigabit Standard"). Transmitter 101 is coupled to first host 150 to receive data for transmission over transmission channel 104 to a second host 151 coupled to receiver 107. In general, first host 150 is further coupled to a receiver 111 for receiving data from transmission channel 104 and second host 151 is coupled to a transmitter 110 for sending data to transmission channel 104.

Although, in general, the detection system as described here is applicable to any scheme of data transmission (i.e., any symbol alphabet) over any number of transport wires (e.g., twisted copper pair), for exemplary purposes many of the examples below specifically describe a PAM-5 symbol alphabet transmitted over four twisted copper pairs, as would be used in Gigabit Ethernet transmission over Category-5 twisted pair cabling. It should be recognized that other symbol alphabets and numbers of conductors can also be used and that one skilled in the art will recognize from this disclosure embodiments appropriate for other modulation schemes.

Encoder

According to the developed IEEE 802.3ab standard for Gigabit Ethernet transmission, the transmitted symbols on each of four conductors 103-1 through 103-4 are chosen from a five level Pulse Amplitude Modulation (PAM-5) constellation, with alphabet $\{A\}=\{-2, -1, 0, +1, +2\}$. See Gigabit Standard. At each clock cycle, a single one-dimensional (1-D) symbol is transmitted on each wire. The four 1-D symbols, one on each of conductors 103-1 through 103-4, transmitted at a particular sample time k are considered to be a single 4-D symbol. In general, data entering transmitter 101 can be encoded into a N-D symbol, instead of into N 1-D symbols, by encoder 102. Encoder 102 may be any type of N-D encoder, including a N-D parity code encoder and a N-D trellis code encoder.

To achieve one gigabit per second communications, a Gigabit Ethernet transceiver needs to achieve a throughput of 250 Megabits per second over each of four transport wires 103-1 through 103-4. Therefore, at a 125 MHz baud rate, two bits must be transmitted at each sample time across each wire of cable 103. Although a PAM-5 system is applicable, a four level PAM system, for example, does not provide redundancy which allows for error correction coding necessary to achieve a bit error rate (BER) of $10^{-10}$, as required by the Gigabit Ethernet standard. See Gigabit Standard.

In addition, extra channel symbols are needed to represent Ethernet control characters. Therefore, five level PAM (PAM-5) with either a parity check code or trellis coding is often utilized in Gigabit Ethernet transmission. According to the Gigabit Standard, the trellis coding is the only coding utilized. Alphabets having more than five level 1-D symbols may also be utilized for gigabit transmission while achieving the required BER.

At 125 Mbaud, each 4-D symbol needs to transmit at least eight bits. Therefore, 256 different 4-D symbols plus those required for control characters are required. By transmitting a 4-D PAM-5 symbol alphabet, there are $5^4 = 625$ possible symbols. This number of symbols allows for 100% redundancy in the data as well as for several control codes. Symbol alphabets having more than five symbols yield even greater redundancy. However, because of the difficulties in distinguishing between the higher number of voltage levels, higher error rates may be suffered in receiver detection systems, such as detector 108 of FIG. 1.

The Gigabit Ethernet standard (see Gigabit Standard) allows a trellis code. However, both a 4-D eight state trellis code and a 4-D parity code have been proposed. The trellis code achieves 6 dB of coding gain over uncoded PAM-5 while the parity code achieves 3 dB of coding gain. While encoding, the choice between encoders can be encoded in a TX_CODING bit, which can be set to one for trellis coding. One skilled in the art will recognize that embodiments of the present invention are applicable to any error correction technique.

4-D Trellis Encoding

Trellis encoding in a conventional 4-D eight state code is described in Part II, Table IV of G. Ungerboeck, "Trellis-Coded Modulation with Redundant Signal Sets, Part I: Introduction", *IEEE Communications Mag.*, vol. 25, no. 2, pp. 5–11, February 1987, and "Trellis-Coded Modulation with Redundant Signal Sets, Part II: State of the Art", *IEEE Communications Mag.*, vol. 25, no. 2, pp. 12–21, February 1987 (hereinafter collectively "Ungerboeck"). An embodiment of an eight state trellis encoder 200 similar to that described in Ungerboeck is shown in FIG. 2. Trellis encoder 200 receives eight bits, bits 0 through 7, and outputs 9 bits, bits 0 through 7 plus a parity bit, provided that TX_CODING is set to 1. The parity bit is produced from a rate ⅔ memory 3, systematic convolutional encoder 201.

Convolutional encoder 201 includes delays 202, 204 and 206, each of which delays its input signal by one clock cycle. The output signal from delay 202 is XORed (exclusive-ORed) with bit 6 in XOR 203 and input to delay 204. The output signal from delay 204 is XORed with bit 7 in XOR 205 and input to delay 206. The output signal from delay 206 is input to AND gate 207 and input to delay 202. AND gate 207 generates the parity bit, which is one (1) if TX_CODING is one (1) and the output signal from delay 206 is 1, and zero otherwise. In embodiments that only utilize trellis coding (i.e., TX_CODING is always 1), AND gate 207 may be excluded from encoder 200 and the parity bit is the output signal from convolutional encoder 201.

The two input bits to convolutional encoder 201 (bits 6 and 7), and the parity bit produced by encoder 201 select one of eight subsets, D0 through D7, of the 4-D symbol alphabet. The nine output bits are mapped to one 4-D PAM-5 symbol that is then transmitted across cable 103 (FIG. 1) as four 1-D PAM-5 symbols.

Each 1-D PAM-5 symbol is a member of one of two families, X (odd) and Y (even). The odd set X contains the PAM-5 symbols $\{-1, +1\}$ and the even set Y contains the PAM-5 symbols $\{-2, 0, +2\}$. Table 1 shows a definition of the eight subsets of 4-D symbols labeled D0 through D7. The definition is based on the membership of 1-D PAM-5 symbols that are represented in each subset. Table 1 also shows the number of 4-D symbols included in each of the subsets.

The notation describing each subset indicates the families of 1-D PAM-5 symbols on each of the four wires describing membership in that subset. The notation XXYX, for example, indicates a set of four 1-D PAM-5 symbols where the first symbol is from type X, the second symbol is from type X, the third symbol is from type Y, and the fourth symbol is from type X. Therefore, conductor 103-1 (FIG. 1) carries a symbol of type X, conductor 103-2 carries a symbol of type X, conductor 103-3 carries a symbol of type Y and conductor 103-4 carries a symbol of type X.

TABLE 1

Mapping of 4-D symbols into sets D0 through D7

| Subset | X Primary Code | Y Primary Code | # of Symbols |
|--------|----------------|----------------|--------------|
| D0 | XXXX | YYYY | 97 |
| D1 | XXXY | YYYX | 78 |
| D2 | XXYY | YYXX | 72 |
| D3 | XXYX | YYXY | 78 |
| D4 | XYYX | YXXY | 72 |
| D5 | XYYY | YXXX | 78 |
| D6 | XYXY | YXYX | 72 |
| D7 | XYXX | YXYY | 78 |

The parity bit and bits 6 and 7 are input to set select 210 (FIG. 2). Set select 210 determines a particular subset selection p, indicating that subset $D_p$ of subsets $D_0$ through $D_7$ has been selected. In one embodiment, subset selection p is determined according to the formula $$p = 4*BIT6 + 2*BIT7 + 1*Parity, \quad (1)$$

where BIT6 is bit 6, BIT7 is bit 7, and Parity is the parity bit.

A point within subset p is chosen by the six least significant bits of the input, bits 0 through 5. Bits 0 through 5 are input to a 4-D PAM-5 mapper 211 along with the output χ of set select 210. 4-D PAM-5 mapper 211 determines the 4-D PAM-5 symbol within set $D_p$, which represents the eight input bits, bits 0 through 7, and the parity bit. Each subset, D0 through D7, contains more than the 64 points required to encode the six bits, bits 0 through 5. These additional points are either used as control characters or not used at all.

The subset mapping shown in Table 1 is chosen such that the squared Euclidean distance between any pair of points in the same subset is greater than or equal to four (4). For example, the squared distance between two points in subset D0 can be expressed as $(X_{11}-X_{12})^{}2+(X_{21}-X_{22})^{}2+(X_{31}-X_{32})^{}2+(X_{41}-X_{42})^{}2$. Because $X_{ij}=+2, 0,$ or $-2$, the shortest squared distance is $(2-0)^{**}2=4$, which occurs when only one value differs between the two points. In addition, the squared Euclidean distance between points in different even subsets is greater than or equal to 2 and the squared Euclidean distance between points in different odd subsets is greater than or equal to 2. As also can be seen from Table 1, even numbered subsets ($D_0, D_2, D_4, D_6$) have an even number of symbols of type X and an even number of symbols from type Y while odd numbered subsets ($D_1, D_3, D_5, D_7$) have an odd number of symbols of type X and an odd number of symbols of type Y.

FIG. 3 shows a trellis diagram resulting from the convolutional encoder shown in FIG. 2. The states of the trellis in FIG. 3, $S_0$ through $S_7$, are determined by the bits in delay elements 202, 204 and 206. The state $S_q$ is determined by q=4*(the output signal from delay 202)+2*(the output signal from delay 204)+1*(the output bit from delay 206). The subsets $D_p$ are determined by the transition from one state to another as shown in FIG. 3. The subsets $D_p$ are given in Table 1.

As shown in FIG. 3, all transitions out of a particular state are either all even subsets ($D_0, D_2, D_4,$ and $D_6$) or all odd subsets ($D_1, D_3, D_5,$ and $D_7$). Similarly, the transitions into a particular state are either all even subsets or all odd subsets. The minimum squared distance between outgoing transitions, therefore, is equal to two (2) and the minimum squared distance between incoming transitions is also two (2).

As a result, the minimum squared distance between valid sequences is greater than or equal to 4, which can be seen from the fact that any two paths that originate from the same node and end at the same node, but diverge at some point in the middle, must then converge at a later time. Both the divergence and the convergence have a squared distance of at least 2, thus the total squared distance must be at least 4. In the case where these two paths do not diverge, then they must contain different points from the same subset. Because the minimum squared distance between points in the same subset is equal to 4, the minimum squared distance between valid sequences is 4. As is conventionally known, a coding gain of 6 dB with respect to uncoded PAM-5 constellations is therefore experienced.

4-D Parity Code

The 4-D parity code can also be transmitted using the same encoder, encoder 200 of FIG. 2. To do so, the TX_CODING bit is set to zero. As a result, the parity bit produced by convolutional encoder 201 is always 0. Therefore, set select 211 always chooses even subsets (i.e., X=0, 2, 4 or 6). The minimum squared Euclidean distance between any two 4-D symbols, therefore, is 2 and a coding gain of 3 dB is experienced over uncoded PAM-5.

Transmitter Coupler

Transmitter coupler 112 (FIG. 1) couples the N-D symbol from encoder 102 to transmission channel 104. In some embodiments, coupler 112 can include pre-coding of signals to each of lines 103-1 through 103-N. Some pre-coding may at least partially overcome the expected intersymbol interference effects experienced in transmission channels 104-1 through 104-N, respectively. However, some pre-coding, such as partial response shaping, for example, may actually add to the intersymbol interference effects.

Coupler 112 converts symbols received from encoder 102 to appropriate voltages for transmission to receiver 107 through transmission channel 104. In many embodiments of PAM-5 transmission, for example, those voltages are (−1, −1/2, 0, +1/2, +1) volts corresponding to the PAM-5 symbols (−2, −1, 0, 1, 2), respectively.

Transmission Channel Characteristics

An input symbol stream $\{a_{k,1}\}$ through $\{a_{k,N}\}$ is input to each of wires 103-1 through 103-N, respectively, of transmission channel 104 (FIG. 1) by transmitter 101. Wires 103-1 through 103-N can be twisted copper pair, or some other transmission medium such as coaxial cable or optical fiber. Transmission channel 104 represents the effects that wires 103-1 through 103-N, transmission coupler 112 and receiver couplers in detector 108 have on the input symbol streams $\{a_{k,1}\}$ through $\{a_{k,N}\}$ in transmission between transmitter 101 and receiver 107. Each transmission channel 104-1 through 104-N includes a corresponding one of wires 103-1 through 103-N, respectively, for the symbol stream $\{a_{k,1}\}$ through $\{a_{k,N}\}$ respectively.

FIG. 4 shows a single transmission channel 104-L that represents the Lth one of transmission channels 104-1 through 104-N, where L can be any one of 1 through N. The symbol $a_{k,L}$, representing the symbol transmitted on wire 103-L in the kth time period, is transmitted through transmission channel 104-L. The symbol stream $\{a_{k,L}\}$ of FIG. 4 can be NRZ, MLT3, PAM-5 or any other symbol alphabet and modulation. The transmitted symbols in the sequence $\{a_{k,L}\}$ are members of the symbol alphabet $\{A\}$. In the case of five-level PAM signaling, the symbol alphabet $\{A\}$ is given by $\{-2, -1, 0 +1, +2\}$.

The channel response 105-L is represented by the channel function $f_L(Z)$. In FIG. 1, each of conductors 103-1 through 103-N can experience a different channel function $f_1(Z)$ through $f_N(Z)$, respectively. The addition of random noise $n_{k,L}$ in FIG. 4 is represented by adder 106-L. Again, in FIG. 1 each of conductors 103-1 through 103-N experiences a different random noise $n_{k,1}$ through $n_{k,N}$ respectively. The signal $x_{k,L}$ suffering from channel distortion, random noise, and a flat signal loss is received by receiver 107.

For the sake of simplicity, a baseband transmission system is assumed, although the techniques shown are easily extended to a passband transmission system. (See E. A. LEE AND D. G. MESSERCHMITT, DIGITAL COMMUNICATIONS (1988).) It is also assumed that the channel model includes the effects of transmit and receive filtering. In addition, the transmission channel is assumed to be linear in that two overlapping signals simply add as a linear superposition. The Z-transform (see A. V. OPPENHEIM & R. W. SCHAFER, DISCRETE-TIME SIGNAL PROCESSING (1989)) of the sampled transmission channel 104-L shown in FIG. 4 is given by the channel function polynomial $$f_L(Z)=f_{0,L}+f_{1,L}Z^{-1}+\ldots+f_{j,L}Z^{-j}+\ldots+f_{R,L}Z^{-R} \quad (2)$$

where $f_{0,L}, \ldots, f_{j,L}, \ldots, f_{R,L}$ are the polynomial coefficients. The coefficient $f_{j,L}$ represents the dispersed component of the (k-j)th symbol present in the $a_{k,L}$th symbol and R is a cut-off integer such that $f_{j,L}$ for j>R is negligible. The polynomial $f_L(Z)$ represents the Z-transformation of the frequency response of the transmission channel ($Z^{-1}$ represents a one period delay). (See A. V. OPPENHEIM & R. W. SCHAFER, DISCRETE-TIME SIGNAL PROCESSING (1989).)

The noiseless output of the channel at sample time k is given by $$r_k = f_{0,L} a_{k,L} + f_{1,L} a_{k-1,L} + \ldots + f_{R,L} a_{k-R,L} \quad (3)$$

where, without loss of generality, $f_{0,L}$ can be assumed to be 1. Thus, the channel output signal at time k depends, not only on transmitted data at time k, but on R past values of the transmitted data. This effect is known as "intersymbol interference" (ISI). (See LEE & MESSERSCHMITT). The ISI length of the transmission channel defined by Equations 2 and 3 is R, the number of past symbols contributing to ISI.

Intersymbol interference is a result of the dispersive nature of the communication channel. The IEEE LAN standards require that systems be capable of transmitting and receiving data through at least a 100 meter cable. In many instances, a single symbol may affect symbols throughout the transmission cable.

The noise element of the input signal is represented by the sequence $\{n_{k,L}\}$. Therefore, the noisy output signal from transmission channel 104-L is given by $$x_{k,L} = r_{k,L} + n_{k,L} \quad (4)$$

where the noise samples $\{n_{k,L}\}$ are assumed to be independent and identically distributed Gaussian random variables (see LEE & MESSERSCHMITT) with variance equal to $\sigma^2$.

Receiver

FIG. 5A shows in a block diagram an embodiment of a baseband receiver system 500 according to the present invention. Other receiver systems may also utilize aspects of the present invention. Embodiments of receiver system 500 may include any number of transport wires 103-1 through 103-N (with associated transmission channels 104-1 through 104-N, respectively) carrying input signal streams $x_{k,1}$ through $x_{k,N}$ respectively.

Receiver system 500 includes receivers 501-1 through 501-N, one for each of lines 103-1 through 103-N, respectively. Receiver 501-j, an arbitrarily chosen one of receivers 501-1 through 501-N, includes filter/digitizer 502-j, equalizer 505-j, and coefficient update 506-j. Signal $x_{k,j}$ from wire 103-j is received by filter/digitizer 502-j. Filter/digitizer 502-j filters, digitizes and amplifies the signal $x_{k,j}$ and outputs a signal $y_{k,j}$. Equalizer 505-j receives the signal $y_{k,j}$, equalizes it to remove the effects of intersymbol interference, and outputs a signal $a'_{k,j}$, which is the output signal for receiver 501-j. Filter/digitizer 502-j can be arranged to include filters that partially remove the ISI from signal $x_{k,j}$ before digitizing the signal. See, e.g., U.S. patent application Ser. No. 09/561,086, Manickam et al., filed on the same date as the present application, assigned to the same assignee as the present application, herein incorporated by reference in its entirety.

Coefficient update 506-j inputs decided-on symbols $â_{k,j}$ and other parameters and adaptively chooses parameters for filter/digitizer 502-j and equalizer 505-j (e.g., amplifier gain, multiplier coefficients, filter parameters, echo cancellation, NEXT cancellation, and timing parameters).

One skilled in the art will recognize that each of receivers 501-1 through 501-N can be different. That is, each of filters/digitizers 502-1 through 502-N and equalizers 505-1 through 505-N can be individually matched to receive input signals from the corresponding one of wires 103-1 through 103-N.

FIG. 5B shows a representative example of receiver 501-j. Receiver 501-j is one of receivers 501-1 through 501-N. Receiver 501-j includes filter/digitizer (or receiver/digitizer) 502-j in series with equalizer 505-j. Receiver/digitizer 502-j includes, in series, filter/echo canceller 508-j, analog-to-digital converter (ADC) 509-j, and amplifier 510-j. One skilled in the art will recognize that the order of these components can be altered from that shown in FIG. 5B. For example, amplifier 510-j can be implemented before filter/echo canceller (or simply filter) 508-j, or filter 508-j can be implemented, completely or partially, digitally after ADC 509-j.

Parameters to control the components of receiver 501-j can be adaptively chosen by coefficient update 506-j. Coefficient update 506-j adaptively determines the equalizer coefficients of equalizer 505-j, the gain $g_j$ of amplifier 510-j, the timing coefficient $\tau_j$ of ADC 509-j, and filter coefficients for filter 508-j. In some embodiments, coefficient update 506-j can calculate a baseline wander correction signal $w_j$, which is subtracted from the output sample of ADC 509-j at baseline wander correction adder 511-j. Baseline wander correction is discussed in U.S. patent application Ser. No. 09/151,525, filed Sep. 11, 1998, Raghavan, assigned to the same assignee as the present application, now U.S. Pat. No. 6,415,003, herein incorporated by reference in its entirety.

Some embodiments of receiver 501-j include a cable quality and length indicator 512-j that indicates a wire length L and wire quality Q.

Echo noise, which is a result of impedance mismatches in the duplex link causing some of the transmitted signal energy to be reflected back into a receiver, and near end crosstalk (NEXT) noise, which is caused by the interference from a transmitter, i.e., transmitter 110 (FIG. 1), physically located adjacent to receiver 107, can be canceled through adaptive algorithms in filter 508-j. The cancellation of echo noise and NEXT noise is nearly complete because receiver system 500 has access to the data transmitted by an adjacent transmitter (transmitter 110 in FIG. 1). Coefficient update 506-j, therefore, may input parameters from a decoder/slicer, host 151 or other controller in order to adjust filter 508-j to cancel echo and NEXT noise. Note that, in FIG. 1, transmitter 101 may also be adjacent to an accompanying receiver 111.

Filter 508-j can also include an anti-aliasing filter. An anti-aliasing filter prevents aliasing by passing the input signal, received from wire 103-j, through a low pass filter to reject out-of-band noise. As such, any conventional anti-aliasing filter can be utilized as an anti-aliasing filter portion of filter 508-j.

The analog-to-digital converter (ADC) 509-j samples and holds the input signal for a duration of the symbol period T, which in one embodiment of the invention is 8 ns. In general, embodiments of the invention can utilize any symbol period. Techniques for analog-to-digital conversion that can be used in ADC 509-j are well known. The digitized signals in the receiver are interchangeably referred to in this disclosure as samples or signals.

Amplifier 510-j amplifies the samples received from wire 103-j through transmission channel 104-j in order to correct for signal loss during transmission. The gain $g_j$ of amplifier 510-j can be adaptively chosen by coefficient update 506-j in order to optimize the operation of receiver 501-j. One of ordinary skill in the art will recognize that digital amplifier 510-j can be located anywhere in receiver 501-j between ADC 509-j and equalizer 505-j. In general, amplifier 510-j can also be an analog amplifier located anywhere between input channel 104-j and ADC 509-j.

In some embodiments, coefficient update 506-j can also calculate the length and quality of wire 103-j. Cable length and quality determination is discussed in U.S. patent application Ser. No. 09/161,346, filed Sep. 25, 1998, Raghavan et al., assigned to the same assignee as the present application, now U.S. Pat. No. 6,438,163, herein incorporated by reference in its entirety.

The output sample $y_{k,j}$ from receiver/digitizer 502-j is input to equalizer 505-j. Equalizer 505-j can be any kind of equalizer structure. Types of equalizer structures include linear equalizers, decision feedback equalizers, and sequence detection equalizers. Equalizers of these types for 100 or 1000 BASE-T Ethernet over category-5 wiring, 24 gauge twisted copper pair, are described in U.S. patent application Ser. No. 08/974,450, filed Nov. 20, 1997, Raghavan, assigned to the same assignee as the present application, now U.S. Pat. No. 6,038,269, herein incorporated by reference in its entirety; and U.S. patent application Ser. No. 09/020,628, filed Feb. 9, 1998, Raghavan, assigned to the same assignee as the present application, now U.S. Pat. No. 6,115,418, herein incorporated by reference in its entirety.

Additionally, receivers of the type described above as receivers 501-1 through 501-N are further described in U.S. patent application Ser. Nos. 09/151,525 and 09/161,346, both cited above.

In receiver system 500 of FIG. 5A, the output samples $a'_{k,1}$ through $a'_{k,N}$ from receivers 501-1 through 501-N, respectively, are input to decoder 507. Decoder 507 decides on a N-D symbol based on the samples from receivers 501-1 through 501-N. Each of the N 1-D symbols of the N-D symbol is the result of the N-D symbol pick in decoder 507.

FIG. 6 shows a block diagram of a linear equalizer 600 having R+1 multipliers, where R is any integer greater than or equal to 0. Linear equalizer 600 includes delays 601-1 through 601-R connected in series. The output samples from delays 601-1 through 601-R are also input to multipliers 602-1 through 602-R, respectively. The input sample $y_k$ to equalizer 600 is input to multiplier 602-0. The input samples to multipliers 602-0 through 602-R are multiplied by the corresponding one of multiplier coefficients $C_0$ through $C_R$, respectively, and summed in adder 603. Multiplier coefficients $C_0$ through $C_R$ can be adaptively chosen to optimize the performance of equalizer 600. In FIG. 5B, for example, coefficient update 506-j adaptively chooses equalizer parameters for equalizer 505-j.

Equalizer 600 (FIG. 6) executes the transfer function $$T = C_0 + C_1 Z^{-1} + \ldots + C_j Z^{-j} + \ldots + C_R Z^{-R} \qquad (6)$$

For simplicity, the wire designation L has been neglected. It is understood that each transmission channel includes a separated equalizer, each of which can be a unit of equalizer 600 having its own transfer function T.

In a zero-forcing linear equalizer (ZFLE), the transfer function T is the inverse of the frequency response of the channel 8Z (see Equation 2 with the wire designation L neglected). In a minimum mean squared error based linear equalizer (MMSE-LE), the transfer function is arranged to optimize the mean squared error between the transmitted data signal and the detected data symbols. A compromise, then, is found between the un-canceled ISI and the noise variance at the output terminal of the equalizer. (See B. SKLAR, DIGITAL COMMUNICATIONS, FUNDAMENTALS AND APPLICATIONS (PTR Prentice Hall, Englewood Cliffs, N.J., 1988).)

The output sample from linear equalizer 600, executing transfer function T, is given by $$a'_k = C_0 y_k + C_1 y_{k-1} + \ldots + C_j y_{k-j} + \ldots + C_R y_{k-R} \qquad (7)$$

where $C_0$ through $C_R$ are the equalizer coefficients, $y_{k-j}$ is the input signal to equalizer 600 during the time period that is j periods before the kth period, and k represents the current time period.

The output sample $a'_k$ from equalizer 600 is usually input to a slicer 604 which decides, based on its input sample $a'_k$, what symbol $â_k$ was transmitted during time period k. The symbol $â_k$ is chosen from the symbol alphabet used for transferring data that is closest to input signal $a'_k$.

A linear equalizer can be implemented using either parity coding or trellis coding systems. When linear equalization is used with parity coding, a separate linear equalizer is used on each transport wire. In FIG. 5A, for example, each of equalizers 505-1 through 505-N can include a linear equalizer.

As an example, FIG. 7 shows a portion of a 4-D receiver system 710, which includes 4-D decoder 700 and linear equalizers 600-1 through 600-4. Linear equalizers 600-1 through 600-4 provides equalization for each of channels 104-1 through 104-4, respectively. Decoder 700 can be any type of decoder including a parity code decoder and a 4-D trellis decoder. As an example, decoder 700 is shown as a parity code decoder. Also, although a 4-D decoder is shown in FIG. 7, it is understood that in general receiver system 710 can have any number of parallel input signals.

The input samples to linear equalizers 600-1 through 600-4 are the output samples $y_{k,1}$ through $y_{k,4}$ from receivers/digitizers 502-1 through 502-4 (FIG. 5B), respectively. The subscripts 1–4 reference each of the four wires 103-1 through 103-4, respectively. The output samples $a'_{k,1}$ through $a'_{k,4}$ from linear equalizers 600-1 through 600-4, respectively, are input to slicers 604-1 through 604-4, respectively. In FIG. 7, slicers 604-1 through 604-4 are 1-D slicers. If PAM-5 symbol coding is utilized, then slicers 604-1 through 604-4 are 1-D PAM-5 slicers that each output the PAM-5 symbol closest to input sample $a'_{k,1}$ through $a'_{k,4}$, respectively.

The output symbols $â_{k,1}$ through $â_{k,4}$ from slicers 604-1 through 604-4, respectively, are input to parity check 702. Additionally, each of samples $a'_{k,1}$ through $a'_{k,4}$ is subtracted from the corresponding one of symbols $â_{k,1}$ through $â_{k,4}$, respectively, in adders 701-1 through 701-4, respectively, to calculate errors $e_{k,1}$ through $e_{k,4}$, respectively. In general, the error signal $e_{k,i}$, where i is 1 through 4, is then given by $$e_{k,i} = a'_{k,i} - â_{k,i} \qquad (8)$$

The parity of the 4-D symbol that results from the four 1-D symbols is checked in parity check 702. In parity coding, the 4-D symbol is chosen from an even subset of all 4-D symbols. Therefore, if PAM-5 coding is used, there are an even number of PAM-5 symbols from family X (odd symbols) and an even number from family Y (even symbols). Parity check 702 checks the parity of the four input symbols, $â_{k,1}$ through $â_{k,4}$, by determining whether the sum of the four symbols is even or not. An odd parity indicates that there is an error in at least one of the decided symbols $â_{k,1}$ through $â_{k,4}$. The result of the parity check is input to final decoder 704.

The calculated error signals $e_{k,1}$ through $e_{k,4}$ are input to error analysis 703. Error analysis 703 determines which of the four error signals $e_{k,1}$ through $e_{k,4}$ is greatest and the sign of that error. Error analysis 703 outputs a sign signal Sgn and an identifier W for the symbol having the greatest error.

Final decoder 704 inputs the parity signal from parity check 702, the four 1-D PAM-5 symbols $â_{k,1}$ through $â_{k,4}$ from slicers 604-1 through 604-4, respectively, the identifier W for the symbol having the greatest error and the sign Sgn of that error and outputs the PAM-5 symbols $â'_{k,1}$ through $â'_{k,4}$ in response. If the parity is even, the 4-D symbol defined by 1-D symbols $â'_{k,1}$ through $â'_{k,4}$ is then given by $â_{k,1}$ through $â_{k,4}$, respectively. The parity coding scheme, therefore, will pass erroneous 4-D symbols containing simultaneous errors in two of the 1-D symbols.

If the parity is odd, however, the results of error analysis 703 are used to correct the output symbols. Because the symbol having the greatest error is the one that is most likely incorrect, the value of the symbol indicated by identifier W is corrected by either increasing or decreasing that symbol by one symbol in the symbol alphabet in response to the sign Sgn of the error (in this example, increased for a positive sign and decreased for a negative sign). The new set of four symbols, the three uncorrected symbols having the lowest error and the corrected symbol, is output as the 4-D symbol defined by 1-D symbols $\hat{a}'_{k,1}$ through $\hat{a}'_{k,4}$.

Although simple to implement, the primary disadvantage of a linear equalizer is that, while removing the ISI from the input signal, it may cause the random noise to be enhanced. This is especially true in twisted copper pair channels where the frequency response of the channel has significant attenuation across the transmitted signal bandwidth. Hence, in twisted-pair channels, such as is used with Gigabit Ethernet, linear equalization often does not perform well enough to be practical.

FIG. 8 shows a decision feedback equalizer 800. Decision feedback equalizer 800 includes a feedforward section 810, a feedback section 811 and an adder 804. Feedforward section 810 includes delays 801-1 through 801-M coupled in series, multipliers 802-1 through 802-M coupled to receive the output signals from delays 801-1 through 801-M, respectively, multiplier 802-0 coupled to receive the input sample to decision feedback equalizer 800, and an adder 803 coupled to receive the output signals from each of multipliers 802-0 through 802-M. The output signal from each of multipliers 802-0 through 802-M is the input signal to that multiplier multiplied by the corresponding one of feedforward multiplier coefficients $C_0$ through $C_M$. Feedforward multiplier coefficients $C_0$ through $C_M$ can be adaptively chosen in order to optimize the performance of the equalizer. In FIG. 5B, for example, coefficient update 506-j adaptively chooses equalizer coefficients to optimize the performance of receiver 501-j.

Adder 803 (FIG. 8) sums the output signals from each of multipliers 802-0 through 802-M. Feedforward section 810, therefore, executes the transfer function $$T_{FF} = C_0 + C_1 Z^{-1} + \ldots + C_j Z^{-j} + \ldots + C_M Z^{-M}. \quad (9)$$

The output signal from feedforward section 810, therefore, is given by $$a'_k = C_0 y_k + C_1 y_{k-1} + \ldots + C_j y_{k-j} + \ldots + C_M y_{k-M}, \quad (10)$$

where $y_{k-j}$ is the input sample to equalizer 800 during the (k-j)th time period. Again, the wire designation has been neglected for simplicity and it is understood that each of receivers 501-1 through 501-N (FIG. 5) includes an equalizer 505-1 through 505-N, respectively, any of which can be a decision feedback equalizer 800 (FIG. 8).

One embodiment of feedback section 811 includes delays 805-1 through 805-P coupled in series. Multipliers 806-1 through 806-P are coupled to receive the corresponding output signals from delays 805-1 through 805-P, respectively. Multipliers 806-1 through 806-P multiply each of their input signals by the corresponding one of feedback multiplier coefficients $B_1$ through $B_P$, respectively. Feedback coefficients $B_1$ through $B_P$ also can be adaptively chosen. Adder 807 sums the output signals from each of multipliers 806-1 through 806-P. Feedback section 811, therefore, executes the transfer function $$T_{FB} = B_1 Z^{-1} + B_2 Z^{-2} + \ldots + B_P Z^{-P}. \quad (11)$$

The input signal to feedback section 811 is symbol $\hat{a}_k$. Consequently, the output signal from feedback section 811 is given by $$a''_k = B_1 \hat{a}_{k-1} + B_2 \hat{a}_{k-2} + \ldots + B_P \hat{a}_{k-P}. \quad (12)$$

A second embodiment of feedback section 811, which is later discussed in this disclosure, is shown as feedback section 1905 in FIG. 19 and includes look-up table 1906.

The output signal $a''_k$ from feedback section 811 is subtracted from the output signal $a'_k$ from feedforward section 810 in adder 804. The input signal to slicer 808, then, is given by $$a'''_k = a'_k - a''_k. \quad (13)$$

Slicer 808 outputs the symbol $\hat{a}_k$ that is closest to the input signal $a'''_k$.

A decision feedback equalizer operates on the principle that if the past transmitted data is correctly detected, the ISI effects of these past data symbols can then be canceled from the currently received sample. As such, feedforward section 810 often contains no multipliers (i.e., $C_0 = 1$ and all other coefficients are 0) and output sample $a'_k$ equals input sample $y_k$.

Past detected data samples contain no noise and therefore decision feedback equalizers do not suffer from noise enhancement. However, decision feedback equalizers do suffer from the effects of error propagation. If slicer 808 erroneously decides a previous symbol, the error will be propagated into subsequent decisions.

FIG. 9 shows the equalization and decoder sections (see, for example, equalizers 505-1 through 505-N and decoder 507 of FIG. 5A for the case in which N is 4) of a 4-D receiver 910. The equalization is accomplished using four decision feedback equalizers, one for each of the four input channels shown. Again, one skilled in the art will recognize that a receiver can have any number of input channels and that a 4-D receiver is shown here for example only. In FIG. 9, receiver 910 includes a 4-D decoder 900. Although decoder 900 is shown as a parity code decoder, it is understood that decoder 900 can be any 4-D decoder. One skilled in the art will recognize that 4-D decoder 900 must correct symbols within a single clock cycle so that the results can be fed back through feedback sections (or taps) 811-1 through 811-4 to correct symbols $\hat{a}'_{k,1}$ through $\hat{a}'_{k,4}$, respectively.

The equalization for channel 104-1, for example, is accomplished by feedforward section (or tap) 810-1, feedback section 811-1, and adder 804-1. Similarly, channels 104-2 through 104-4, each includes the corresponding ones of feedforward sections (or taps) 810-2 through 810-4, respectively, feedback taps 811-2 through 811-4, respectively, and adders 804-2 through 804-4, respectively.

Samples $y_{k,1}$ through $y_{k,4}$ originate from receiver input signals received from channels 104-1 through 104-4, respectively. Samples $y_{k,1}$ through $y_{k,4}$ are received into feedforward taps 810-1 through 810-4, respectively. The symbol outputs $\hat{a}'_{k,1}$ through $\hat{a}'_{k,4}$ from decoder 900, corresponding to a single 4-D symbol, are input to feedback taps 811-1 through 811-4, respectively. As was discussed with relation to FIG. 8, the output signal $a''_{k,1}$ through $a''_{k,4}$ from each of feedback sections 811-1 through 811-4, respectively, is subtracted from the corresponding one of the output signals $a'_{k,1}$ through $a'_{k,4}$ from feedforward sections 810-1 through 810-4, respectively, in each of adders 804-1 through 804-4, respectively. The output signals $a'''_{k,1}$ through $a'''_{k,4}$ from adders 804-1 through 804-4, respectively, are inputted to decoder 900.

In an embodiment where decoder 900 is a 4-D parity code decoder, the input signals $a'''_{k,1}$ through $a'''_{k,4}$ to decoder 900 are received by slicers 901-1 through 901-4, respectively. Each of slicers 901-1 through 901-4 decides on an output symbol $â_{k,1}$ through $â_{k,4}$, respectively, based on its corresponding input signal $a'''_{k,1}$ through $a'''_{k,4}$, respectively. The output symbols from slicers 901-1 through 901-4 are inputted to parity check 903 and final decoder 905.

Parity check 903 sums the 1-D symbols $â_{k,1}$ through $â_{k,4}$ and determines whether the 4-D symbol is of even parity or odd parity. In parity coding using PAM-5 symbols, the 4-D symbol is chosen from an even subset and therefore each 4-D symbol includes an even number of 1-D PAM-5 symbols from family X (odd parity) and an even number from family Y (even parity). Therefore, the sum of the 1-D PAM-5 symbols is even. If the parity of the 4-D symbol is even, final decoder 905 then outputs the symbols $â_{k,1}$ through $â_{k,4}$ as output symbols $â'_{k,1}$ through $â'_{k,4}$, respectively.

Error signals $e_{k,1}$ through $e_{k,4}$ are calculated in adders 902-1 through 902-4, respectively, by, in each of the transport channels, taking the difference between the output symbol $â_{k,1}$ through $â_{k,4}$ of slicers 901-1 through 901-4, respectively, and the corresponding one of the input signals $a'''_{k,1}$ through $a'''_{k,4}$, respectively:

$$e_{k,i} = a'''_{k,i} - â_{k,i}, i=1, 2, 3 \text{ or } 4 \quad (14)$$

The error signals $e_{k,1}$ through $e_{k,4}$ at slicers 901-1 through 901-4, respectively, are input to error analysis 904. Error analysis 904 determines which of the symbols $â_{k,1}$ through $â_{k,4}$ is associated with the largest error signal $e_{k,1}$ through $e_{k,4}$, respectively, and the sign of the largest error. Error analysis 904 outputs an identifier W of the symbol having the largest absolute error and the sign SGN of that error to final decoder 905. If the parity signal indicates odd parity, the erroneous symbol is most likely to be the one with the largest error, indicated by identifier W. Final decoder 905, then, adjusts the symbol having the largest error up or down the symbol alphabet by one symbol depending on the sign SGN (in this example, up if the sign is positive and down if the sign is negative) and outputs the resulting 4-D output symbol defined by $â'_{k,1}$ through $â'_{k,4}$.

The combination of N-D trellis code encoding with a DFE architecture requires a DFE on all four wires for each state within the trellis (see, e.g., FIG. 3). The DFE output at a particular state is used for parallel branch decisions and branch metric computation for the branches leaving that state. The equalization in this situation uses a process called "per survivor processing", described more fully in Riccardo Raheli, Andreas Polydoros, Ching-Kai Tzou, "Per-Survivor Processing: A General Approach to MLSE in Uncertain Environments," IEEE Trans. Commun., Vol. 43, No. 2/3/4, pp. 354–364, February/March/April 1995, incorporated by reference in its entirety, to determine the feedback symbols.

The multiple decision feedback equalizers in the trellis decoder helps to minimize the effects of error propagation. However, a DFE architecture suffers from the disadvantage that it does not utilize the sample power contained in the intersymbol interference caused by the dispersion in the channel. More particularly, information about a 1-D symbol being transmitted during a time period k is contained in future received 1-D symbols from that channel and DFE does not utilize this signal power in deciding the currently received symbol.

A third type of equalization, sequence detection, does not suffer the performance degradation of either a linear equalizer or a decision feedback equalizer. However, a typical sequence detector produces hard outputs that can severely limit the performance of an error correction code. According to the present invention, a soft-output sequence detector is provided.

As an example, FIG. 10 shows a portion of a 4-D receiver utilizing sequence detection according to the present invention. The receiver shown in FIG. 10 includes sequence detectors 1001-1 through 1001-4, one for each of the four transmission channels corresponding to wires 103-1 through 103-4. One skilled in the art will recognize that a receiver can include any number N of transmission channels, each of the transmission channels providing signals to one of N detectors. Some or all of the N detectors can be sequence detectors.

The output samples $â_{k,1}$ through $â_{k,4}$ from sequence detectors 1001-1 through 1001-4, respectively, along with the second best output samples $â2_{k,1}$ through $â2_{k,4}$ and the errors $\Delta_1$ through $\Delta_4$ are input to decoder 1002. Decoder 1002 decides on the receiver output samples, $â'_{k,1}$ through $â'_{k,4}$ based on, for example, the parity coding scheme or the N-D lattice coding scheme. One skilled in the art will recognize that the decision of decoder 1002 can be based on any coding scheme that can correct errors in one clock cycle. Feedback is provided to sequence detectors 1001-1 through 1001-4 so that future sequences are decided using the results of the N-D decisions.

FIG. 11A shows a block diagram of a sequence detector 1100 for the PAM-5 symbol alphabet, $\{A\}=\{+2, +1, 0, -1, -2\}$, where the intersymbol interference includes the effects of only one other symbol, i.e., the ISI length δ is one (1). In general, sequence detector 1100 can utilize any alphabet and any number of ISI symbols (A>2 and δ≥1). Detector 1100 includes a branch metric generator 1101, an add-compare-select (ACS) unit 1102, traceback circuitry 1103, a last-in-first-out (LIFO) buffer 1104, and a starting point determiner 1105. Sequence detectors are discussed in U.S. patent application Ser. No. 08/974,450, cited above.

The ISI addressed by the embodiment of detector 1100 shown in FIG. 11A is caused by just one previously transmitted symbol. Thus, the input sample to sequence detectors 1100 is given by $$r_{k,w} = \alpha_{w,1} a_{k-1,w} + a_{k,w} + h_{k,w} \quad (15)$$

where $\alpha_{w,1}$ is the equalizer ISI coefficient, $h_{k,w}$ is the noise component of the output signal from the linear filter over a wire w and $a_{k,w}$ is the transmitted symbol over wire w received in time period k. The sequence detector estimates the transmitted data sequence $\{a_{k,w}\}$ from the sequence of received samples $\{r_{k,w}\}$.

The state $S_{k,w}$ of detector 1100 is defined as the past data symbol estimates. In general, a system with a symbol alphabet having A symbols and which suffers intersymbol interference from δ previous symbols will have $A^\delta$ possible states. Each state corresponds to a possible transition path through the δ previous symbols. For example, a system using a symbol alphabet with two symbols, $\{A\}=\{+1, -1\}$, and suffering ISI from two past symbols, δ=2, will have four possible sequence states of the system: symbol +1 at time k−2 and symbol +1 at time k−1; symbol +1 at time k−2 and symbol −1 at time k−1; symbol −1 at time k−2 and symbol +1 at time k−1; and symbol −1 at time k−2 and symbol −1 at time k−1. Sequence detector 1100 for the example embodiment shown in FIG. 11A, a PAM-5 symbol alphabet with ISI resulting from one symbol, has five states—+2, +1, 0, −1, and −2—corresponding to the five symbols in the PAM-5 alphabet {A}.

A trellis diagram depicting a state transition from time (k−1) to time k for sequence detector 1100 is shown in FIG. 12. A trellis diagram provides a graphical mechanism for predicting what the signal output would be for the channel in transitions from one state in time k−1 to another state at time k. As an example, from Equation 15 above, and neglecting noise, a transition from state +2 at time k−1 to a state +1 at time k results in a signal input to sequence detector 1100 of $1+2\alpha_{n,1}$.

In sequence detector 1100 shown in FIG. 11A, branch metric generator 1101 generates distance metrics corresponding to the branches illustrated in the trellis diagram of FIG. 12. The distance metrics represent the difference between the input signal $r_{k,n}$ to branch metric generator 1101 and the calculated signal that is expected to be observed in each of the allowed transitions of a trellis diagram. In general, if there are $A^\delta$ states of sequence detector 1100, there are $A^{\delta+1}$ branch metrics to calculate. In some embodiments, however, not all branches are allowed and therefore the number of branch metrics is reduced.

For PAM-5 signaling suffering from one ISI symbol, there are twenty five (25) distance metrics $M_{k,n}$. The twenty five (25) distance metrics generated by branch metric generator 1101 for the case where ISI is the result of one past symbol and neglecting random noise (i.e., A=5, δ=1 and $f_n(z)=1+\alpha_{n,1}z^{-1}$) are given by:

$$M_{k,n}(0)=(r_{k,n}-(-2-2\alpha_{n,1}))^2;$$
$$M_{k,n}(1)=(r_{k,n}-(-2-\alpha_{n,1}))^2;$$
$$M_{k,n}(2)=(r_{k,n}-(-2))^2;$$
$$M_{k,n}(3)=(r_{k,n}-(-2+\alpha_{n,1}))^2;$$
$$M_{k,n}(4)=(r_{k,n}-(-2+2\alpha_{n,1}))^2;$$
$$M_{k,n}(5)=(r_{k,n}-(-1-2\alpha_{n,1}))^2;$$
$$M_{k,n}(6)=(r_{k,n}-(-1-\alpha_{n,1}))^2;$$
$$M_{k,n}(7)=(r_{k,n}-(-1))^2;$$
$$M_{k,n}(8)=(r_{k,n}-(-1+\alpha_{n,1}))^2;$$
$$M_{k,n}(9)=(r_{k,n}-(-1+2\alpha_{n,1}))^2;$$
$$M_{k,n}(10)=(r_{k,n}-(-2\alpha_{n,1}))^2;$$
$$M_{k,n}(11)=(r_{k,n}-(-\alpha_{n,1}))^2;$$
$$M_{k,n}(12)=(r_{k,n})^2;$$
$$M_{k,n}(13)=(r_{k,n}-(\alpha_{n,1}))^2;$$
$$M_{k,n}(14)=(r_{k,n}-(2\alpha_{n,1}))^2;$$
$$M_{k,n}(15)=(r_{k,n}-(1-2\alpha_{n,1}))^2;$$
$$M_{k,n}(16)=(r_{k,n}-(1-\alpha_{n,1}))^2;$$
$$M_{k,n}(17)=(r_{k,n}-(1))^2;$$
$$M_{k,n}(18)=(r_{k,n}-(1+\alpha_{n,1}))^2;$$
$$M_{k,n}(19)=(r_{k,n}-(1+2\alpha_{n,1}))^2;$$
$$M_{k,n}(20)=(r_{k,n}-(2-2\alpha_{n,1}))^2;$$
$$M_{k,n}(21)=(r_{k,n}-(2-\alpha_{n,1}))^2;$$
$$M_{k,n}(22)=(r_{k,n}-(2))^2;$$
$$M_{k,n}(23)=(r_{k,n}-(2+\alpha_{n,1}))^2;$$
$$M_{k,n}(24)=(r_{k,n}-(2+2\alpha_{n,1}))^2. \quad (16)$$

Other metrics which represent the difference between the input symbol and the predicted input symbols, assuming each of the possible state transitions, may be used as distance metrics. In general, there will be a distance metric for every transition from any state S' at time k−1 to state S at time k. $A^{\delta+1}$ distance metrics for a metrics system with A symbols and δ interfering symbols, if all transitions are allowed. PAM-5 symboling is shown here only as an example and embodiments of detector 1100 can utilize other symbol alphabets and more ISI symbols.

Add-compare-select circuit 1102 in FIG. 11A updates a state metric, denoted by $p_{k,n}(+2)$, $p_{k,n}(+1)$, $p_{k,n}(+0)$, $p_{k,n}(-1)$, and $p_{k,n}(-2)$ in the PAM-5 example, for each possible state of the system at each time step k. For the PAM-5 symbol alphabet the state metrics are given by:

$$p_{k,n}(i)=\min_{j=(2,1,0,-1,-2)}\{p_{k-1,n}(j)+M_{k,n}(i(j+2)+5(j+2))\}; \text{ for } i=\{2,1,0,-1,-2\}. \quad (17)$$

In general, the state metrics represent the accumulated distance metrics of past states along transition paths that minimize the accumulated distance metric. Therefore, the transition metric $p_{k,n}(S)$ for state S at time period k is the accumulated distance metric for previous states along a transition path which ends at state S at time period k, state S being one of the possible states of the system. At time k−1, the state of the system may be at any state S' in the group of possible states of the system. Therefore, $p_{k,n}(S)$ is the minimum one of $p_{k-1,n}(S')$ plus the distance metric for transition from S' to S. A mathematical proof that this technique results in the least detection error is given in the Appendix of U.S. patent application Ser. No. 08/974,450, cited above.

In the example of FIG. 11A, the comparison results $D_{k,n}(+2)$, $D_{k,n}(+1)$, $D_{k,n}(0)$, $D_{k,n}(-1)$ and $D_{k,n}(-2)$ are stored in a memory of traceback circuit 1103 for each of the five states. The comparison results indicate the state at time period k−1 which results in the state metric $p_{k,n}(S)$ for state S at time period k. In the PAM-5, δ=1 example shown in FIG. 11A, the ACS results for each of the five states are given by $$D_{k,n}(i)=j \text{ if } p_{k,n}(i)=p_{k-1,n}(j)+M_{k,n}(i(j+2)+5(j+2)); \text{ for } i=\{2,1,0,-1,-2\}; j=\{2,1,0,-1,-2\}. \quad (18)$$

In general, $D_{k,n}(S)$ points toward the state S' at time k−1 from which results the lowest state metric for arriving at state S at time k.

When it is time for decoding, traceback circuit 1103 traces back from a starting state, and fetches the data from memory in traceback circuit 1103.

In one example of a traceback, if the traceback depth is 2*TB, then it is expected that a traceback of TB is performed every TB/2 sample times and traceback circuit 1106 outputs TB/2 data symbols. With little loss of generality, TB can be an even integer such as 6, 8 or 16. A greater traceback depth will result in less error in determining the final sequence of symbols. Greater traceback depths, however, incur an implementation cost of requiring more memory in traceback circuit 1103.

During the traceback procedure, starting state determiner 1105 picks the starting state, which can be based on the state metrics $p_{k,n}(S)$. Traceback circuit 1103 follows the sequence back through the comparison results stored in memory in traceback circuit 1103. The earliest TB/2 symbols, which result in the earliest states, are written into last-in-first-out buffer 1104. The new comparison results are stored in the memory locations previously occupied by the outputted results.

Traceback circuit 1103 determines the optimum sequence of symbols based on the state metrics $p_{k,w}(S)$ stored in starting state determiner 1105. Starting state determiner 1105 initializes the traceback procedure by setting a starting sequence.

LIFO 1104 simply time-reverses the data coming out of traceback circuit 1103 because the traceback is performed from the current time to previous times.

Sequence Detection with Pre-Equalization

When the channel ISI length $\delta$ is large, or if the transmitted symbol alphabet size A is large, the above method of full sequence estimation becomes impractical at high symbol rates. Full sequence estimations require the implementation of $A^\delta$ states in the detector. Accordingly, equalizer 1110 can provide pre-equalization by preprocessing the input samples $y_{k,w}$ in order to reduce the number of ISI symbols to be processed by sequence detector 1100. Equalizer 1110 can be any equalizer that reduces the number of ISI symbols. Again, for purposes of example, assume that the channel input alphabet size is A=5, i.e., {A}={+2, +1, 0, −1, −2}, and that the reduced ISI length (as seen by the sequence detector) is $\delta'$=1. As before, the technique is applicable to larger alphabets and may accommodate more than one interfering symbol in the reduced length.

The output of the equalizer 1110 with A=5 and $\delta'$=1 is, analogous to Equation 15, given by $$r_{k,w} = a_{k,w} + \alpha_{w,1} a_{k-1,w} + h_{k,w} \quad (19)$$

where $\alpha_{w,1}$ is the equalized ISI coefficient and $h_{k,w}$ is the noise component of the output of the linear equalizer 1110. The transfer function (in Z-transform notation, see A. V. OPPENHEIM AND R. W. SCHAFER, DISCRETE-TIME SIGNAL PROCESSING, (1989)) for equalizer 1110 is then given by $$E_w(z) = (1 + \alpha_{w,1} z^{-1}) Y_w(z). \quad (20)$$

The coefficient $\alpha_{w,1}$ is chosen to minimize the noise variance at the output of the equalizer. Equalizer 1110, therefore, is a reduced sequence equalizer because it reduces the ISI length from $\delta$ to $\delta'$. The reduced ISI length $\delta'$ is one (1) in this example.

In one embodiment, reduced sequence equalizer 1110 is implemented adaptively. One architecture used for adaptive implementation is shown in FIG. 11B. In this embodiment, equalizer 1110 includes a linear equalizer 1120 implementing a transfer function $C(Z)=1/R(Z)=C_0+C_1 Z^{-1}+\ldots+C_6 Z^{-6}$, adaptively followed by a filter 1121 implementing the function $(1+\alpha_{w,1} Z^{-1}+\ldots+\alpha_{w,6} Z^{-6})$. By implementing both equalizer 1120 and filter 1121 adaptively, optimal performance can be achieved for any cable length. Linear equalizer 1120 can be adaptively implemented by using the least mean squares (LMS) algorithm (see E. A. LEE AND D. G. MESSERCHMITT, DIGITAL COMMUNICATIONS (1988)) and a finite impulse response filter as shown in FIG. 6.

The coefficients $\alpha_{w,1}$ through $\alpha_{w,\delta'}$ can be chosen adaptively in the sequence detector by observing the frequency response of linear equalizer 1120. From linear equalizer 1120, the channel frequency response is deduced and $\alpha_{w,1}$ through $\alpha_{w,\delta'}$ can be selected from a look-up table. In one embodiment with $\delta'$=1, two possible values of $\alpha_{w,1}$ (0 and 1/2) are used. One of the two possible coefficients is chosen for $\alpha_{w,1}$ by observing the two largest equalizer coefficients of linear equalizer 1120, $C_0$ and $C_1$. For example, in one embodiment, if $C_1/C_0<-0.5$ then $\alpha_{w,1}=0.5$, otherwise $\alpha_{w,1}=0$.

The benefits of combining linear equalization with sequence detection include (a) reduced complexity in the sequence detector, especially for large ISI lengths, and (b) reduced noise enhancement in the linear equalization.

In the example described in connection with FIG. 11B with $\delta'$=1, the number of states in the sequence estimator is reduced from $5^\delta$ to 5. The reduced state sequence estimator can be implemented using the Viterbi algorithm.

Sequence Detection with Pre-equalization and Decision Feedback

FIG. 13 shows a receiver 1350 that includes an embodiment of a sequence detector 1300 having decision-feedback. In this embodiment, equalizer 1301, which as before can be any equalizer structure, pre-equalizes transmission channel 104-w to a pre-determined ISI polynomial $G_w(z)$ of length $\eta \leq \delta$, where $\delta$ is the ISI length of the frequency response $f_w(z)$ of transmission channel 104-w. In one example, $\eta$ is 2 and the ISI polynomial $G_w(z)$ is given by $$G_w(z) = 1 + \alpha_{w,1} z^{-1} + \alpha_{w,2} z^{-2}. \quad (21)$$

The transfer function of equalizer 1301 is given by $$E_w(z) = G_w(z) Y_w(z). \quad (22)$$

Sequence detector 1300 includes branch metric generator 1302, add compare select (unit) 1303, traceback (circuit) 1304, LIFO 1305 and starting point determiner 1306. In general, the detection technique implemented in sequence estimator 1300 may be used for any combination of $\delta$ and $\eta$ such that $\eta \leq \delta$. Although the technique may be implemented with any sized alphabet, the example shown in FIG. 13 is for the PAM-5, (A=5), alphabet. The coefficients, $\alpha_{w,1}$ and $\alpha_{w,2}$, can be chosen adaptively to optimize performance of the receiver 1350.

To perform the sequence estimation using the Viterbi algorithm, as outlined above, sequence detector 1300 is still implemented with twenty five states (if the data symbols are PAM-5 values). The branch metric computations from a trellis diagram now accounts for the intersymbol interference due to the symbols transmitted two sample times before as well as the symbol transmitted during the last period. In one embodiment, the branch metrics computed by branch metric generator 1302 with decision feedback are given by:

$$M_{k,w}(0) = [r_{k,w} - \alpha_{w,2} D_{k-1}(-2) - (-2 - 2\alpha_{w,1})]^2;$$

$$M_{k,w}(1) = [r_{k,w} - \alpha_{w,2} D_{k-1}(-1) - (-2 - 2\alpha_{w,1})]^2;$$

$$M_{k,w}(2) = [r_{k,w} - \alpha_{w,2} D_{k-1}(0) - (-2)]^2;$$

$$M_{k,w}(3) = [r_{k,w} - \alpha_{w,2} D_{k-1}(1) - (-2 + \alpha_{w,1})]^2;$$

$$M_{k,w}(4) = [r_{k,w} - \alpha_{w,2} D_{k-1}(2) - (-2 + 2\alpha_{w,1})]^2;$$

$$M_{k,w}(5) = [r_{k,w} - \alpha_{w,2} D_{k-1}(-2) - (-1 - 2\alpha_{w,1})]^2;$$

$$M_{k,w}(6) = [r_{k,w} - \alpha_{w,2} D_{k-1}(-1) - (-1 - \alpha_{w,1})]^2;$$

$$M_{k,w}(7) = [r_{k,w} - \alpha_{w,2} D_{k-1}(0) - (-1)]^2;$$

$$M_{k,w}(8) = [r_{k,w} - \alpha_{w,2} D_{k-1}(1) - (-1 + \alpha_{w,1})]^2;$$

$$M_{k,w}(9) = [r_{k,w} - \alpha_{w,2} D_{k-1}(2) - (-1 + 2\alpha_{w,1})]^2;$$

$$M_{k,w}(10) = [r_{k,w} - \alpha_{w,2} D_{k-1}(-2) - (-2\alpha_{w,1})]^2;$$

$$M_{k,w}(11) = [r_{k,w} - \alpha_{w,1}D_{k,w}(-1) - (-\alpha_{w,1})]^2;$$

$$M_{k,w}(12) = [r_{k,w} - \alpha_{w,1}D_{k,w}(0)]^2;$$

$$M_{k,w}(13) = [r_{k,w} - \alpha_{w,1}D_{k,w}(1) - \alpha_{w,1}]^2;$$

$$M_{k,w}(14) = [r_{k,w} - \alpha_{w,1}D_{k,w}(2) - 2\alpha_{w,1}]^2;$$

$$M_{k,w}(15) = [r_{k,w} - \alpha_{w,1}D_{k,w}(-2) - (-1-2\alpha_{w,1})]^2;$$

$$M_{k,w}(16) = [r_{k,w} - \alpha_{w,1}D_{k,w}(-1) - (1-\alpha_{w,1})]^2;$$

$$M_{k,w}(17) = [r_{k,w} - \alpha_{w,1}D_{k,w}(0) - 1]^2;$$

$$M_{k,w}(18) = [r_{k,w} - \alpha_{w,1}D_{k,w}(1) - (1+\alpha_{w,1})]^2;$$

$$M_{k,w}(19) = [r_{k,w} - \alpha_{w,1}D_{k,w}(2) - (1+2\alpha_{w,1})]^2;$$

$$M_{k,w}(20) = [r_{k,w} - \alpha_{w,1}D_{k,w}(-2) - (2-2\alpha_{w,1})]^2;$$

$$M_{k,w}(21) = [r_{k,w} - \alpha_{w,1}D_{k,w}(-1) - (2-\alpha_{w,1})]^2;$$

$$M_{k,w}(22) = [r_{k,w} - \alpha_{w,1}D_{k,w}(0) - 2]^2;$$

$$M_{k,w}(23) = [r_{k,w} - \alpha_{w,1}D_{k,w}(1) - (2+\alpha_{w,1})]^2;$$

$$M_{k,w}(24) = [r_{k,w} - \alpha_{w,1}D_{k,w}(2) - (2+2\alpha_{w,1})]^2. \quad (23)$$

The ISI due to the transmitted symbol at time (k−2) is removed from the received sample $r_{k,w}$ before the branch metric of the sequence detector that accounts for the ISI due to the transmitted symbol at time (k−1) is computed. After this calculation, the previously described calculation is performed to remove the ISI due to the (k−1)th transmitted symbol.

Add compare select 1303 then computes the state metrics $p_{k,w}(i)$ and the comparison results $D_{k,w}(i)$ as described above in Equations 17 and 18, respectively. Traceback 1304 accepts a starting point from starting point determiner 1306, as described above for the corresponding components of sequence detector 1100 in FIG. 11A, and outputs a set of decided-on symbols to LIFO 1305. LIFO 1305, then, outputs the resulting symbols in reverse chronological order from that received.

Sequence Detection in Combination with Error Correction

Although achieving excellent noise margins, the combination of sequence detection with error correction codes is problematic. Sequence detectors usually produce hard decisions (i.e., decisions that do not contain information on reliability), which become input signals to error correcting codes. Most error correcting techniques, such as the parity coding or 4-D lattice coding proposed for Gigabit Ethernet, rely on soft decisions (i.e., decisions that contain reliability information) to achieve full performance. See, e.g., S. LIN AND D. J. COSTELLO, JR., ERROR CONTROL CODING: FUNDAMENTALS AND APPLICATIONS (1983). Thus, a typical sequence detector in combination with a decoder using an error correcting code does not achieve the improved SNR margins of both the sequence detector and the error correcting code unless the decoder is provided with a soft decision from the sequence detector.

FIG. 14 shows a sequence detector 1400-w according to the present invention. Sequence detector 1400-w is coupled to receive signal $r_{k,w}$ from wire w. Sequence detector 1400-w includes branch metric generator 1402-w, add compare select (unit) 1403-w, and starting point determiner 1406-w. Add compare select 1402-w and starting point determiner 1406-w are each coupled to traceback 1404.

Traceback 1404 is coupled to each wire w so that the traceback can be accomplished on N-D symbols rather than performing a separate traceback on N 1-D symbols, where N is the number of wires. Traceback 1404 is also coupled with LIFO 1405. LIFO 1405 outputs the final symbol stream $\hat{a}_{k,w}$ for each wire w.

A sequence detector according to the present invention can accommodate any symbol alphabet and any number of ISI symbols. For example, sequence detector 1400 shown in FIG. 14 is for a PAM-5 alphabet where input signals suffer the influence of one past ISI symbol (i.e., the ISI length is 1). As occurs with equalizer 1110 in FIG. 11A (see Equation 20), Equalizer 1401-w executes a transfer function $F(Z) = (1+\alpha_{w,1}Z^{-1})/f_w(Z)$ and therefore sequence detector 1400-w detects a signal that includes ISI from one past symbol. Branch metric generator 1402-w therefore generates the branch metrics as described in Equation 16.

Add compare select 1403-w computes the state metrics $p_{k,w}(i)$ (i=−2,−1,0,1,2) according to Equation 17 and the ACS results $D_{k,w}(i)$ according to Equation 18. Additionally, ACS 1403-w computes a second best state metric $p2_{k,w}(i)$, a second ACS result $D2_{k,w}(i)$, and a difference result $\Delta_{k,w}(i)$. The second best state metric can be computed according to the equation $$p2_{k,w}(i) = \text{second minimum } (p_{k-1,w}(j) + M_{k,w}(5(i+2)+(j+2))) \, j=\{-2,-1,0,1,2\}, \quad (24)$$

where i={−2, −1, 0, 1, 2}. The second ACS result can be computed according to $$D2_{k,w}(i) = \text{if } p2_{k,w}(i) = p_{k-1,w}(j) + M_{k,w}(5(i+2)+(j+2)), \quad (25)$$

where i={−2,−1,0,1,2} and j={−2,−1,0,1,2}. Finally, the difference result can be computed according to $$\Delta_{k,w}(i) = p2_{k,w}(i) - p_{k,w}(i). \quad (26)$$

Traceback 1404 receives the ACS results, the second ACS results, and the difference results from each state on each wire as well as a starting point signal from starting point determiner 1406-w for each wire w.

FIG. 15 shows an embodiment of 4-D traceback 1404 for use with a series of sequence detectors 1400-w. For an N-wire configuration, traceback 1404 is generally coupled into N sequence detectors similar to that shown in FIG. 14, one for each wire w. In FIG. 15, traceback 1404 includes a parity code decoder 1504 although other coding schemes can be used, provided that the coding scheme can correct symbols within one clock cycle.

For exemplary purposes, FIG. 15 includes a four-wire parity-code decoder. Traceback 1404 includes read modules 1501-1 through 1501-4, one for each of the four wires. Each read module 1501-1 through 1501-4 receives parameters $\Gamma_{k,w}$ from add compare select 1403-w and starting point determiner 1406-w (FIG. 14). Parameters $\Gamma_{k,w}$ includes the add compare results $D_{k,w}(i)$, $D2_{k,w}(i)$ and $\Delta_{k,w}(i)$, where i={−2, −1, 0, 1, 2} for PAM-5 signaling, as well as a starting point $SP_{k,w}$ for each wire w. As was discussed before, starting point determiner 1406-w chooses a starting point $SP_{k,w}$ which can be based on the state metrics $p_{k,w}(i)$, for traceback 1404.

Traceback 1404 in FIG. 15 traces back to arrive at the best sequence $\hat{a}_{k,w}$ for wire w. For each clock cycle k, read module 1501-w arrives at a best symbol $\hat{a}_{k,w}$, a second best symbol $\hat{a}2_{k,w}$ and an associated reliability $\varepsilon_{k,w}$ for each wire w.

As described above, the 4-D parity coding scheme only transmits 4-D symbols having even parity. A single error in one 1-D symbol will cause the parity of the 4-D symbol to become odd. Similar to "4-D slicing", traceback 1404 recognizes the parity error and makes corrections to the four 1-D symbols from read modules 1501-1 through 1501-4 for clock cycle k based on the reliability of each of the 1-D symbols.

Hagenauer has shown that, within a Viterbi decoder, the reliability of decision symbol paths merging at each state grows with the difference between the state metrics between the two paths. See J. Hagenauer and P. Hocher, "A Viterbi Algorithm with Soft-Decision Outputs and its Applications," Proc. GLOBECOM '89, 1680–1686, November 1989. Similar to Hagenauer's Soft Output Viterbi Algorithm (SOVA), each of read modules 1501-1 through 1501-4 outputs the difference metric, i.e., the reliability measure, between the best two paths entering each state, $\epsilon_{k,1}$ through $\epsilon_{k,4}$, respectively. SOVA uses these metrics over a range of sample times within the trellis to output soft decisions for every symbol.

However, 4-D parity traceback 1404 can recognize when a single error occurs. Therefore, only the difference metrics at the time of the error are required to correct errors. Because the actual decoding is accomplished during traceback in each of sequence detectors 140-1 through 140-4, traceback 1404 recognizes an error in its channel and corrects the error in its own sequence path.

For each clock cycle k, traceback 1404 retrieves each of the first choice 1-D symbols $â_{k,1}$ through $â_{k,4}$, the second choice 1-D symbols $â2_{k,1}$ through $â2_{k,4}$, and the reliability measures $\epsilon_{k,1}$ through $\epsilon_{k,4}$, and determines the finally decided four 1-D symbols $â'_{k,1}$ through $â'_{k,4}$.

For each clock cycle k, parity check 1502 receives the first choice symbols $â_{k,1}$ through $â_{k,4}$ from read modules 1501-1 through 1501-4, respectively, determines the parity of the resulting 4-D symbol and outputs a parity signal indicating the parity of the 4-D symbol. Error analysis 1503 receives reliability measures $\epsilon_{k,1}$ through $\epsilon_{k,4}$ from read modules 1501-1 through 1501-4, respectively, determines which of the sequence detectors w has the least reliability, thereby indicating which result is most likely to be incorrect, and outputs a wire signal W indicating which symbol is most likely to be incorrect. Decoder 1504 receives the first choice symbols $â_{k,1}$ through $â_{k,4}$, the second choice symbols $â2_{k,1}$ through $â2_{k,4}$, the parity signal from parity check 1502, and the wire signal from error analysis 1503.

If the parity signal indicates that the parity of the first choice 4-D symbol is even, then the first choice symbols $â_{k,1}$ through $â_{k,4}$ are output as the finally decided symbols $â'_{k,1}$ through $â'_{k,4}$. However, an odd parity indicates an error in one of the first choice symbols $â_{k,1}$ through $â_{k,4}$. If the parity signal indicates an odd parity, the symbol indicated by the wire signal W is replaced by a corresponding one of second choice symbols $â2_{k,1}$ through $â2_{k,4}$ and the resulting 4-D symbol is output as finally decided symbols $â'_{k,1}$ through $â'_{k,4}$.

Additionally, decoder 1504 informs read modules 1501-1 through 1501-4 of the finally decided symbols $â'_{k,1}$ through $â'_{k,4}$ by indicating, for each of read modules 1501-1 through 1501-4, which of the first choice symbols or the second choice symbols was output as the finally decided symbols for clock cycle k. Read modules 1501-1 through 1501-4 can then traceback accordingly and output the first choice symbols, second choice symbols, and reliability measures for clock cycle k-1 (i.e., $â_{k-1,1}$ through $â_{k-1,4}$, $â2_{k-1,1}$ through $â2_{k-1,4}$, and $\epsilon_{k-1,1}$ through $\epsilon_{k-1,4}$, respectively).

In other words, read module 1501-w outputs the best possible step back $â_{k,w}$, the second best step back $â2_{k,w}$ and the reliability measure $\epsilon_{k,w}$ for each wire for clock cycle k. Parity check 1502 performs a parity check on the best possible step back $â_{k,w}$. Error analysis 1503 determines the wire most likely to be incorrect. If the parity passes, decoder 1504 outputs the best possible step back $â_{k,w}$ for clock cycle k. If parity fails, then decoder 1504 replaces one of the best possible symbols with the associated second best symbol, based on which wire is most likely to be incorrect, and outputs the resulting 4-D symbol. The choice of best symbol or second best symbol for each wire w is communicated back to read module 1501-w so that read module 1501-w can use the appropriate symbol to step back to clock cycle k-1. The replacement choice affects only one read module. Therefore, the next set of symbols will be affected in one read module only.

As shown in FIG. 14, the output symbols $â'_{k,w}$ are output to LIFO 1405, which time reverses the order of the symbol stream and outputs the resulting symbol stream $ã'_{k,w}$.

One skilled in the art will recognize that in general a sequence detector according to this invention can accommodate any symbol alphabet and the effects of any number of ISI symbols. Additionally, the sequence detector may include decision feedback as shown in FIG. 13.

Reduced Complexity Sequence Detection Using State Reduction

If the alphabet size is large or if the ISI length at the sequence detector is large then sequence detector 1400-w shown in FIG. 14 and traceback 1404 using parity coding shown in FIG. 15 become impractical at high symbol rates. The number of states required in read modules 1501-1 through 1501-4 is $A^\eta$ on each wire, where A represents the number of symbols in alphabet {A} and $\eta$ represents the ISI symbol length at the sequence detector (i.e., at the input terminal of sequence detector 1400 in FIG. 14). With a PAM-5 alphabet and $\eta=2$ ISI symbols, each of read modules 1501-1 through 1501-4 requires twenty five (25) states in order to perform sequence detection. A decoder utilizing a large number of states is expensive, difficult to implement, and consumes a lot of power.

FIG. 16 shows a sequence detector 1600-w having reduced complexity sequence detection. In particular, sequence detector 1600-w includes branch metric generator 1602-w, add-compare-select (unit) 1603-w, and starting point determiner 1605-w. Traceback 1604 and LIFO 1606 are coupled into sequence detector 1600-2 as well as similar detectors coupled to the remaining N wires. As an example, sequence detector 1600-w is shown for the PAM-5 alphabet, although embodiments of sequence detector 1600-w can utilize other symbol alphabets as well.

As mentioned above, the PAM-5 symbol alphabet can be segregated into two families, an odd family X having the PAM-5 symbols {-1, +1} and an even family Y having the PAM-5 symbols {-2, 0, +2}. A detector state can now be defined as the previous $\eta$ families X or Y, as opposed to the previous $\eta$ PAM-5 symbols {-2, -1, 0, +1, +2}. Therefore, the number of states required for the PAM-5 symbol alphabet with $\eta=2$ ISI symbols is reduced from 25 states to 4 states on each transmission channel w=1 through L. For a four wire system (4-D decoding, for example), there are a total of sixteen (16) states instead of one hundred (100) states.

Reduced state detection can be accomplished when the minimum squared distance between any two parallel branches of a state transition S→S' exceeds the minimum squared distance between any two paths in the trellis. A parallel branch refers to transitions S→S' between individual states through different symbols. For example, a state S=X can transition to a state S'=X through receipt of either a -1 symbol or a +1 symbol.

The actual squared minimum distance between sequences does not decrease and thus the performance suffers little or no degradation from that of full state sequence detection. Gigabit Ethernet using a PAM-5 symbol set suffering ISI from two (2) symbols meets this criteria.

FIG. 17 shows a trellis diagram displaying the reduced state transitions and all parallel PAM-5 transitions. In FIG. 17, a state is represented by two consecutive symbols (reflecting an ISI length of 2). A transition from state S at time k−1 to state S' at time k has two or three parallel branches, depending upon whether the new symbol entering at state S' is in family X or family Y. For example, a transition from state XX at time k−1 to state XX at state k has two branches because the incoming symbol must be either a −1 or +1 PAM-5 symbol. A transition from state XX at time k−1 to a state XY at time k, however, indicates that either a −2, 0 or +2 symbol is received and therefore there are three branches.

In FIG. 16, equalizer 1601-w can execute the transfer function $$E(Z) = (1 + \alpha_1 Z^{-1} + \alpha_2 Z^{-2}) y(Z). \qquad (27)$$

Therefore, the expected signal input to decoder system 1600 is $$r_{k,w} = a_{k,w} + \alpha_1 a_{k-1,w} + \alpha_2 a_{k-2,w} \qquad (28)$$

Branch metric generator 1602-w computes the branch metrics for the state transitions displayed in FIG. 17. In the reduced state trellis shown in FIG. 17, branch metric 1602-w first decides on which of the two or three branches of the transition from state S to state S' to assign to the state transition S→S'. The decision of which branch performs the S→S' transition is based on calculating a distance metric for each branch and choosing the branch having the lowest metric. For example, in the transition from state S=XX to state S'=XX branch metric generator first determines which of the two branches (−1 or +1) are traversed before calculating the metric. The decision of which branch is traversed is stored in branch decision $B_{k,w}(S \to S')$. The branch decision and the metric are both communicated to ACS 1603-w.

For each state S at k−1, symbols $\hat{a}_{k-1}(S)$ and $\hat{a}_{k-2}(S)$ are known based upon feedback from ACS 1603-w to branch metric generator 1602-w, as shown in FIG. 16. For each state transition S→S', branch metric generator takes the difference between the input signal and the ISI portion of Equation 28 to obtain a difference $$\sigma(S \to S') = r_{k,w} - \alpha_1 \hat{a}_{k-1,w}(S) - \alpha_2 \hat{a}_{k-2,w}(S). \qquad (29)$$

The difference σ is then compared with the symbols for each possible branch of the state transition S to S'. The symbol chosen $a'_{k,w}(S \to S')$ for the branch is then assigned to the transition from state S to state S'.

With reference to FIG. 18, the branch metrics can be computed for each transition S to S' according to the equation:

$$M_{k,w}(S \to S') = |r_{k,w} - a'_{k,w}(S \to S') - \alpha_1 \hat{a}_{k-1,w}(S) - \alpha_2 \hat{a}_{k-2,w}(S)|^2. \qquad (30)$$

where the valid transitions (S→S') in FIG. 18 are S→S'= XXX, XXY, YXX, YXY, XYX, XYY, YYX and YYY. The notation "ABC" used above and in FIG. 18, where each of "A", "B", and "C" is X or Y, indicates an S→S' transition from S=AB to S'=BC.

Add-compare-select 1603-w receives the branch metrics $M_{k,w}(S \to S')$ and branch decisions $B_{k,w}(S \to S')$ from branch metric generator 1602-w and calculates the state metrics $P_{k,w}(S')$ according to the equation $$P_{k,w}(S') = \min_{j \in \{S\}} (P_{k-1,w}(S) + M_{k,w}(S \to S')). \qquad (31)$$

where j is equal to each S such that S→S' is allowable.

Add-compare-select 1603-w also determines the ACS results for each of the four final states S' and communicates those results to traceback circuit 1604. The ACS result $D_{k,w}(S')$ is the path resulting in state S' having the lowest metric $M(S \to S')$. Because there are only two allowed paths that result in state S' (see FIGS. 17 and 18), the second best choice is automatically the path that is contraindicated by $D_{k,w}(S')$ and need not be separately stored.

The error $\Delta_{k,w}(S')$ is the difference in metrics between the two paths resulting in state S':

$$\Delta_{k,w}(S') = |M(S_1 \to S') - M(S_2 \to S')|. \qquad (32)$$

where $S_1$ is one of the two initial states that transition to the final state S' and $S_2$ is the other of the two initial states that transition to the final state S'. For example, from FIG. 18, if S'=YX, then $S_1$ and $S_2$ are the states XY and YY, respectively.

Finally, the branch decisions of branch metric generator 1602-w are also communicated to traceback circuit 1604. Branch decision $B1_{k,w}(S')$ corresponds to the decision on the path S→S' indicated by $D_{k,w}(S')$. Branch decision $B2_{k,w}(S')$ corresponds to the decision on the path S→S' contraindicated by $D_{k,w}(S')$. Therefore, in the soft-decision process, if the traceback circuit 1604 is altered to the second most likely path, the parallel path decision for the second most likely path is available to traceback circuit 1604.

Traceback circuit 1604 can be the same as traceback 1404 of FIG. 15 except that read modules 1501-1 through 1501-4 receive a different set of parameters $\Gamma_{k,w}$. In traceback circuit 1604, $\Gamma_{k,w}$ includes the ACS parameters $D_{k,w}(S_i)$, $\Delta_{k,w}(S_i)$, $B1_{k,w}(S_i)$, $B2_{k,w}(S_i)$, where $S_i = \{XX, XY, YX, YY\}$, and the starting point $SP_{k,w}$ from starting point determiner 1605-w. As described above, read modules 1501-1 through 1501-4 store the ACS results in memory and, starting from starting point $SP_{k,w}$ determined by starting point determiner 1605, determine the most likely symbol $\hat{a}_{k,w}$ and the second most likely symbol $\hat{a}2_{k,w}$ for clock cycle k. A reliability measure $\epsilon_{k,w}$ indicating the difference in distance metrics between the most likely symbol and the second most likely symbol is also determined.

As is shown in FIG. 15, read modules 1501-1 through 1501-4 output the parameters $\hat{a}_{k,w}$ to parity check 1502 and decoder 1504, parameters $\hat{a}2_{k,w}$ to decoder 1504, and parameters $\epsilon_{k,w}$ to error analysis 1503. As was previously discussed, decoder 1504 outputs the best symbols $\hat{a}'_{k,w}$ based on the parity check and informs read modules 1501-1 through 1501-4 of the choice. Read modules 1501-1 through 1501-4 then proceed to determine most likely and second most likely symbols for clock cycle k−1 until the traceback is complete.

In sequence detector 1600-w of FIG. 16, the minimum squared distance between parallel branches of any transition S→S' should be at least twice as large as the minimum squared distance of the overall decoder. Because there is no protection between parallel branch decisions S→S" of sequence detector 1600-w, this requirement on minimum squared distances should hold true in order to prevent the overall minimum distance from decreasing because of reduced state detection.

As was previously discussed, the 4-D parity code provides 3 dB of coding gain, which doubles the squared minimum distance between possible paths. However, this code provides no protection between parallel branches of transitions along one wire. Therefore, this overall requirement on minimum distances prevents the minimum squared distance from decreasing because of reduced state detection.

This requirement holds for Gigabit Ethernet standards, as described above. Although the requirement should hold in general, it may not be held for all embodiments of the invention.

Simplified DFE

Reduced sequence detection can also be accomplished utilizing decision feedback equalization (DFE). However, a simplified DFE provides a simple and easy implementation for accomplishing the equalization process in the allotted time (8 ns in the example of gigabit transmission over four wires).

FIG. 19 shows an example of a simplified decision feedback equalizer 1900. The simplified decision feedback equalizer includes a pre-equalizer section 1901, an adder 1902, a slicer 1903, and a feedback section 1905. Pre-equalizer section 1901 can be any equalizer structure that reduces the ISI length to L symbols. Pre-equalizer section 1901, therefore, executes the transfer function $$T(Z) \propto \frac{1 + \alpha_1 Z^{-1} + \cdots + \alpha_L Z^{-L}}{f(Z)}, \quad (33)$$

where $\alpha_1$ through $\alpha_L$ are the multiplier coefficients of pre-equalizer section 1901 and $f(Z)$ is the response of the input channel (see Equation 2 for the response of a transfer channel).

The output signal $a'_k$ from pre-equalizer (or feedforward) section 1901 is input to adder 1902. Adder 1902 subtracts the signal $a''_k$ from selector 1906 from the output signal $a'_k$ from feedforward section 1901. The resulting signal $a'''_k = a'_k - a''_k$ is input to slicer 1903. Slicer 1903 outputs a symbol $\hat{a}_k$ that is closest to the input signal $a'''_k$. The feedback section 1905 (see also feedback section 811 of FIG. 8) of decision feedback equalizer 1900 comprises delays 1904-1 through 1904-L. Selector 1906 receives each of L past symbols $\hat{a}_{k-1}$ through $\hat{a}_{k-L}$ and uses these symbols to access a lookup table. The lookup table holds values $\xi_1$ through $\xi_Q$. The output signal $a''_k$ of selector 1906 then is that one of $\xi_1$ through $\xi_Q$ that corresponds to the combination of inputs $\hat{a}_{k-1}$ through $\hat{a}_{k-L}$. The time required to look the results up in a look-up table is much less than the time required to perform the L multiplications and L additions required of the feedback section shown, for example, as feedback section 811 of FIG. 8.

In some embodiments, selector 1906 receives the look-up values $\xi_1$ through $\xi_Q$ as input signals. In some embodiments, the look-up values $\xi_1$ through $\xi_Q$ are preset. The look-up values $\xi_1$ through $\xi_Q$ can also be adaptively chosen to optimize performance of the receiver of which decision feedback equalizer 1900 is a part. In most embodiments, $Q = A^L$ where A is the size of the symbol alphabet.

As an example, in a system using the PAM-5 alphabet where L=2, and Q is 25 there are twenty-five (25) lookup values (i.e., Q=25). Because the intersymbol interference in the input signal to adder 1902 is the result of two (2) ISI symbols, $$a'_k = a_k + \alpha \hat{a}_{k-1} + \beta \hat{a}_{k-2} + n_k \quad (34)$$

where $\alpha$ and $\beta$ are the interference parameters and $n_k$ is random noise. The twenty-five values for the look-up table, therefore, are given by:

$$\begin{aligned}
a''_k = \xi_1 = 2\alpha + 2\beta & \quad \text{if } (\hat{a}_{k-1} = 2) \text{ and } (\hat{a}_{k-2} = 2); \\
a''_k = \xi_2 = 2\alpha + \beta & \quad \text{if } (\hat{a}_{k-1} = 2) \text{ and } (\hat{a}_{k-2} = 1); \\
a''_k = \xi_3 = 2\alpha & \quad \text{if } (\hat{a}_{k-1} = 2) \text{ and } (\hat{a}_{k-2} = 0); \\
a''_k = \xi_4 = 2\alpha - \beta & \quad \text{if } (\hat{a}_{k-1} = 2) \text{ and } (\hat{a}_{k-2} = -1); \\
a''_k = \xi_5 = 2\alpha - 2\beta & \quad \text{if } (\hat{a}_{k-1} = 2) \text{ and } (\hat{a}_{k-2} = -2); \\
a''_k = \xi_6 = \alpha + 2\beta & \quad \text{if } (\hat{a}_{k-1} = 1) \text{ and } (\hat{a}_{k-2} = 2); \\
a''_k = \xi_7 = \alpha + \beta & \quad \text{if } (\hat{a}_{k-1} = 1) \text{ and } (\hat{a}_{k-2} = 1); \\
a''_k = \xi_8 = \alpha & \quad \text{if } (\hat{a}_{k-1} = 1) \text{ and } (\hat{a}_{k-2} = 0); \\
a''_k = \xi_9 = \alpha - \beta & \quad \text{if } (\hat{a}_{k-1} = 1) \text{ and } (\hat{a}_{k-2} = -1); \\
a''_k = \xi_{10} = \alpha - 2\beta & \quad \text{if } (\hat{a}_{k-1} = 1) \text{ and } (\hat{a}_{k-2} = -2); \\
a''_k = \xi_{11} = 2\beta & \quad \text{if } (\hat{a}_{k-1} = 0) \text{ and } (\hat{a}_{k-2} = 2); \\
a''_k = \xi_{12} = \beta & \quad \text{if } (\hat{a}_{k-1} = 0) \text{ and } (\hat{a}_{k-2} = 1); \\
a''_k = \xi_{13} = 0 & \quad \text{if } (\hat{a}_{k-1} = 0) \text{ and } (\hat{a}_{k-2} = 0); \\
a''_k = \xi_{14} = -\beta & \quad \text{if } (\hat{a}_{k-1} = 0) \text{ and } (\hat{a}_{k-2} = -1); \\
a''_k = \xi_{15} = -2\beta & \quad \text{if } (\hat{a}_{k-1} = 0) \text{ and } (\hat{a}_{k-2} = -2); \\
a''_k = \xi_{16} = -\alpha + 2\beta & \quad \text{if } (\hat{a}_{k-1} = -1) \text{ and } (\hat{a}_{k-2} = 2); \\
a''_k = \xi_{17} = -\alpha + \beta & \quad \text{if } (\hat{a}_{k-1} = -1) \text{ and } (\hat{a}_{k-2} = 1); \\
a''_k = \xi_{18} = -\alpha & \quad \text{if } (\hat{a}_{k-1} = -1) \text{ and } (\hat{a}_{k-2} = 0); \\
a''_k = \xi_{19} = -\alpha - \beta & \quad \text{if } (\hat{a}_{k-1} = -1) \text{ and } (\hat{a}_{k-2} = -1); \\
a''_k = \xi_{20} = -\alpha - 2\beta & \quad \text{if } (\hat{a}_{k-1} = -1) \text{ and } (\hat{a}_{k-2} = -2); \\
a''_k = \xi_{21} = -2\alpha + 2\beta & \quad \text{if } (\hat{a}_{k-1} = -2) \text{ and } (\hat{a}_{k-2} = 2); \\
a''_k = \xi_{22} = -2\alpha + \beta & \quad \text{if } (\hat{a}_{k-1} = -2) \text{ and } (\hat{a}_{k-2} = 1); \\
a''_k = \xi_{23} = -2\alpha & \quad \text{if } (\hat{a}_{k-1} = -2) \text{ and } (\hat{a}_{k-2} = 0); \\
a''_k = \xi_{24} = -2\alpha - \beta & \quad \text{if } (\hat{a}_{k-1} = -2) \text{ and } (\hat{a}_{k-2} = -1); \\
a''_k = \xi_{25} = -2\alpha - 2\beta & \quad \text{if } (\hat{a}_{k-1} = -2) \text{ and } (\hat{a}_{k-2} = -2).
\end{aligned} \quad (35)$$

The parameters $\alpha$ and $\beta$ can be adaptively chosen and the table updated periodically by calculating the look-up values $\xi_1$ through $\xi_Q$ and inputting them into selector 1906. When decision feedback equalizer 1900 is utilized, for example, as equalizer 505-j in receiver 501-j of FIG. 5B, look-up values $\xi_1$ through $\xi_Q$ can be calculated by coefficient update 506-j and read into equalizer 505-j.

FIG. 20A shows a sequence detector 2000. Sequence detector 2000 can be any sequence detector system having feedback, including sequence detector 1300 (FIG. 13) and sequence detector 1600 (FIG. 16). As before, sequence detector 2000 utilizes any symbol alphabet and includes trellis decoding for any number of past ISI symbols.

Pre-equalizer section 2001 of sequence detector 2000 receives signal $y_{k,w}$ and executes a transfer function, such as that shown in Equation 33, that removes the ISI influence from all but L past symbols. Feedback section 2003 outputs a signal $a''_{k,w}$ that removes the influence from an additional M past symbols based on the inputs from the ACS. Sequence detector 2000 therefore utilizes states describing the past L-M ISI symbols. FIG. 12, for example, illustrates a trellis diagram for L-M=1. FIGS. 17 and 18, for example, illustrate a trellis diagram for a reduced state sequence detector with L-M=2.

As occurs in branch metric generators 1101, 1302, 1402-w, and 1602-w, branch metric generator 2004 outputs a set of branch metrics $M_w(S \rightarrow S')$ for transitions between states S and state S' of the decoder. ACS 2005 outputs the ACS results to traceback circuitry 2006, and the transition metrics to starting point 2007. Traceback circuit 2006 outputs the symbols decided by sequence detector 2000, in reverse chronological order, and LIFO 2008 reverses the order of these symbols to output symbol stream $\hat{a}_{k,w}$.

The output signals $S_{k,w}$ outputted from ACS 2005 to feedback section 2003 are given by the traced back sequence from traceback circuit 2006.

From FIG. 20A, if the past L symbols have been properly decoded then the influence of intersymbol interference will be completely canceled. In general, feedback section 2003 can be any feedback structure. An example feedback section is feedback section 811 shown in FIG. 8. Feedback section 811, however, includes M multipliers (multipliers 806-1 through 806-M) and an M-input adder (adder 807) for the case of M ISI symbol cancellation.

One embodiment of feedback section 2003 includes feedback sections like feedback section 811. For Gigabit Ethernet, at symbol rates of 125 Mhz on each wire, the timing constraints of the sequence detector are severe. When "per-survivor processing" (see, e.g., sequence detector 1300 of FIG. 13) is used, feedback section 2003 must include feedback section 811 repeated for each state of equalizer 2000 because the final state of equalizer 2000 is not determined until the latest decision of ACS 2005 (i.e., the parameters $S_{k-n}$ are determined by ACS 2005).

FIG. 20B shows an embodiment of feedback section 2003 that includes a look-up feedback section 2100. Look-up feedback section 2100 outputs an output signal $a''_k$ from look-up values $\xi_1$ through $\xi_Q$ in response to the ACS parameters $S_{k-1}$ through $S_{k-L}$. Look-up values $\xi_1$ through $\xi_Q$ can be preloaded into feedback section 2100 or may be periodically adaptively chosen and read into feedback section 2100. Values for look-up values $\xi_1$ through $\xi_Q$ for two ISI symbols and a PAM-5 symbol alphabet are given above in Equation 35.

The embodiments discussed above are exemplary only and are not intended to be limiting. One skilled in the art will recognize multiple variations of these embodiments that are intended to be included within the scope of this disclosure. As such, the invention is limited only by the following claims.

We claim:

1. A receiver system comprising:
   a group of one-dimensional ("1-D") receivers each comprising (a) an input section that processes a corresponding different one of a group of receiver input signals respectively corresponding to the receivers according to a process that comprises serially filtering and digitizing that input signal to generate a corresponding processed signal as a stream of filtered digitized values and (b) an equalizer that performs equalization on an intermediate signal comprising the filtered digitized values or further values generated from the filtered digitized values to produce a corresponding equalized signal as a stream of equalized values;
   a group of 1-D symbol selectors respectively corresponding to the receivers, each symbol selector providing a corresponding symbol signal as a stream of 1-D symbols chosen, from a set of predefined 1-D symbols, to be respectively substantially closest to the equalized values of the equalized signal of the corresponding receiver, data for a feedback signal used by the equalizer in each receiver for generating the current equalized value of that receiver's equalized signal being supplied from a lookup table as a function of at least one previous symbol provided from the corresponding symbol selector; and
   a multi-dimensional decoder that furnishes a stream of multi-dimensional symbols in response to the streams of 1-D symbols.

2. A system as in claim 1 wherein the equalizers alleviate intersymbol interference in the receiver input signals.

3. A system as in claim 1 wherein the feedback signal used by the equalizer in each receiver is supplied from the lookup table for that feedback signal as a function of at least the immediately previous symbol provided from the corresponding symbol selector.

4. A system as in claim 1 wherein the feedback signal used by the equalizer in each receiver is supplied from the lookup table for that feedback signal as a function of multiple previous symbols provided from the corresponding symbol selector.

5. A system as in claim 1 wherein the feedback signal used by the equalizer in each receiver is supplied from the lookup table for that feedback signal as a function of multiple consecutive previous symbols, including the immediately previous symbol, provided from the corresponding symbol selector.

6. A system as in claim 1 wherein the equalizer of each receiver produces its equalized signal by negatively adding that equalizer's feedback signal to the corresponding intermediate signal or to an additional signal produced from the corresponding intermediate signal.

7. A system as in claim 1 wherein the equalizer in each receiver comprises:
   a pre-equalizer which generates a partially equalized signal in response to the corresponding intermediate signal;
   a feedback circuit which generates the feedback signal for that receiver's equalizer; and
   an arithmetic element which produces that receiver's equalized output signal by negatively adding the feedback signal for that receiver's equalizer to the partially equalized signal.

8. A system as in claim 7 wherein, in generating the current equalized value of the equalized output signal of each receiver, the pre-equalizer in that receiver provides equalization on at least one selected value of that receiver's processed signal where each selected value corresponds to a signal provided by the corresponding symbol selector prior to each symbol used in generating the feedback signal for that receiver's equalizer.

9. A system as in claim 1 wherein:
   each symbol selector also generates an error signal as an accuracy estimate for that symbol selector's symbol signal;
   the system further includes (a) an error correction circuit responsive to the error signal for generating an error result signal that indicates which of the current equalized values of the equalized signals is most likely incorrect and (b) a parity check circuit responsive to the symbol signals for supplying a parity signal that indicates whether each multi-dimensional symbol is of correct parity; and
   the multi-dimensional decoder also operates in response to the parity and error result signals for modifying the multi-dimensional symbols in accordance with the current equalized value of the equalized signal most likely to be incorrect if the parity signal indicates a parity error.

10. A system as in claim 1 wherein the receivers include coefficient update circuitry for adaptively changing equalization parameters for the equalizers.

11. A system as in claim 1 wherein the input section of each receiver comprises a filter and an analog-to-digital converter coupled together in series.

12. A system as in claim 11 wherein the filters have echo cancellation capability.

13. A system as in claim 11 wherein the filters have near-end crosstalk cancellation capability.

14. A system as in claim 11 wherein the filters have anti-aliasing capability.

15. A system as in claim 11 wherein each receiver includes an amplifier coupled in series with that receiver's filter and analog-to-digital converter.

16. A system as in claim 1 wherein the receivers have baseline wander correction capability.

17. A receiver system comprising:
    a group of one-dimensional ("1-D") receivers, each comprising (a) an input section that processes a corresponding different one of a group of receiver input signals respectively corresponding to the receivers according to a process that comprises serially filtering and digitizing that input signal to generate a corresponding processed signal as a stream of filtered digitized values and (b) a sequence detector that performs sequence detection on an intermediate signal constituted with intermediate values comprising the filtered digitized values or further values generated from the filtered digitized values to approximate sequences of the intermediate values, as sequences, to respectively corresponding sequences of 1-D symbols chosen from a set of predefined 1-D symbols and to provide the sequences of 1-D symbols as a stream of 1-D symbols; and a multi-dimensional decoder that furnishes a stream of multi-dimensional symbols in response to the streams of 1-D symbols.

18. A system as in claim 17 wherein the sequence detectors alleviate intersymbol interference in the receiver input signals.

19. A system as in claim 17 wherein each sequence detector comprises:

a branch metric generator which generates an array of branch metrics for each predefined 1-D symbol for that sequence detector at a kth time period that immediately follows a (k−1)th time period where each branch metric is a measure of how much one of the intermediate values to that sequence detector at the kth time period differs from a transition value for a transition to that predefined 1-D symbol at the kth time period along an allowable path from each different one of the predefined 1-D symbols at the (k−1)th time period;

a determining/comparing circuit which (a) determines a state metric for each predefined 1-D symbol at the kth time period with respect to the intermediate value to that sequence detector at the kth time period and (b) generates a comparison result indicating which state at the (k−1)th time period for each predefined 1-D symbol results in the state metric for that predefined 1-D symbol at the kth time period; and a detector output circuit which provides a sequence of the 1-D symbols based on the comparison results.

20. A system as in claim 19 wherein the determining/comparing circuit of each sequence detector determines its state metrics at the kth time period by a process that entails determining the minimum of a group of sums for each predefined 1-D symbol where each sum is the sum of (a) one of the branch metrics for that predefined 1-D symbol at the kth time period and (b) the associated state metric at the (k−1)th time period.

21. A system as in claim 19 wherein each sequence detector includes a starting point determining circuit which determines a starting state in response to the state metrics for that sequence detector.

22. A system as in claim 19 wherein the branch metric generator in each sequence detector employs the comparison results for that sequence detector in generating the branch metrics for that sequence detector.

23. A system as in claim 19 wherein the determining/comparing circuit of each sequence detector generates for each predefined 1-D symbol at the kth time period (a) a best state metric and a second-best state metric, (b) a best comparison result and a second-best comparison result, and (c) a difference result as a measure of how much the best state metric differs from the second-best state metric.

24. A system as in claim 23 wherein the multi-dimensional decoder utilizes the best comparison, second-best comparison, and difference results to correct any errors in the stream of multi-dimensional symbols.

25. A system as in claim 23 wherein the multi-dimensional decoder comprises:

a group of read modules respectively corresponding to the sequence detectors, each read module operating in response to the best comparison, second-best comparison, and difference results for the corresponding sequence detector at the kth time period to generate a best one of the predefined 1-D symbols at the kth time period, a second-best one of the predefined 1-D symbols at the kth time period, and an associated reliability measure at the kth time period;

a parity check circuit which, in response to the best predefined 1-D symbols at the kth time period, generates a parity signal for the kth time period;

an error analysis circuit which operates in response to the reliability measures at the kth time period to generate an error indication signal for the kth time period to indicate which of the best predefined 1-D symbols at the kth time period is most likely to be incorrect; and a decoder circuit which, in response to the best predefined 1-D symbols at the kth time period, the second-best predefined 1-D symbols at the kth time period, the parity signal for the kth time period, and the error indication signal for the kth time period, determines final ones of the predefined 1-D symbols for the kth time period and generates a corresponding multi-dimensional symbol for the kth time period.

26. A system as in claim 25 wherein each read module operates in response to the final predefined 1-D symbols at the kth time period for the corresponding sequence detector to determine a best one of the predefined 1-D symbols at the (k−1)th time period, a second-best one of the predefined 1-D symbols at the (k−1)th time period, and an associated reliability measure at the (k−1)th time period.

27. A system as in claim 25 wherein the branch metric generator employs the comparison results in generating the branch metrics.

28. A system as in claim 27 wherein each sequence detector employs reduced complexity sequence detection.

29. A system as in claim 17 wherein there are at least five different predefined 1-D symbols.

30. A system as in claim 17 wherein each 1-D receiver includes a pre-equalizer that performs equalization on the filtered digitized values of that receiver's processed signal to generate the intermediate values of that receiver's intermediate signal as partially equalized values.

31. A system as in claim 30 wherein each pre-equalizer employs feedforward equalization.

32. A system as in claim 30 wherein coefficients for the pre-equalizers are adaptively chosen.

33. A system as in claim 17 wherein the input section of each receiver comprises a filter and an analog-to-digital converter coupled together in series.

34. A system as in claim 33 wherein the filters have echo cancellation capability.

35. A system as in claim 33 wherein the filters have near-end crosstalk cancellation capability.

36. A system as in claim 33 wherein the filters have anti-aliasing capability.

37. A system as in claim 33 wherein each receiver includes an amplifier coupled in series with that receiver's filter and analog-to-digital converter.

38. A system as in claim 17 wherein the receivers have baseline wander correction capability.

39. A method of receiving a group of input signals transmitted over respectively corresponding channels, the method comprising:

processing each input signal according to a process that comprises serially filtering and digitizing that input signal to generate a corresponding processed signal as a stream of filtered digitized values;

performing equalization on an intermediate signal comprising the filtered digitized values or further values generated from the filtered digitized values to produce a corresponding equalized signal as a stream of equalized values;

generating, for each equalized signal, a corresponding symbol signal as a stream of one-dimensional ("1-D") symbols chosen, from a set of predefined 1-D symbols, to be respectively substantially closest to the equalized values of that equalized signal;

accessing, for use in producing a feedback signal utilized in generating the current value of each equalized signal, a lookup table to obtain data as a function of at least one previous symbol of the corresponding symbol signal; and decoding the streams of 1-D symbols to produce a stream of multi-dimensional symbols.

40. A method as in claim 39 wherein each feedback signal is produced by obtaining, from the lookup table for that feedback signal, data as a function of multiple previous symbols of the symbol signal generated from the corresponding equalized signal.

41. A method as in claim 39 wherein the equalization-performing and table-accessing acts comprise negatively adding each feedback signal to the corresponding intermediate signal or to an additional signal produced from the corresponding intermediate signal.

42. A method as in claim 39 wherein the equalization-performing and table-accessing acts include:

performing, in generating the current equalized value of each equalized signal, equalization on at least one selected value of the corresponding intermediate signal to generate a corresponding partially equalized signal where each selected value corresponds to a symbol of the corresponding symbol signal provided prior to each symbol used in generating the corresponding feedback signal; and negatively adding each feedback signal to the corresponding partially equalized signal.

43. A method as in claim 39 further including:

generating an error signal as an accuracy estimate for each symbol signal;

generating an error result signal that indicates which of the current values of the equalized signals is most likely incorrect;

supplying a parity signal indicating whether each multi-dimensional symbol is of correct parity; and, if the parity signal indicates a parity error, modifying the multi-dimensional symbols in accordance with the current equalized value of the equalized signal most likely to be incorrect.

44. A method as in claim 39 further including adaptively generating coefficients to change algorithms for generating the equalized signals.

45. A method as in claim 39 wherein the signal-processing act includes amplifying each input signal.

46. A method as in claim 39 wherein the filtering of the input signals includes utilizing one or more of echo cancellation, near-end crosstalk cancellation, and anti-aliasing.

47. A method of receiving a group of input signals transmitted over respectively corresponding channels, the method comprising:

processing each input signal according to a process that comprises serially filtering and digitizing that input signal to generate a corresponding processed signal as a stream of filtered digitized values;

performing, for each processed signal, sequence detection on a corresponding intermediate signal constituted with intermediate values comprising the filtered digitized values of that processed signal or further values generated from the filtered digitized values of that processed signal to approximate sequences of those intermediate values, as sequences, to respectively corresponding sequences of one-dimensional ("1-D") symbols chosen from a set of predefined 1-D symbols and to provide the sequences of 1-D symbols as a stream of 1-D symbols; and decoding the streams of 1-D symbols to produce a stream of multi-dimensional symbols.

48. A method as in claim 47 wherein, for each intermediate signal, the sequence-detection-performing act comprises:

generating an array of branch metrics for each predefined 1-D symbol at a kth time period that immediately follows a (k−1)th time period where each branch metric is a measure of how much one of the intermediate values associated with that intermediate signal at the kth time period differs from a transition value for a transition to that predefined 1-D symbol at the kth time period along an allowable path from each different one of the predefined 1-D symbols at the (k−1)th time period;

determining a state metric for each predefined 1-D symbol at the kth time period with respect to the intermediate value of that intermediate signal at the kth time period;

generating a comparison result indicating which state at the (k−1)th time period for each predefined 1-D symbol results in the state metric for that predefined 1-D symbol at the kth time period; and providing a sequence of 1-D symbols based on the comparison results.

49. A method as in claim 48 wherein, for each intermediate signal, the state-metric-determining act comprises determining the minimum of a group of sums for each predefined 1-D symbol where each sum is the sum of (a) one of the branch metrics for that predefined 1-D symbol at the kth time period and (b) the associated state metric at the (k−1)th time period.

50. A method as in claim 48 further including, for each intermediate signal, determining a starting state in response to the state metrics.

51. A method as in claim 48 wherein, for each intermediate signal, the branch-metric-generating act includes employing the comparison results in generating the branch metrics.

52. A method as in claim 48 further including, for each intermediate signal, generating for each predefined 1-D symbol at the kth time period (a) a best state metric and a second-best state metric, (b) a best comparison result and a second-best comparison result, and (c) a difference result as a measure of how much the best state metric differs from the second-best state metric.

53. A method as in claim 52 further including utilizing the best comparison, second-best comparison, and difference results to correct any errors in the stream of multi-dimensional symbols.

54. A method as in claim 52 wherein the decoding act comprises:

generating, for each intermediate signal, a best one of the predefined 1-D symbols at the kth time period, a second-best one of the predefined 1-D symbols at the kth time period, and an associated reliability measure at the kth time period in response to the best comparison, second-best comparison, and difference results for that intermediate signal at the kth time period;

generating a parity signal for the kth time period in response to the best predefined 1-D symbols at the kth time period;

generating an error indication signal for the kth time period in response to the reliability measures at the kth time period to indicate which of the best predefined 1-D symbols at the kth time period is most likely incorrect;

determining final ones of the predefined symbols for the kth time period in response to the best predefined 1-D symbols at the kth time period, the second-best predefined symbols of the kth time period, the parity signal for the kth time period, and the error indication signal for the kth time period; and generating a corresponding multi-dimensional symbol for the kth time period.

55. A method as in claim 54 further including, for each intermediate signal, determining a best one of the predefined 1-D symbols at the (k-1)th time period, a second-best one of the predefined 1-D symbols at the (k-1)th time period, and an associated reliability measure at the (k-1)th time period in response to the final predefined 1-D symbol at the kth time period.

56. A method as in claim 47 wherein the sequence-detection-performing act comprises employing reduced complexity sequence detection.

57. A method as in claim 47 further including, for each processed signal, performing equalization on the filtered digitized values of that processed signal to generate the intermediate values of the corresponding intermediate signal as partially equalized values.

58. A method as in claim 57 wherein the equalization comprises feedforward equalization.

59. A method as in claim 57 wherein the signal-processing act includes amplifying each input signal.

60. A method as in claim 57 wherein the filtering of the input signals includes utilizing one or more of echo cancellation, near-end crosstalk cancellation, and anti-aliasing.

* * * * *